(12) United States Patent
Newell

(10) Patent No.: US 12,709,345 B2
(45) Date of Patent: Aug. 18, 2026

(54) CART MOVER WITH RECONFIGURABLE DRIVE UNIT AND SUPPORT WHEELS

(71) Applicant: Gregory James Newell, Cascais (PT)

(72) Inventor: Gregory James Newell, Cascais (PT)

( * ) Notice: Subject to any disclaimer, the term of this patent is extended or adjusted under 35 U.S.C. 154(b) by 0 days.

(21) Appl. No.: 19/287,221

(22) Filed: Jul. 31, 2025

(65) Prior Publication Data

US 2026/0035044 A1 Feb. 5, 2026

Related U.S. Application Data

(60) Provisional application No. 63/677,461, filed on Jul. 31, 2024.

(51) Int. Cl.

| | |
|---|---|
| ***B62D 61/12*** | (2006.01) |
| ***B60D 1/173*** | (2006.01) |
| ***B60K 7/00*** | (2006.01) |
| ***B62B 5/00*** | (2006.01) |
| ***B62D 61/10*** | (2006.01) |
| *B60B 19/00* | (2006.01) |
| *B60B 33/00* | (2006.01) |
| *B60D 1/00* | (2006.01) |

(52) U.S. Cl.

CPC ............. *B62D 61/12* (2013.01); *B60D 1/173* (2013.01); *B60K 7/0007* (2013.01); *B62B 5/0079* (2013.01); *B62D 61/10* (2013.01); *B60B 19/003* (2013.01); *B60B 33/00* (2013.01); *B60D 2001/005* (2013.01); *B60K 2007/0084* (2013.01)

(58) Field of Classification Search

CPC ........ B62D 61/12; B62D 61/10; B60D 1/173; B60K 7/007; B62B 5/0079

See application file for complete search history.

(56) References Cited

U.S. PATENT DOCUMENTS

2002/0056967 A1* 5/2002 Carrillo .................. B62B 3/008 280/47.35
2021/0016603 A1* 1/2021 Mori ....................... B62B 5/004

FOREIGN PATENT DOCUMENTS

JP H02296505 A * 12/1990
WO WO-2018159532 A1 * 9/2018 ............... B62D 7/14

* cited by examiner

*Primary Examiner* — Jacob D Knutson
(74) *Attorney, Agent, or Firm* — Riverside Law LLP

(57) ABSTRACT

The disclosure relates to a cart mover comprising a chassis having a driven end and a hitching end, a reconfigurable drive system, and a hitching system. A first set of support wheels and a second set of support wheels are coupled to the hitching end. The reconfigurable drive system is positioned on the driven end of the chassis having a drive unit with a first and second drive wheel and drive turret. In a locked state, the drive turret locks an orientation of the drive unit. In an unlocked state, the drive unit is configured to freely rotate about a vertical axis of the drive unit. The hitching system comprises at least one hitching arm and at least one engaging member. One or both of the hitching arm and engaging member are configured to move towards one another to constrain an object therebetween.

20 Claims, 35 Drawing Sheets

100
120a
118a
132
118b
120b 104
302a
303
106

302b
302a 100
302b
302a
120b
118b
132
118a
120a 100
302a
303
106
120a
132
104

100
120b
118b
132
118a
120a

CART MOVER WITH RECONFIGURABLE DRIVE UNIT AND SUPPORT WHEELS

CROSS-REFERENCE TO RELATED APPLICATIONS

This application claims priority to U.S. patent application No. 63/677,461, filed Jul. 31, 2024, the contents of which are incorporated herein by reference in their entirety.

BACKGROUND

Wheeled carts have long been used in manufacturing and many areas of storage and distribution. While there have been standardized versions available, a key reason for manufacturers and distributors to utilize carts is that they can be easily customized/tailored to suit the customer's particular products or application. For example, the cart may be specially designed to hold the product more easily or more securely. It may also be designed to allow operators to more easily or more safely engage with and move the cart. Hence, there are many different types of carts in existence, both standardized and customized.

The broad range of cart designs creates challenges for companies looking to supply a cart mover that can operate autonomously. One challenge is identifying or customizing a cart mover that can engage with different shapes, sizes, weights, heights, and the like. The configuration of the cart mover's wheels create another challenge. For example, a configuration of a conventional cart mover's wheels typically includes two non-swiveling wheels and two swiveling wheels. In other examples, all four wheels may be swivel-castors. While none of these configurations present a problem for human operators as they move or interact with the carts, the variations present significant challenges when attempting to automate the cart moving process with a machine that can engage with and move carts having a range of different shapes, sizes, weights, heights, and the like.

The various wheel configurations impact how each cart mover, particularly an autonomous cart mover, can engage with and move the cart. Having fixed wheels at the hitching end of the cart generally requires a different means of engagement and maneuvering versus when swivel wheels are positioned at the hitching end of the cart. Another approach may be required when a cart has swivel castors at both ends of the cart. Further, the added variable of the cart mover needing to be stable and steerable when traveling alone and not hitched to any cart creates challenges when attempting to automate the cart moving process. Also, in some cases, a facility may want carts hitched from different ends according to the situation, such as when the autonomous cart mover is presenting the cart to an operator to fill or pick from versus when the cart mover is moving a cart into storage or loading the cart into a truck. Flexibility for a cart mover to interact with different carts in different ways is an important, yet challenging, requirement in a cart mover, particularly an autonomous cart mover.

There are generally two different types of drive systems that can be used for cart movers, such as, a differential drive system and a tricycle-steer drive system. Each system is more suited to certain use cases, and each has their own limitations. In a differential drive system, two driven wheels are mounted to the chassis of the cart mover, such that the entire cart mover steers or reorients when one wheel is driven faster, slower or in a different direction to the other wheel. Cart movers that employ a differential drive system typically include additional swivel castors at one or both ends of the cart mover to stabilize the cart mover when accelerating or decelerating. In a tricycle-steer drive system, a single steerable drive wheel is typically included at the front of the cart mover and two or more non-swiveling (i.e., straight-running) wheels are mounted at the opposing end of the cart mover. The straight running wheels are needed to provide a travel direction for the steerable drive wheel to steer relative to the rear straight running wheels. A further requirement of any cart mover is a means to engage and disengage with a cart or different types of carts. Such engagement mechanisms, generally referred to as hitching systems, are typically a separate, powered mechanism with sensors for position or other feedback that can connect with or grip onto features of the cart—most commonly this being a crosstie at the bottom of the cart frame.

Measuring productivity of the conventional cart movers may relate to the number of carts that can be accurately and safely hitched, transported to a new location and released per shift. There are generally three components that affect this productivity, which are the time to hitch and/or unhitch, travel speed, and software. Software involves many functions such as defining existing routes for the robot or defining new routes, identifying carts for particular missions, and the like. The current generation of autonomous cart movers, however, are not productive enough to justify their costs (i.e., the acquisition cost and the deployment cost). For instance, the cart movers that employ the conventional drive systems may not be able to accurately hitch/unhitch a cart. Other carts movers may be too slow to complete the hitching process. Yet other cart movers may not be able to securely hitch a cart to travel across a facility at higher speeds.

The present invention satisfies these needs.

SUMMARY

The present disclosure relates generally to a cart mover, and more particularly to having a reconfigurable drive unit and support wheels with a hitching system.

In one or more aspects, the disclosed technology relates to a cart mover that is more compact, more versatile, and more economical to build than conventional cart movers. For example, in one or more aspects, the disclosed technology provides a differential drive unit in which the driven wheels are mounted to a rotatable turret that can be locked to the chassis, to prevent the drive unit from rotating withing the chassis, or released, to allow the drive unit to rotate within the chassis of the cart mover. With the turret locked in one orientation relative to the chassis, the cart mover may operate with differential steering. With the lock released, the steering turret can reorient within the chassis, the cart mover may operate with tricycle steering. In other examples, in one or more aspects, the disclosed technology provides a simple and fast-acting actuator mechanism that allows the cart mover to switch between non-swiveling ("NS") support wheels and omni-directional ("OD") support wheels according to the maneuver to be executed or the wheel configuration of the cart to be moved. To operate using differential steering, the turret of the cart mover may be locked and the OD support wheels may be deployed from the cart mover. To operate using tricycle steering, the turret of the cart mover may be unlocked and the NS support wheels may be deployed from the cart mover. Further, the simple and robust actuator mechanism that switches between NS and OD support wheels may, in other examples, lower the hitching end of the cart mover to allow the hitching hands to be able to pass under the front bar or other feature of the cart, then raise up again (i.e., by extending the actuators again) to hitch to the cart.

Accordingly, the disclosed technology provides a cart mover that can engage with all the common wheel configurations of carts. For instance, the disclosed cart mover can engage with either end of the most common form of cart having swivel castor wheels at one end and non-swivel wheels at the opposing end or carts having four swivel castor wheels. This disclosed technology provides an automated cart mover that is more versatile and functional than conventional cart movers. The cart mover disclosed herein has the versatility to hitch to and move a broad range of cart shapes, sizes and wheel configurations. The cart mover disclosed herein can maneuver more quickly than conventional cart movers, due to the very short time required to switch between drive modes. Further, the cart mover disclosed herein is more compact in size than conventional cart movers. As such, along with the aforementioned drive system versatility, the disclosed cart mover can perform more compact maneuvers in tighter spaces, therefore less floor space needs to be allocated to aisleways for the cart mover to travel. Additionally, the cart mover disclosed herein is more economical to build as the simple actuator mechanism that deploys the support wheels also provides the hitch engagement functionality. Further, the disclosed cart mover may reduce manufacture costs, particularly as the majority of the hitching process comes "for free", as the hitching process is essentially a by-product of the support wheel switching process when changing drive systems (i.e., between differential steering and tricycle steering configurations). Further, with the improved maneuverability and more compact size of the disclosed cart mover, the cart mover can be more easily incorporated into facilities that were not designed to include autonomous cart movers moving within those facilities. By dipping the rear of the cart mover, the disclosed cart mover reduces the time to hitch/unhitch a cart compared to conventional cart movers. Moreover, by utilizing the disclosed hitching pads, the cart mover described herein can securely hitch a cart and maintain the secure hitch during travel. As such, the cart mover can travel at higher speeds with a hitched cart while still maintaining pedestrian safety, which is the factor dictating the maximum speed a cart mover can travel at when hitched with a cart.

In some aspects, the techniques described herein relate to a reconfigurable drive system, including: a chassis; a drive unit including a first drive wheel and a second drive wheel, each configured to be independently driven; and a drive turret rotatably coupling the drive unit and the chassis, the drive turret including a brake, wherein the brake, in a locked state, locks an orientation of the drive unit with respect to the chassis, and wherein in an unlocked state, the drive unit is configured to freely rotate about a vertical axis of the drive unit.

In some aspects, the techniques described herein relate to a hitching system, including a chassis having at least one wheel operably coupled to a driven end of the chassis and a first set of support wheels and a second set of support wheels coupled to a hitching end of the chassis; and the hitching end of the chassis including at least one hitching arm and at least one engaging member positioned above the at least one hitching arm, wherein one or both of the at least one hitching arm and at least one engaging member are configured to move towards one another to constrain an object therebetween.

In some aspects, the techniques described herein relate to a cart mover, including: a chassis having a driven end and a hitching end, wherein a first set of support wheels and a second set of support wheels are coupled to the hitching end; at least one drive wheel positioned on the driven end of the chassis; and a hitching system including at least one hitching arm and at least one engaging member positioned above the at least one hitching arm, wherein one or both of the at least one hitching arm and at least one engaging member are configured to move towards one another to constrain an object therebetween.

In some aspects, the techniques described herein relate to a hitching system, including: a chassis having at least one wheel operably coupled to a driven end of the chassis and at least one set of support wheels coupled to a hitching end of the chassis; and the hitching end of the chassis comprising at least one hitching arm and at least one engaging member positioned above the at least one hitching arm, wherein one or both of the at least one hitching arm and at least one engaging member are configured to move towards one another to constrain an object therebetween.

In some aspects, the techniques described herein relate to a reconfigurable wheel assembly, including: a chassis having at least one wheel operably coupled to a driven end of the chassis; and a first set of support wheels and a second set of support wheels coupled to a rear end of the chassis and are configured to be deployed from the chassis to contact a surface, wherein a wheel of the first set of support wheels and a wheel of the second set of support wheels are coupled to each other via a first pivoting member, wherein another wheel of the of the first set of support wheels and a wheel of the second set of support wheels are coupled to each other via a second pivoting member, wherein the first set of support wheels are configured to be deployed a first distance from the chassis to angle the rear end of the chassis towards the surface, and wherein the second set of support wheels are configured to be deployed a second distance from the chassis to angle the rear end of the chassis away from the surface.

A variety of additional aspects will be set forth in the description that follows. The aspects can relate to individual features and to combination of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description.

DETAILED DESCRIPTION

Figures 1A, 1B:
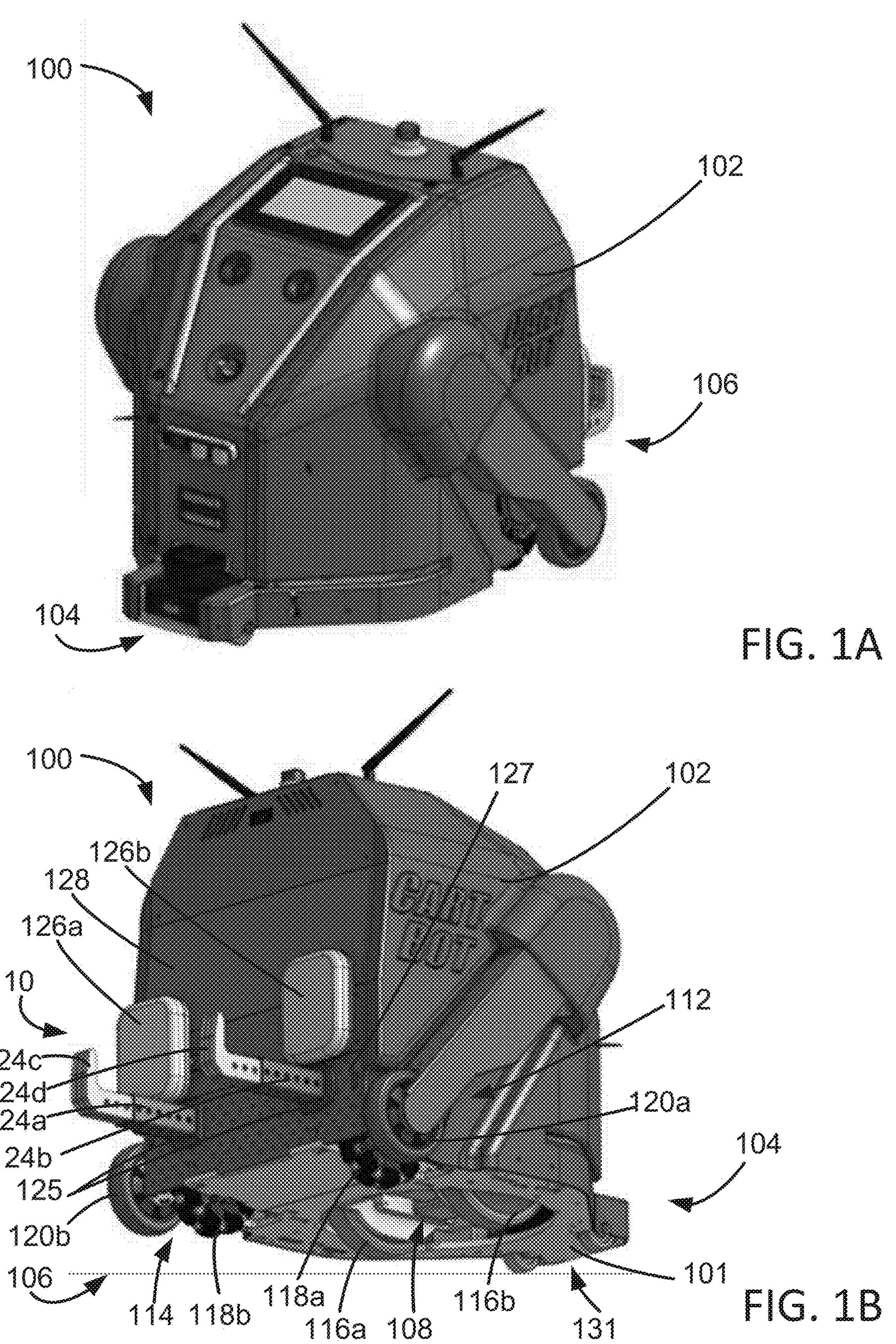
FIG. 1A illustrates a front perspective view of an example cart mover.
FIG. 1B illustrates a rear perspective view of the example cart mover.

The following discussion omits or only briefly describes conventional features of cart movers that are apparent to those skilled in the art. It is noted that various embodiments are described in detail with reference to the drawings, in which like reference numerals represent like parts and assemblies throughout the several views. Reference to various embodiments or examples does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations.

Unless otherwise specifically defined herein, all terms are to be given their broadest reasonable interpretation including meanings implied from the specification as well as meanings understood by those skilled in the art and/or as defined in dictionaries, treatises, etc. It is noted that, as used in the specification and the appended claims, the singular forms "a," "an" and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof.

Relative terms such as "horizontal," "vertical," "up," "down," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively or operably connected" is such an attachment, coupling or connection that allows the pertinent structures to operate as intended by virtue of that relationship.

Reference throughout the specification to "one embodiment", "an embodiment" or "some embodiments" means that a particular feature, structure, or characteristic described in connection with an embodiment is included in at least one embodiment of the subject matter disclosed. Thus, the appearance of the phrases "in one embodiment", "in an embodiment" or "in some embodiments" in various places throughout the specification is not necessarily referring to the same embodiment. Further, the particular features, structures or characteristics of "one embodiment", "an embodiment" or "some embodiments" may be combined in any suitable manner with each other to form additional embodiments of such combinations. It is intended that embodiments of the disclosed subject matter cover modifications and variations thereof. Terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Moreover, throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6, and any whole and partial increments there between. This applies regardless of the breadth of the range. As used herein, the term "about" in reference to a measurable value, such as an amount, a temporal duration, and the like, is meant to include the specified value and/or encompass variations of plus or minus 20%, plus or minus 10%, plus or minus 5%, plus or minus 1%, and plus or minus 0.1% of the specified value, as such variations are appropriate.

The term "pulley" as used herein refers to any type of pulley (e.g., a toothed pulley, a flat pulley, etc.), gear, sprocket, and the like, and thus each such term may be used interchangeably. The term "belt" as used herein refers to a flexible connection used to transfer motion between pulleys. The term "belt" refers to any type of belt (e.g., timing belt), chain, and the like, and thus each such term may be used interchangeably. The term "encoder" as used herein refers to any type of sensor used or configured to detect and provide electrical feedback that indicates a position, direction, speed, counts, and/or orientation of a component of the systems described herein. The term "cart mover" as used herein refers to any type of cart moving system, such as, but not limited to autonomous cart movers, robotic cart movers, non-robotic cart movers (e.g., human operator/manually controlled cart movers).

Conventional cart moving systems, such as autonomous cart movers, have several drawbacks. For example, conventional cart movers are limited to engaging and moving specific types of carts based on a carts shape, size, weight, height, and other like factors. Further, conventional cart movers have limited maneuverability based on the utilized drive system, thereby increasing the difficulty and time taken for the cart mover to engage with a particular cart, let alone carts having a variety of shapes and styles. For instance, conventional cart movers may take 30 seconds to 3 minutes to hitch a cart.

The exemplary cart mover examples described herein include a reconfigurable drive unit and support wheels with a hitching system to quickly and securely engage with a variety of wheeled carts. The examples described herein provide a cart mover that can engage a cart from either end of the cart within a few seconds (e.g., 8 seconds). Examples of the disclosed cart mover having a reconfigurable drive unit, support wheels, and hitching system are described below with reference to the Figures.

Figure 1C:
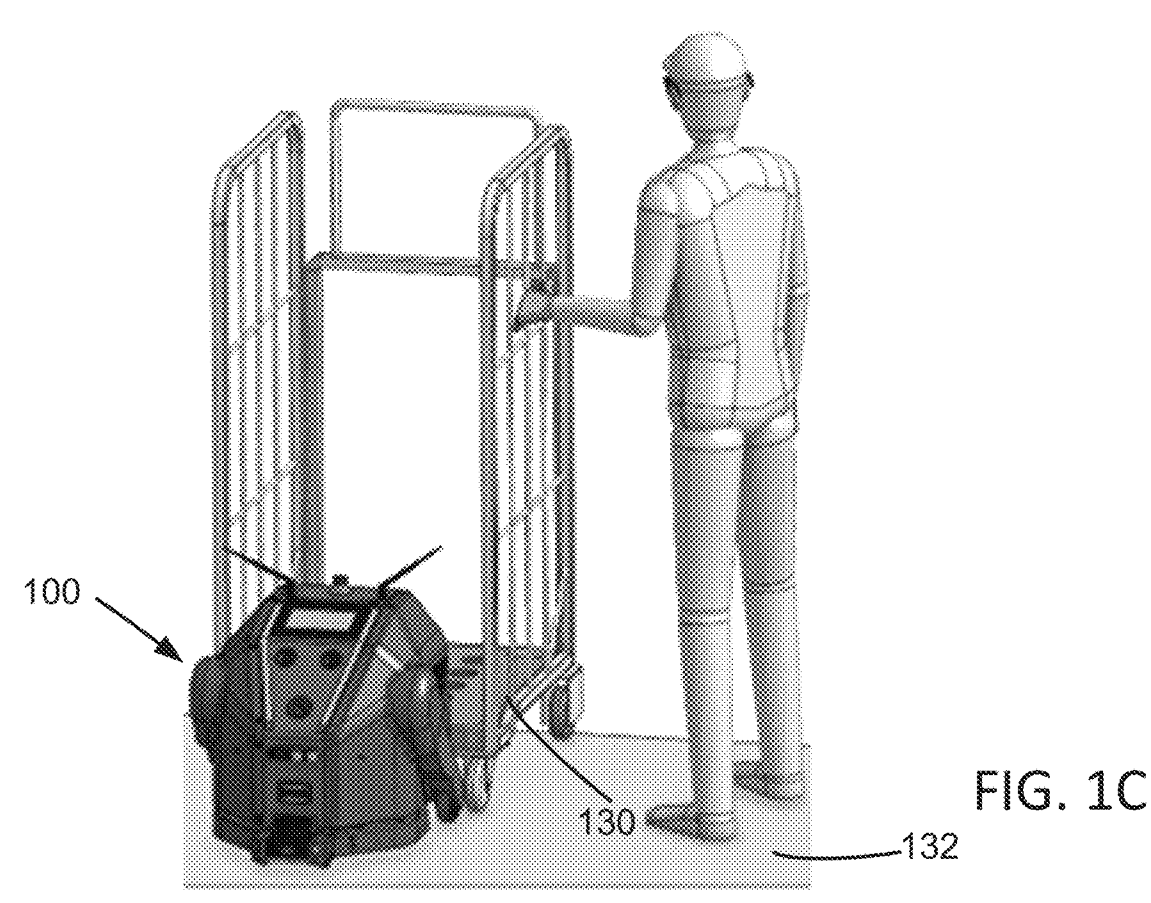
FIG. 1C illustrates a perspective view of the example cart mover coupled to an example cart.
Figure 1D:
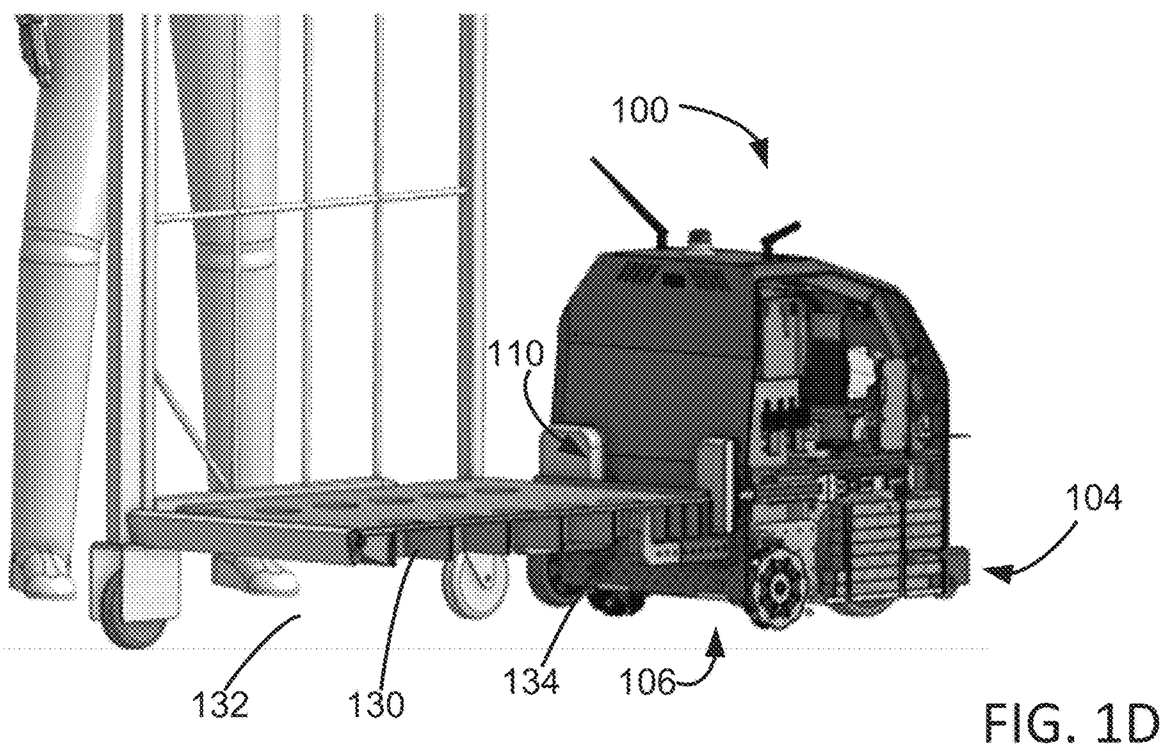
FIG. 1D illustrates a cross-sectional view of the example cart mover and example cart.

FIG. 1A illustrates a front perspective view of an example cart mover 100. FIG. 1B illustrates a rear perspective view of the cart mover 100. FIG. 1C illustrates a perspective view of the cart mover 100 coupled to an example cart 130. FIG. 1D illustrates a cross-sectional view of the cart mover 100 and cart 130. In one or more cases, the cart mover 100 is configured to operate entirely autonomously. In one or more other cases, one or more portions of the cart mover 100 are configured to operate manually and one or more other portions of the cart mover 100 are configured to operate via one or more computer systems.

In one or more cases, the cart mover 100 includes a housing 102 and chassis 101 having a driven end 104 and a hitching end 106. The housing 102 typically houses one or more of a reconfigurable drive system 108, support wheel system 112, support wheel system 114, stability wheels 131, electronic(s), the computing/control system(s), one or more batteries, and other like components. The reconfigurable drive system 108, support wheel system 112, and support wheel system 114 provide a means of differential steering and tricycle steering. The systems 108, 112, and 114 are capable of reconfiguring between drive modes within a few seconds to provide a drive mode that suits a maneuver for the cart mover 100. The systems 108, 112, and 114 and stability wheels 131 may be mounted to the chassis 101. It is noted that while the embodiments provided herein describe the cart mover 100 utilizing the reconfigurable drive system 108, it should be understood that embodiments are contemplated in which a single, steerable drive wheel may be used in the alternative.

The stability wheels 131 are coupled to the chassis 101 on the driven end 104 of the cart mover 100. The stability wheels 131 may be provided in the front of the cart mover 100 to provide stability in that direction which generally results in some rocking of the cart mover 100 forward as the cart mover 100 accelerates, decelerates, or travels over uneven floors. The reconfigurable drive system 108 may be coupled to the chassis 101 and positioned behind the stability wheels 131 on the driven end 104. The reconfigurable drive system 108 may be centrally positioned along the width of the cart mover 100. The support wheel system 112 and the support wheel system 114 may be positioned on opposing sides of the housing 102. The support wheel system 112 includes wheels 118*a* and 120*a*. The support wheel system 114 includes wheels 118*b* and 120*b*. The wheels 118*a* and 120*a* and wheels 118*b* and 120*b* may be positioned to contact a ground surface on or near the hitching end 106 of the cart mover 100.

In one or more cases, the wheels 120*a* and 120*a* may be, for example, straight running, non-swiveling wheels. The wheels 120*a* and 120*b* may be disposed parallel to the sides of the housing 102 and rotate in a forward and reverse directions. In one or more cases, the wheels 118*a* and 118*b* may be, for example, omni-directional wheels, swivel castor wheels, or other like wheels that provide rotation in all directions on a single plane. The wheels 118*a* and 118*b* may be disposed adjacent the wheels 120*a* and 120*b*. The wheels 118*a* and 118*b* may be disposed on the respective sides of the cart mover 100. It is noted that cart mover 100 includes support wheel system 112 and support wheel system 114 to deploy their respective wheels based on a particular drive mode. However, embodiments are contemplated in which the cart mover 100 utilizes only one set of rear wheels that may be lockable swiveling wheels. As such, when the cart mover 100 utilizes swiveling wheels to steer (e.g., in differential steering), the lockable swiveling wheels may be configured in an unlocked state to behave like omni-directional wheels or swivel castor wheels. Additionally, when the cart mover 100 utilizes non-swiveling wheels to steer (e.g., in tricycle steering), the lockable swiveling wheels may be configured in a locked state to behave like straight, running non-swiveling wheels.

In one or more cases, the cart mover 100 includes a hitching system 110 provided on the hitching end 106 of the cart mover 100. The hitching system 110 may include one or more hitching arms, such as hitching arms 124*a* and 124*b*, and one or more hitching pads, such as hitching pads 126*a* and 126*b*, disposed on a rear 128 of the cart mover 100. The hitching arms 124*a* and 124*b* may be rigid bodies that protrude from the rear 128 of the cart mover 100. The distal ends of the hitching arms 124*a* and 124*b* may each have hitching fingers 124*c* and 124*d*. The hitching fingers 124*c* and 124*d* may be formed in a hook-like shape and sized to hook onto a portion of a cart 130. In one or more cases, the hitching arms 124*a* and 124*b* and hitching fingers 124*c* and 124*d* are adjustable. For example, the hitching arms 124*a* and 124*b* and hitching fingers 124*c* and 124*d* may each be formed of two bodies in which one body is configured to translate within the other body to increase or decrease the overall length of the respective hitching arms 124*a* and 124*b* and hitching fingers 124*c* and 124*d*. For instance, the body of the hitching finger 124*c* may slide into the body of the hitching arm 124*a* (or vice versa based on the size of the hitching finger 124*c* with respect to the hitching arm 124*a*) to a desired length, in which a bolt is passed through corresponding holes of the bodies of the hitching arm 124*a* and hitching finger 124*c* and held in place via, for example, a cotter pin. In some cases, the hitching fingers 124*c* and 124*d* may be formed in a shape to interface with a specific type of cart. As such, the hitching fingers 124*c* and 124*d* may be swapped out for differently shaped hitching fingers that correspond to the shape of the cart to be hitched. In other examples, the base 125 of the hitching arms 124*a* and 124*b* may be repositioned on the rear 128 of the cart mover 100 to adjust the height and/or width of the hitching arms 124*a* and 124*b* relative to the surface 127. Further, the base 125 of the hitching arms 124*a* and 124*b* may be repositioned to adjust the spacing between the hitching arms 124*a* and 124*b*. For example, the rear 128 may include a peg-board like surface 127, in which through-holes of the bases 125 of the respective hitching arms 124*a* and 124*b* may be aligned with holes on the surface 127, such that fasteners may pass therethrough to couple the bases 125 of the hitching arms 124*a* and 124*b* to the surface 127 of the cart mover 100. It is noted that although the hitching arms and hitching fingers are described as two separate bodies in which one is configured to translate within the other, the hitching arm and hitching finger may be formed having a unibody construction.

The hitching pads 126*a* and 126*b* may be coupled to the rear 128 of the cart mover 100 via arms configured to extend from the cart mover 100, as further described herein. The arms of the hitching pads 126*a* and 126*b* may move the hitching pads 126*a* and 126*b* towards or away from the hitching fingers 124*c* and 124*d*. In some cases, the hitching pads 126*a* and 126*b* may be actuated towards the hitching fingers 124*c* and 124*d* to engage an object (e.g., a portion 134 of the cart 130 illustrated in FIG. 1D) between the hitching fingers 124*c* and 124*d*. For example, to hitch the cart 130, the hitching pads 126*a* and 126*b* may be configured in a retracted position into the housing 102. The cart mover 100 may use the reconfigurable drive system 108 in conjunction with the support wheel system 112 and the support wheel system 114 to maneuver the cart mover 100, such that the rear 128 of the cart mover 100 faces an end portion 134 of the cart 130. The cart mover 100 lowers the hitching end 106 of the cart mover 100 towards the ground 132. The cart mover 100 drives backwards so that the hitching arms 124*a* and 124*b* are positioned under the end portion 134 of the cart 130. The cart mover 100 raises the hitching end 106 away from the ground 132, thereby raising the hitching arms 124*a* and 124*b* and hitching fingers 124*c* and 124*d*. The hitching fingers 124*c* and 124*d* may engage the end portion 134 of the cart 130, as illustrated in FIGS. 1C and 1D. For instance, the hitching fingers 124*c* and 124*d* may be positioned in a cavity of the cart 130 and behind a cross-member of the cart 130. The cart mover 100 may then deploy the hitching pads 126*a* and 126*b* from the housing 102, such that the hitching pads 126*a* and 126*b* push the cart 130 towards the hitching fingers 124*c* and 124*d* and compress the end portion 134 of the cart 130 against the hitching fingers 124*c* and 124*d*. The cart 130 may be securely held in place by the cart mover 100. In some cases, the cart mover 100 moves the hitching pads 126*a* and 126*b* towards the hitching fingers 124*c* and 124*d* until a proximity switch is engaged and indicates that the cart 130 is successfully hitched.

Figure 2A:
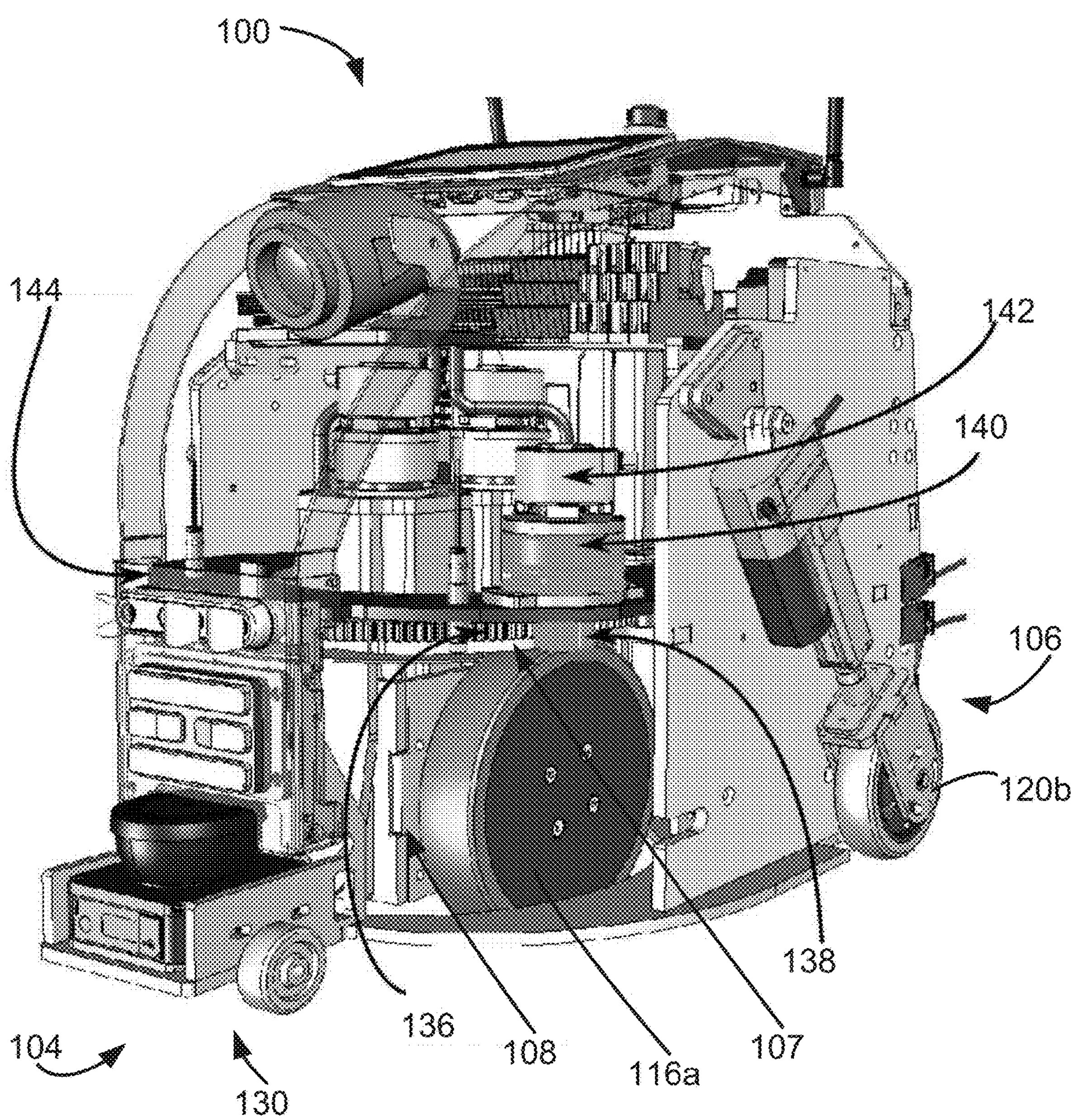
FIG. 2A illustrates a front interior view of the example cart mover.

To maneuver the cart mover 100 into a hitching position, the cart mover 100 uses the reconfigurable drive system 108 in conjunction with the support wheel system 112 and the support wheel system 114 to utilize a differential drive mode and a tricycle-steering mode. In the differential drive mode, the reconfigurable drive system 108 is locked in position such that the reconfigurable drive system 108 is in a fixed position relative to the chassis 101. For instance, the reconfigurable drive system 108 may be coupled to the chassis 101 via a rotational system 107. The rotational system 107 may include, for example, a turret support plate 144 and turret ring gear 136, as illustrated in FIG. 2A. The rotational system 107 may further include a turret lock gear 138 that interfaces with the ring gear 136 and is coupled to a brake 140 and steering angle encoder 142. The cart mover 100 may orient a direction of the wheels 116*a* and 116*b* of the reconfigurable drive system 108 via the steering angle encoder 142. Once in position, the brake 140 and turret lock gear 138 may be configured in a locked position to fix the reconfigurable drive system 108, and in particular wheels 116*a* and 116*b*, in a position relative to the chassis 101. To steer in the differential drive mode, wheels 118*a* and 118*b* are deployed from the housing 102, and while the brake 140 is configured in the lock position, the reconfigurable drive system 108 drives the wheels 116*a* and 116*b* at the same speed, different speeds, in a same direction, in a different direction, or any combination thereof. In the tricycle-steering mode, the brake 140 may release the turret lock gear 138 from the ring gear 136 allowing the reconfigurable drive system 108 to rotate about its vertical axis. To steer in the tricycle-steering mode, wheels 120*a* and 120*b* are deployed from the housing 102, and the wheels 116*a* and 116*b* are rotated about the vertical axis of the reconfigurable drive system 108 to provide a heading of the cart mover 100. To steer the cart mover 100, the wheels 116*a* and 116*b* may be rotated about the vertical axis by rotating the ring gear 136 and turret lock gear 138 to provide the heading. The wheels 116 and 116*b* may be driven forwards or backwards to move the cart mover 100.

Figure 2B:
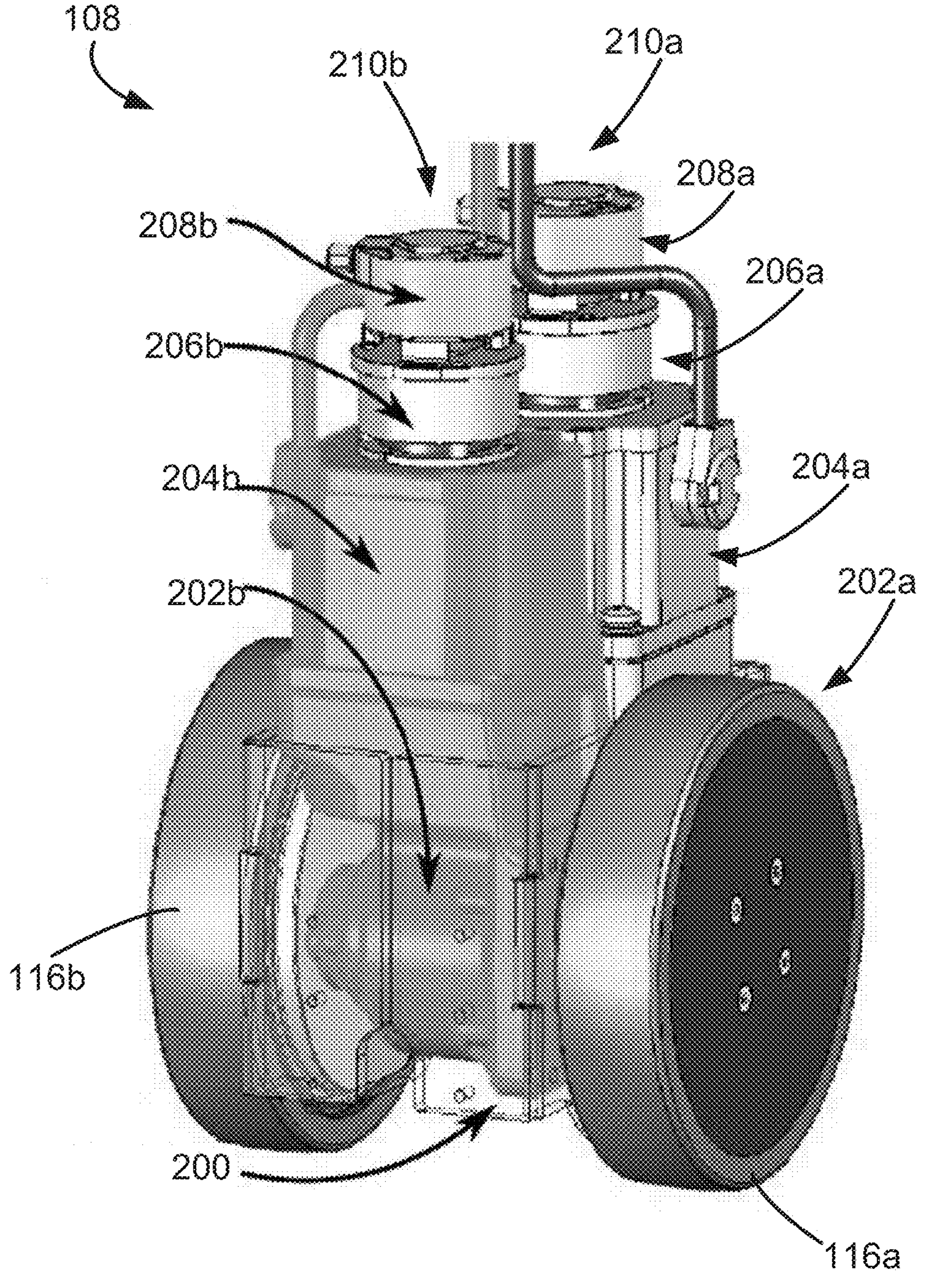
FIG. 2B illustrates a perspective view of an example drive system.
Figures 2C, 2D:
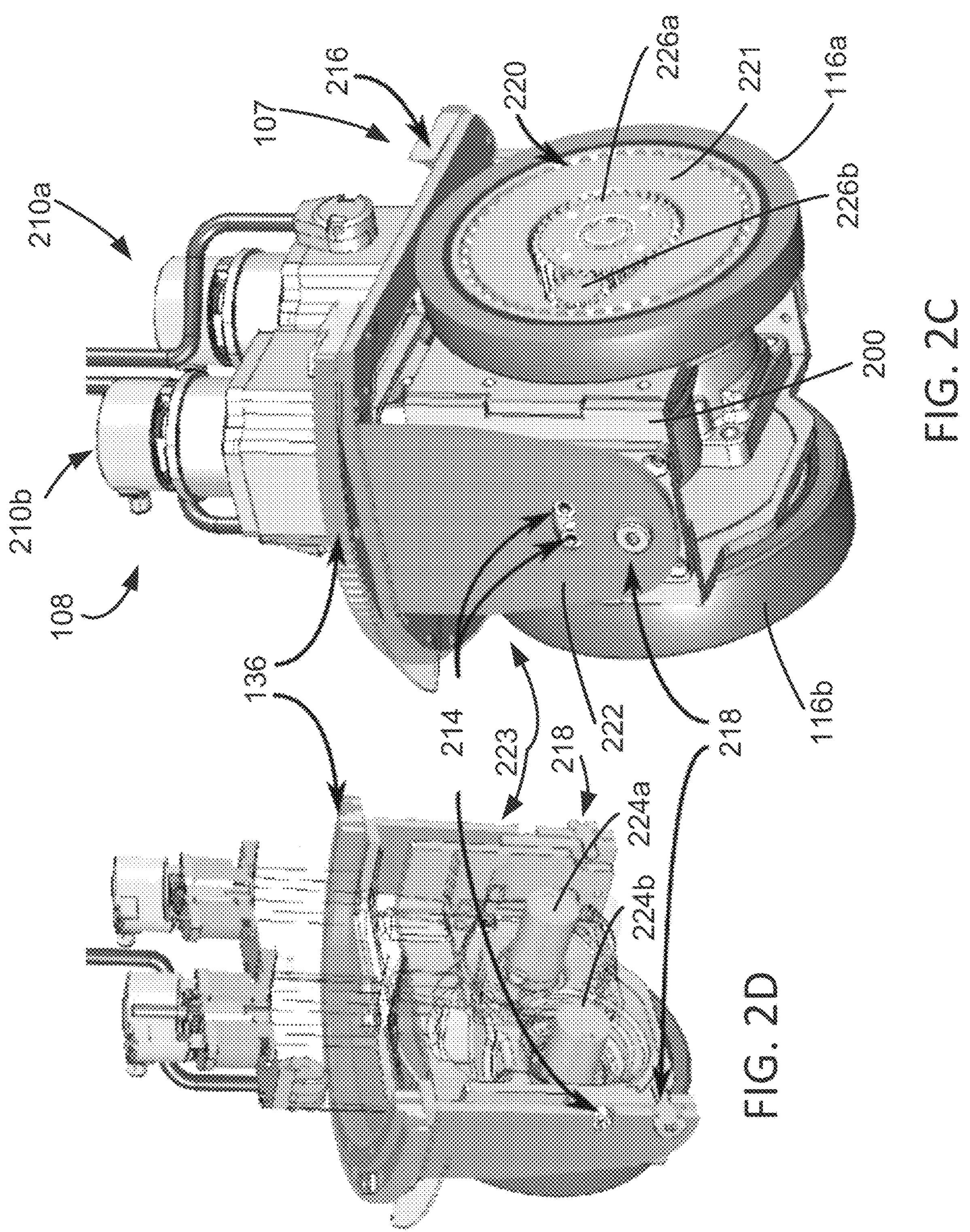
FIG. 2C illustrates a front perspective view of the example drive system, mounted in a turret assembly.
FIG. 2D illustrates a cross-sectional view of the example drive system.
Figure 2E:
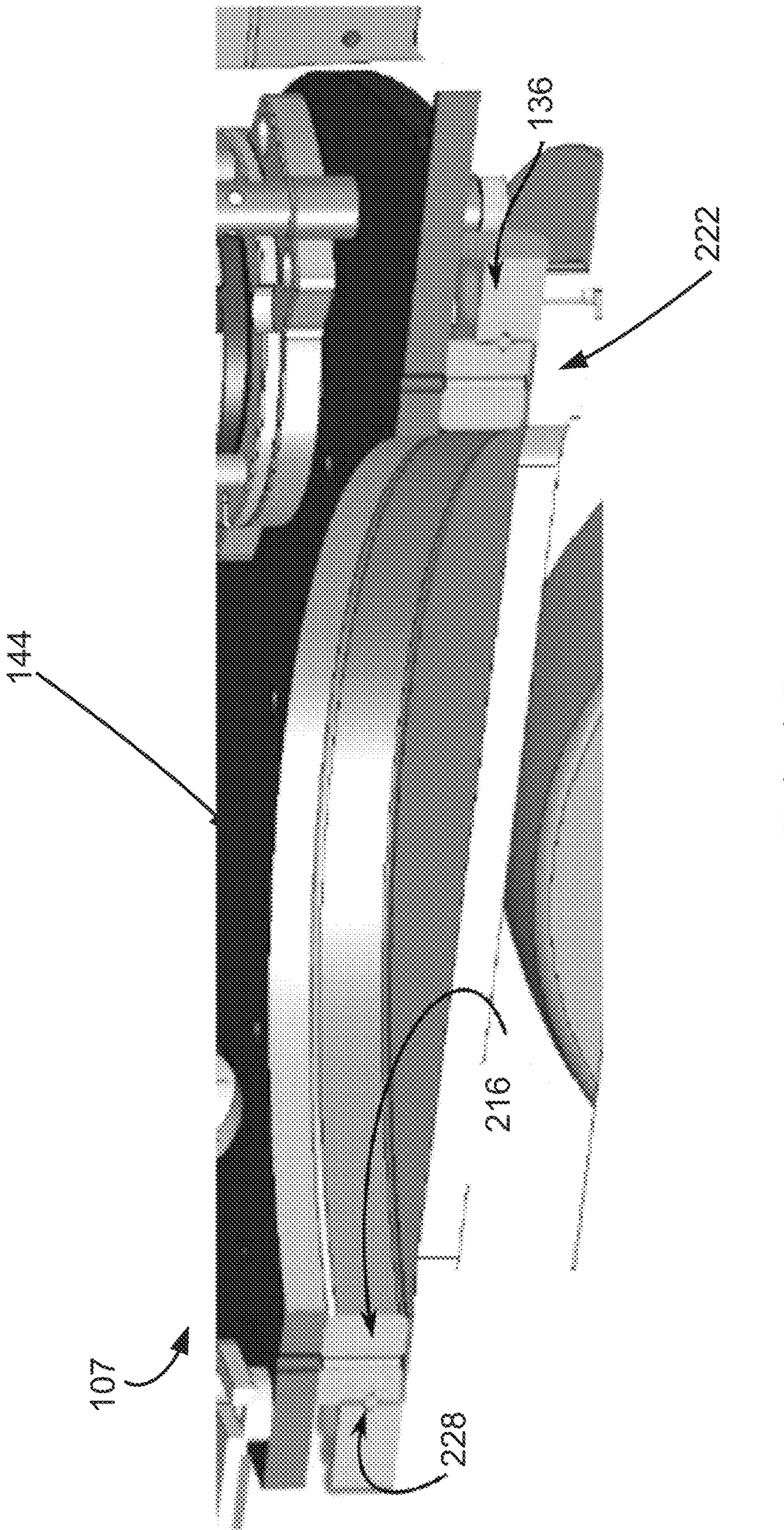
FIG. 2E illustrates an enlarged cross-sectional view of an example rotational system of the example drive system.
Figure 2F:
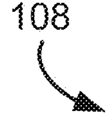
FIG. 2F illustrates another cross-sectional view of the example drive system.
Figure 2F:
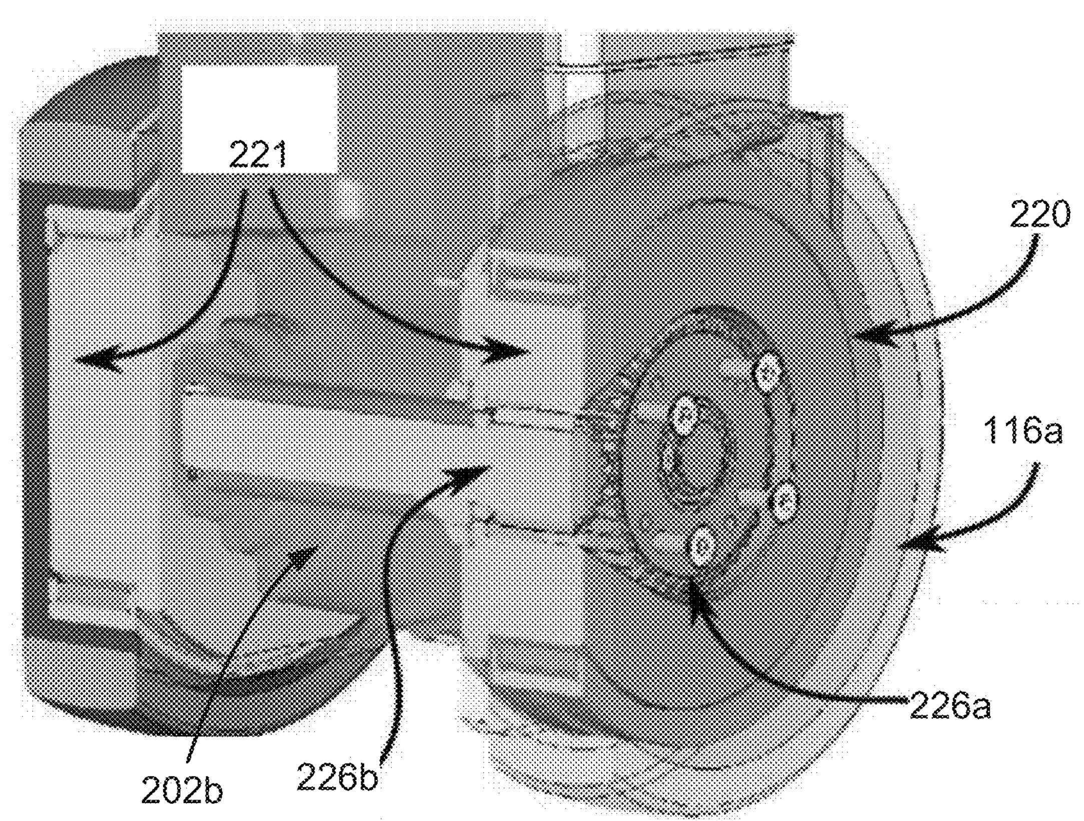

FIG. 2A illustrates a front interior view of the cart mover 100. FIG. 2B illustrates a perspective view of the drive system 108. FIG. 2C illustrates a front perspective view of the drive system 108. FIG. 2D illustrates a cross-sectional view of the drive system 108. FIG. 2E illustrates an enlarged cross-sectional view of the rotational system 107 of the drive system 108. FIG. 2F illustrates another cross-sectional view of the drive system 108.

As illustrated in FIG. 2B, the drive system 108 includes wheels 116*a* and 116*b* coupled to a housing 200. Each wheel is coupled to a drive system, such as drive systems 210*a* or 210*b*, which include one or more of a gearbox, gearmotor, brake, and encoder. For example, wheel 116*b* is coupled to drive system 210*a*, which includes gearbox 202*a*, gearmotor 204*a*, brake 206*a*, and encoder 208*a*. In another example, wheel 116*a* is coupled to drive system 210*b*, which includes gearbox 202*b*, gearmotor 204*b*, brake 206*b*, and encoder 208*b*. The components of the drive system may be vertically aligned with one another. For instance, the gearbox 202*a*, gearmotor 204*a*, brake 206*a*, and encoder 208*a* are arranged on top of one another. The brakes 206*a* and 206*b* may be inline brakes. The encoders 208*a* and 208*b* may be speed encoders to determine a rotation of the respective gearmotors. In one or more cases, the gearmotor 204*a* and gearmotor 204*b* are positioned adjacent to each other, in which one gearmotor is disposed behind the other. The gearboxes 202*a* and 202*b* are coupled to the housing 200, in which the output shafts 224*b* and 226*b* of each gearbox are coupled to the respective wheel, as illustrated in FIGS. 2C and 2D. For example, the output shaft 226*b* of gearbox 202*b* is operably coupled to the wheel 116*a*. The output shafts 224*b* and 226*b* of each gearbox 202*a* and gearbox 202*b* may extend between the respective wheel and gearbox perpendicular to the direction of travel. The output shafts 224*b* and 226*b* may extend in opposite directions from one another to the respective wheel.

In one or more cases, to reduce the profile of the reconfigurable drive system 108, the drive systems 210*a* and 210*b* may be oriented such that the output shafts 224*b* and 226*b* are offset from the center of the respective wheel. As such, the drive systems 210*a* and 210*b* may be positioned closer to one another. To drive the wheels 116*a* and 116*b*, the output shafts 224*b* and 226*b* may be operably coupled to a center portion of the respective wheel. The ends of the output shafts 224*b* and 226*b* may each include a geared end that interfaces with a geared portion of the respective wheel. For example, the end of output shaft 226*b* may include a geared end that meshes with a geared portion 226*a* of the wheel 116*a*, as illustrated in FIGS. 2C and 2F. Such orientation allows the gearmotor 202*b* to be off-center from wheel 116*a* while allowing the wheels 116*a* and 116*b* to be centered with one another. This orientation provides a more compact size of the reconfigurable drive system 108. The geared end of the output shaft 226*b* may be, for example, but not limited to a spur gear. The geared portion 226*a* of the wheel 116*a* may be, for example, but not limited to, a spur gear.

Wheels 116*a* and 116*b* are each supported by a drive unit including a bearing supported by a hub mounted on the housing 200. For example, wheel 116*a* is supported by bearing 220 supported by a hub 221 that is mounted on the housing 200. An end of the output shaft 226*b* of the gearbox 202*b* is geared to mesh with the geared portion 226*a* of wheel 116*a*. In some cases, the geared end of the output shaft 226*b* and the geared portion 226*a* are configured for gearing reduction, thereby providing less travel speed but more torque. Further, such geared configuration allows the wheels 116*a* and 116*b* to be located directly opposite each other and on the same axis, despite the gearmotors 202*b* and 202*a* being on different axes and located one behind the other. It is noted that the embodiments provided herein describe the gearmotors 202*a* and 202*b* and the respective output shafts 224*b* and 226*b* being off-center from the respective wheels 116*a* and 116*b*. However, it should be understood that embodiments are contemplated herein in which the output shafts 224*b* and 226*b* may be centered with the respective wheels 116*a* and 116*b*, such that the output shafts 224*b* and 226*b* are directly coupled to the center portion of the respective wheels 116*a* and 116*b* without utilizing additional gears, such as geared portion 226*a*.

Returning to FIGS. 2C and 2D, the reconfigurable drive system 108 may include a pivotable unit 223 that couples the rotational system 107 to the housing 200. The pivotable unit 223 includes a rigid support member 222 that is provided over the housing 200 and coupled to the housing 200 via drive pivots 218. The drive pivots 218 may be centered on both sides of the housing 200, such that the pivotable unit 223 rotates about the axis of the drive pivots 218. The pivotable unit 223 may include one or more pivot end stops 214 to limit the axis of rotation that the pivotable unit 223 rotates about the axis of the drive pivots 218. The pivotable unit 223 allows the rotational system 107 to pivot about the housing 200 such that wheels 116*a* and 116*b* may maintain floor contact when traversing uneven floors and preventing unintentionally steering the rotational system 107 in an unintended orientation.

The rotational system 107 may rotatably couple the reconfigurable drive system 108 to the chassis 101 of the cart mover 100. As such, the rotational system 107 may be configured to rotate within the housing 102 of the cart mover 100 while be coupled to the chassis 101. In an example, the rotational system 107 may include for example, but not limited to, a slewing ring having an outer ring, such as ring gear 136, and an inner ring 216 that interface with one another. The inner ring 216 may be a stationary support mounted to the turret support plate 144. The ring gear 136 may be a rotatable support that is mounted in the rotational system 107. Ball bearings 228 may be retained between the inner ring 216 and ring gear 136 allowing the rings to rotate, one within the other. For example, the ball bearings 228 may be slewing bearings, in which the ring gear 136 has gear teeth on the outer perimeter of the ring gear 136. It is noted that the slewing ring provides an example of one means of providing a rotatable coupling between the rotational system 107 and the chassis 101 of the cart mover 100. However, it should be understood that other embodiments are contemplated to provide the rotatable coupling functionality.

The ring gear 136 is configured to interface with the turret lock gear 138, as illustrated in FIG. 2A. The brake 140 and steering angle encoder 142 are coupled to the turret lock gear 138 on a same vertical axis. The steering angle encoder 142 may measure the orientation of the turret lock gear 138 and therefore, the orientation of the ring gear 136 to determine an overall orientation of the reconfigurable drive system 108 with respect to the chassis 101. Further, the brake 140 may be an electro-magnetic brake that is configured to lock an orientation of the turret lock gear 138 thereby locking the orientation of ring gear 136, and in turn, locking the overall orientation of the reconfigurable drive system 108. As such, the rotation of the rotational system 107 may be locked to the chassis 101 or unlocked to freely rotate within the chassis 101.

Whether the rotational system 107 is locked or unlocked, the reconfigurable drive system 108 steers the cart mover 100 whenever the wheels 116*a* and 116*b* rotate at different rotations per minute (RPM) and rotate in the came direction. For the cases in which the rotational system 107 is unlocked, such that the reconfigurable drive system 108 may freely orient itself in the chassis 101, the cart mover 100 may deploy the straight running wheels 120*a* and 120*b* to implement tricycle kinematics steering. For the cases in which the rotational system 107 is locked, such that the reconfigurable drive system 108 is oriented in a fixed position with respect to the chassis 101, the cart mover 100 may deploy the omni-directional wheels 118*a* and 118*b* to implement differential kinematics steering. In some cases, the wheels 118*a* and 118*b* may be deployed from the same mechanisms that deploy the wheels 120*a* and 120*b*. For example, the wheels 118*a* and 120*a* may be paired and connected via a pivoting mechanism and moved via an actuator coupled to the chassis 101. The wheels 118*b* and 120*b* may be paired and connected via another pivoting mechanism and moved via an actuator coupled to the chassis 101. An end of the actuator (e.g., actuator 302*a* illustrated in FIG. 3B) of the support wheel system 112 and support wheel system 114 may each be coupled to the pivoting mechanism (e.g., pivoting mechanism 303 illustrated in FIG. 3B) and/or the mounts of wheels 120*a* and 120*b*. As the actuator rods extend or retract, the wheels 118*b* and 120*b* and wheels 118*a* and 120*a* of each pivot mechanism may rotate one wheel down to contact the ground and the other wheel up out of contact with the ground. One wheel of each pair may be deployed from the cart mover 100 to provide a three-point stability triangle including the wheels 116*a* and 116*b* of the reconfigurable drive system 108 as one point. In other cases, the wheels 118*a* and 118*b* may be deployed from their own respective mechanisms independent from the mechanisms that deploy the wheels 120*a* and 120*b*.

Figures 3A, 3B, 3C:
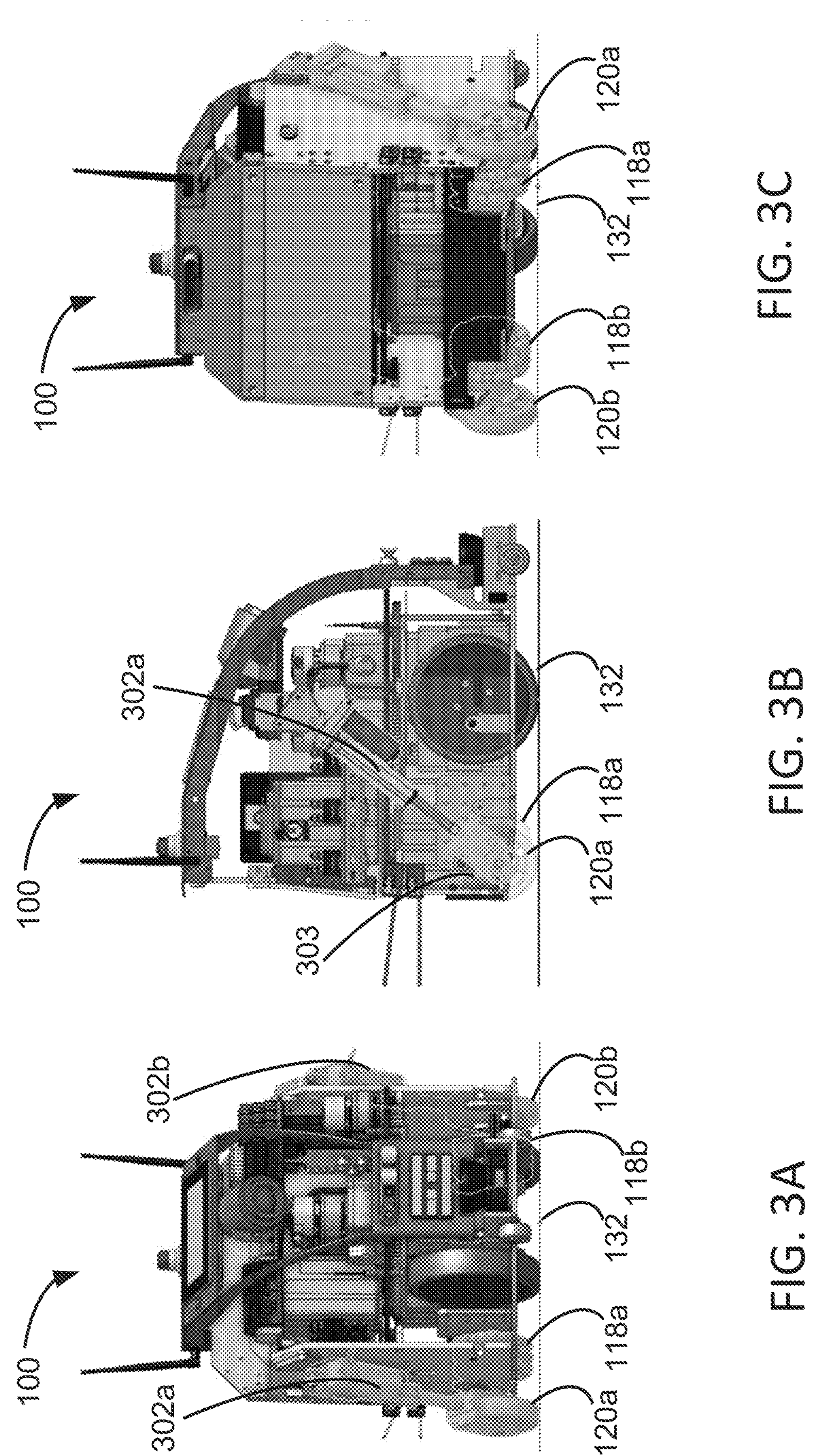
FIGS. 3A-3C illustrate various perspective views of the interior of the example cart mover with the non-swiveling wheels deployed and the cart mover parallel with the floor.
Figures 4A, 4B, 4C:
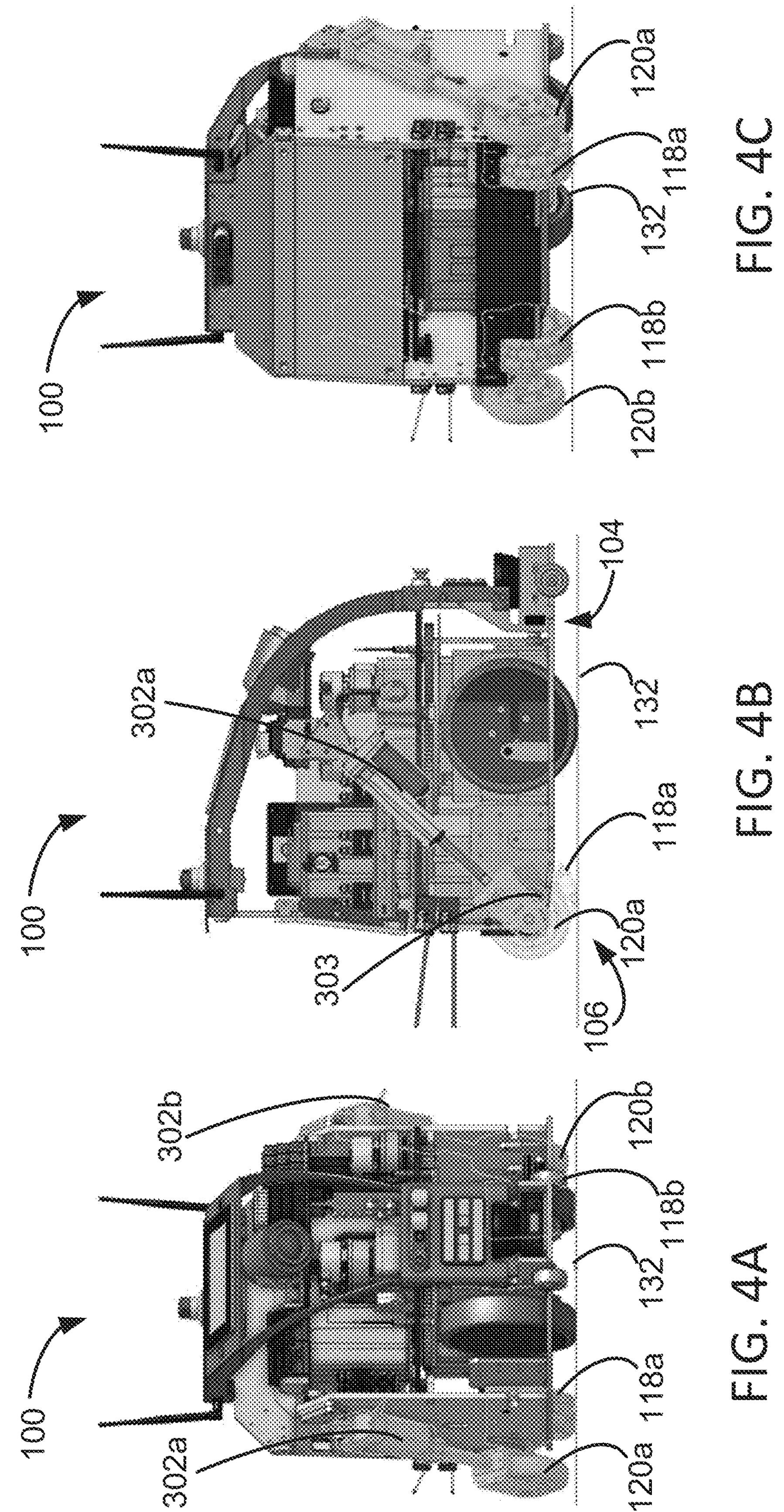
FIGS. 4A-4C illustrate various perspective views of the example cart mover with the omni-directional wheels deployed and the cart mover parallel with the floor.

FIGS. 3A-3C illustrate various perspective views of the interior of the example cart mover 100 with the non-swiveling wheels 120*a* and 120*b* deployed and the cart mover 100 parallel with the floor 132. FIGS. 4A-4C illustrate various perspective views of the interior of the example cart mover 100 with the omni-directional wheels 118*a* and 118*b* deployed and the cart mover 100 parallel with the floor 132. In one or more cases, the actuators 302*a* and 302*b* may deploy the actuator rods a distance, such that the wheels 120*a* and 120*b* raise while simultaneously lowering the wheels 118*a* and 118*b* towards the ground 132. For example, as the actuators 302*a* and 302*b* extend, the pivoting mechanism 303 pivots the wheels 120*a* and 120*b* away from the respective actuators 302*a* and 302*b* and in an upwards direction as the pivoting mechanism 303 pivots the wheels 118*a* and 118*b* towards the respective actuators 302*a* and 302*b* and in a downwards direction towards the ground 132. During the transition, the hitching end 106 of chassis 101 may dip slightly when both sets of wheels 118*a*, 120*a*, and 118*b*, 120*b* contact the floor 132. As the actuators 302*a* and 302*b* continue to deploy the wheels 120*a* and 120*b*, the hitching end 106 of the chassis 101 raises, such that the cart mover 100 is parallel with the ground 132.

Figures 5A, 5B, 5C:
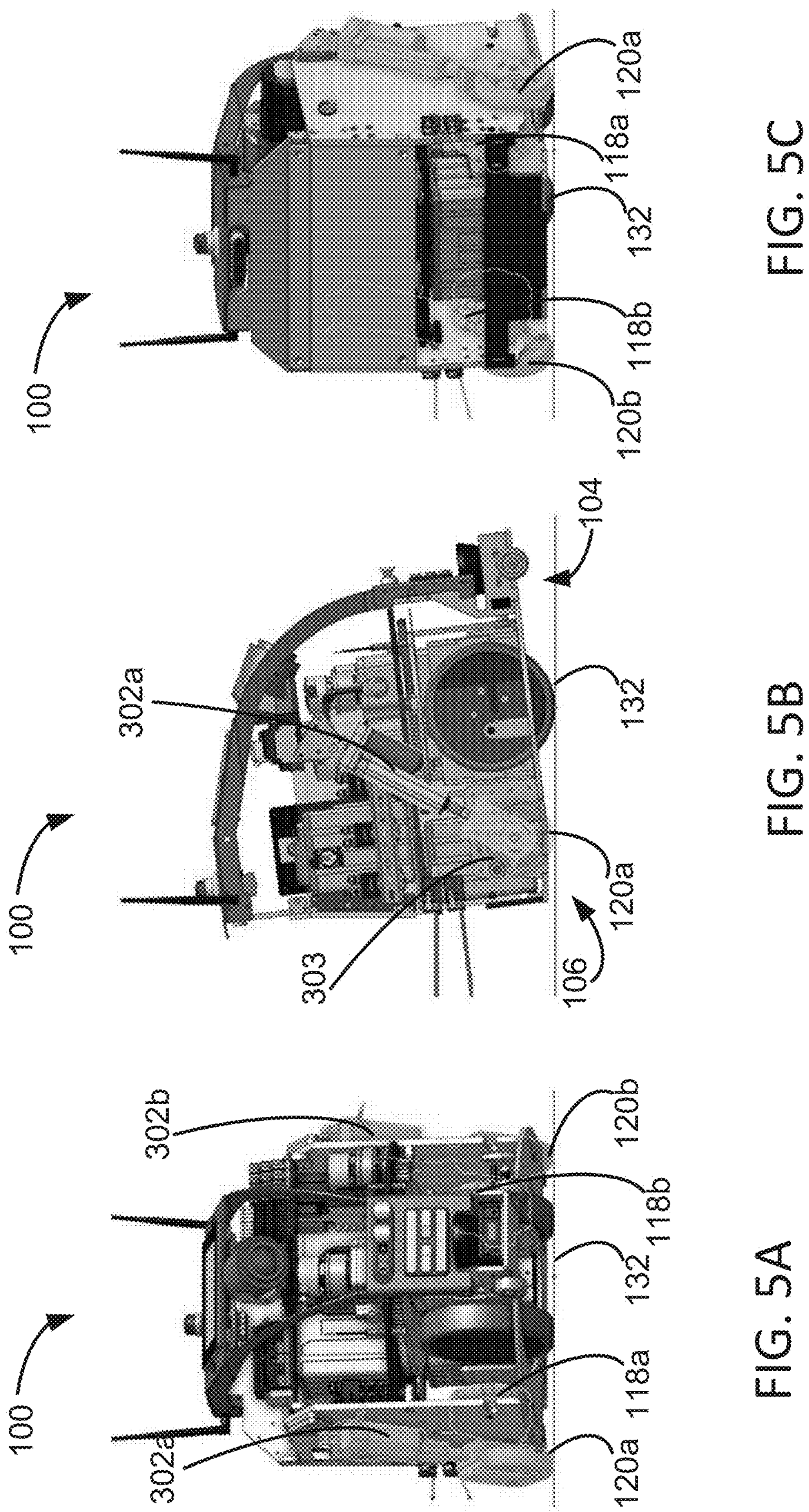
FIGS. 5A-5C illustrate various views of the example cart mover with the non-swiveling wheels and the omni-directional wheels both in a retracted position and thus the rear of the cart mover angled towards the floor.

FIGS. 5A-5C illustrate various perspective views of the interior of the example cart mover 100 with the omni-directional wheels 118*a* and 118*b* in a retracted position and the non-swiveling wheels 120*a* and 120*b* deployed a distance such that the rear of the cart mover 100 angled towards with the floor 132. For example, the actuators 302*a* and 302*b* may retract the rods a farther distance to dip the hitching end 106 of the cart mover 100 a greater distance and raising the driven end 104 of the cart mover 100. Such motion and positioning of the cart mover 100 improves the efficiency of the cart mover 100 hitching a cart.

Figures 5D, 5E, 5F, 5G:
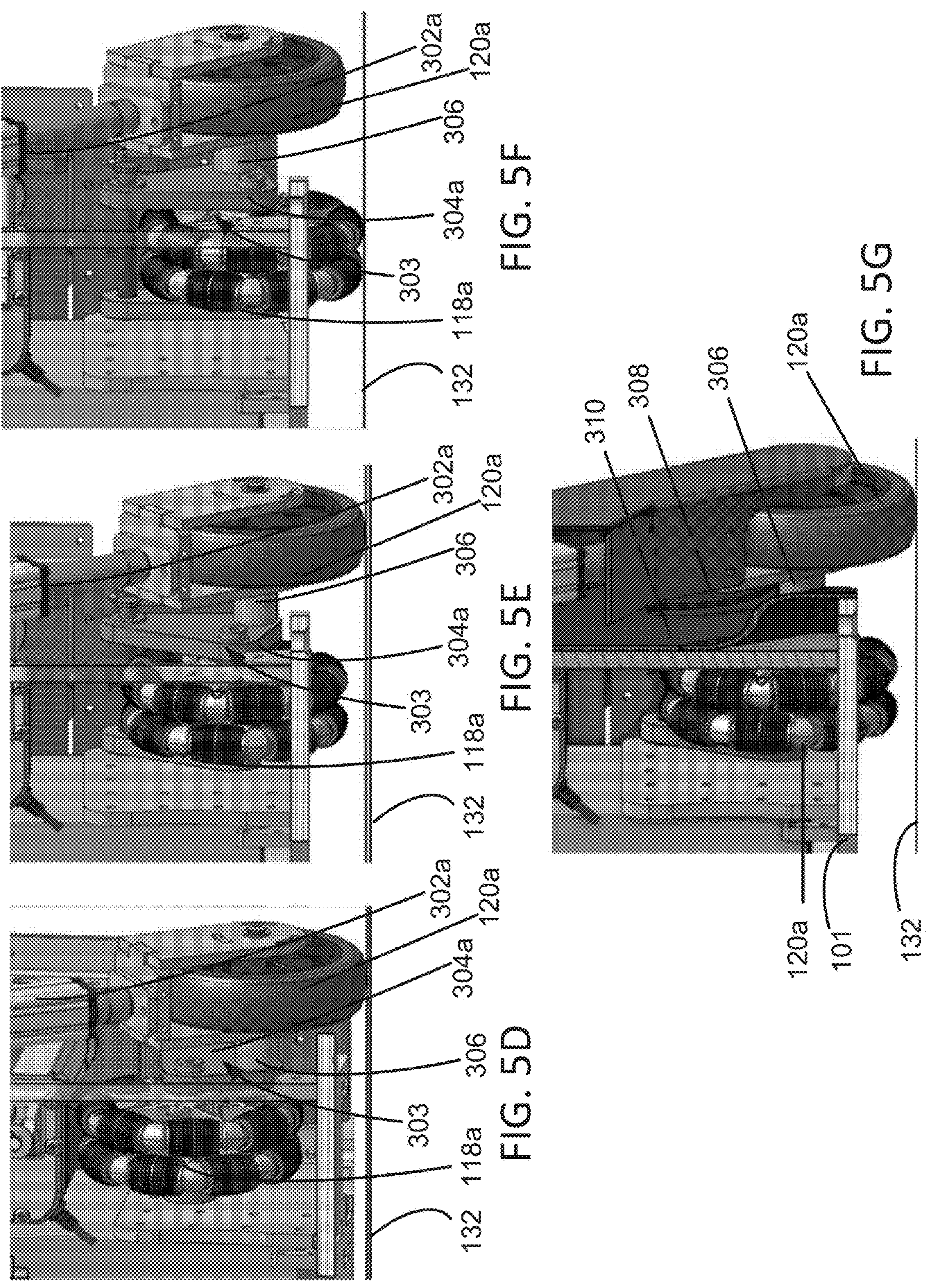
FIGS. 5D-5F illustrate enlarged views of a pivoting mechanism of the example cart mover, in which the support wheels are able to be switched, from omni-directional wheels to straight-running.
FIG. 5G illustrates another view of the pivoting mechanism illustrated in FIG. 5E FIGS. 6A and 6B illustrate perspective views of the example cart mover configured in tricycle mode, with the drive turret turned with the non-swiveling support wheels deployed, as shown in 6A, and with the omni-directional wheels deployed, as shown in 6B.

FIGS. 5D-5G illustrate enlarged views of a pivoting mechanism 303 that couples wheels 118*a* and 120*a*. The pivoting mechanism 303 may include an offset plate 304*a* which couples the wheels 118*a* and 120*a* to one another, such that the center of each wheel 118*a* and 120*a* are offset from one another. The wheel 120*a* may be disposed away from the offset plate 304*a* by a spacing member 306. An actuator 302*a* may couple the pivoting mechanism 303 to the chassis 101. As the actuator 302*a* extends or retracts the rod of the actuator 302*a*, the actuator 302*a* pushes or retracts the offset plate 304*a* such that the wheels 118*a* and 120*a* rotate either towards the ground 132 or away from the ground 132. In one or more cases, the spacing member 306 may travel along a guide 308 of a support plate 310 of the chassis 101. The guide 308 may maintain the direction of deployment of the wheels 118*a* and 120*a*. FIG. 5D illustrates an isolated view of wheels 118*a* and 120*a* of the cart mover 100 in a dipped position. In the dipped positioned, the actuators, such as actuator 302*a*, is fully retracted such that wheels 118*a* and 118*b* are retracted into the housing 102, and the wheels 120*a* and 120*b* are deployed and contact the ground 132. FIGS. 5E and 5G illustrated an isolated view of wheels 118*a* and 120*a*, in which the actuators are extended a farther distance than that illustrated in FIG. 5D. As such, by extending the actuator a farther distance, the wheels 120*a* and 120*b* are pushed farther down and the wheels 118*a* and 118*b* are rotated towards the ground 132. FIG. 5F illustrated an isolated view of wheels 118*a* and 120*a*, in which the actuators are fully extended, such that the wheels 120*a* and 120*b* are rotated upwards lifting the wheels 120*a* and 120*b* off the ground 132 and lowering the wheels 118*a* and 118*b* onto the ground 132. In one or more cases, the axle of the wheels 120*a* and 120*b* each extend through the respective wheel to the bottom hitch-side point of the respective swiveling plate, such as the triangular swiveling plate 304*a*. The axle of the wheels 118*a* and 118*b* extend to the bottom drive side point of the respective swiveling plate, such as the triangular swiveling plate 304*a*. The swiveling plates rotate forward and back, based on the amount of extension of the linear actuator. The swiveling plates may rotate about the respective pin at the top of the triangular plate, which is mounted in the side-frame plate of the chassis 101. The increased extension of the actuator rods as the swiveling plates switches the wheel configuration from dipped (chassis low) to non-swiveling wheels to omni directional wheels. The amount of additional extension of the actuators between the two types of support wheels is minimal, As such, the switching between configurations is very fast as very little actuator movement required.

Figure 6B:
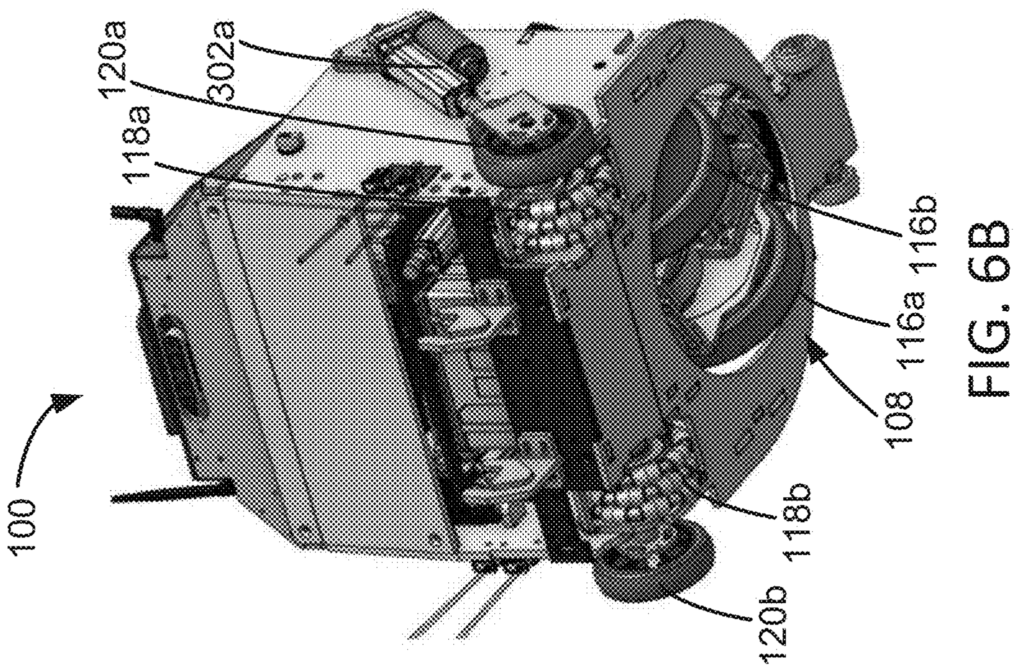
FIGS. 6C and 6D illustrate perspective views of the example cart mover configured in a differential mode.
FIGS. 6E and 6F illustrate perspective views of the example cart mover configured in a hitching mode.
Figure 6A:
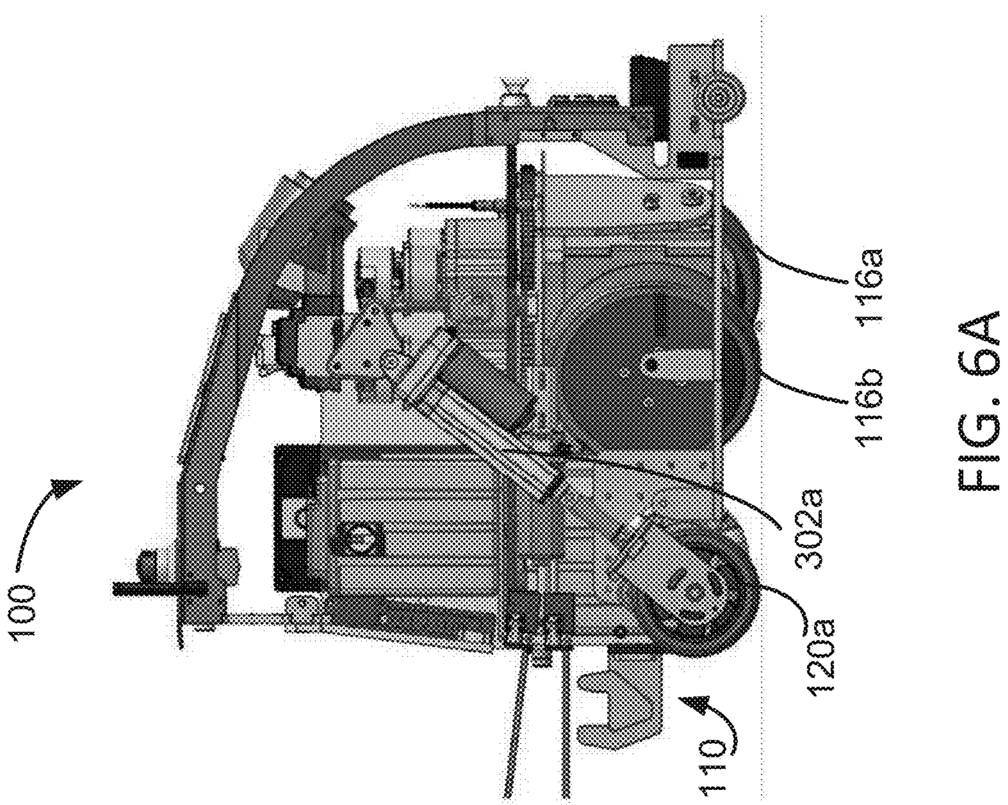

FIGS. 6A and 6B illustrate perspective views of the example cart mover 100 configured in a tricycle steering mode. In the tricycle steering mode, the rotational system 107 is configured in an unlocked state to allow the reconfigurable drive system 108 to rotate within the chassis 101. Further, the cart mover 100 positions the actuator 302*a* of support wheel system 112 and the actuator 302*b* of support wheel system 114 to a middle position such that the wheels 120*a* and 120*b* contact the ground and the cart mover 100 is parallel with the ground. For example, the cart mover 100 may deploy the actuator 302*a* and actuator 302*b* at a position of about 88 mm of extension. In the tricycle steering mode, the wheels 118*a* and 118*b* are raised from the ground. The reconfigurable drive system 108 may freely rotate within the chassis 101, such that driving one of wheels 116*a* and 116*b* faster than the other reorients the reconfigurable drive system 108 relative to the wheels 120*a* and 120*b* within the chassis 101.

Figure 6D:
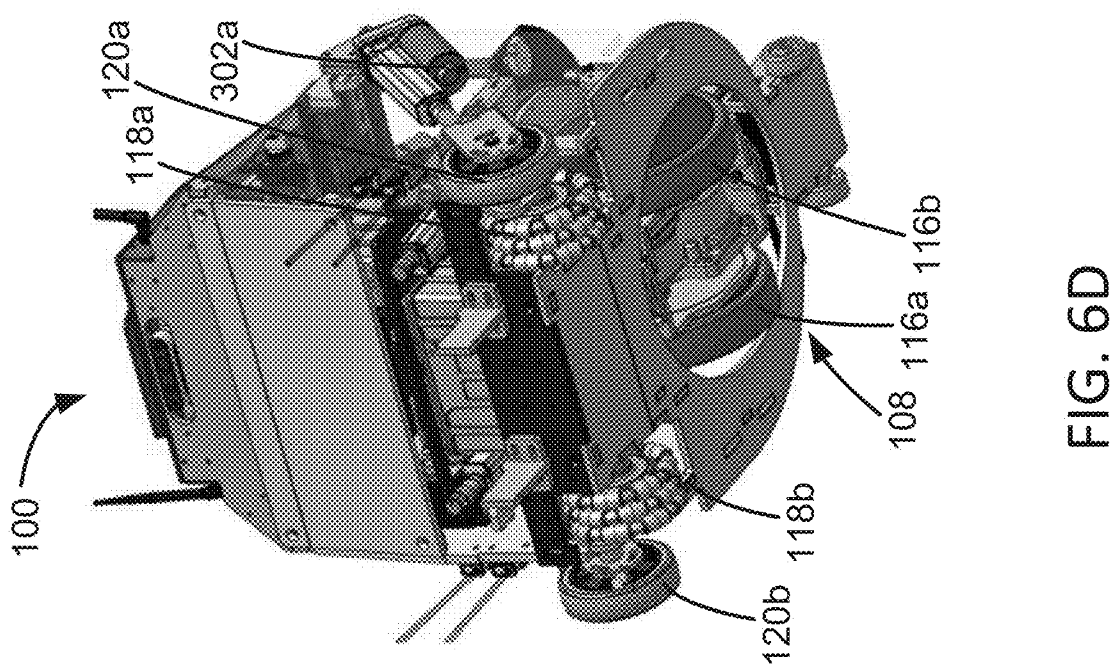
Figure 6C:
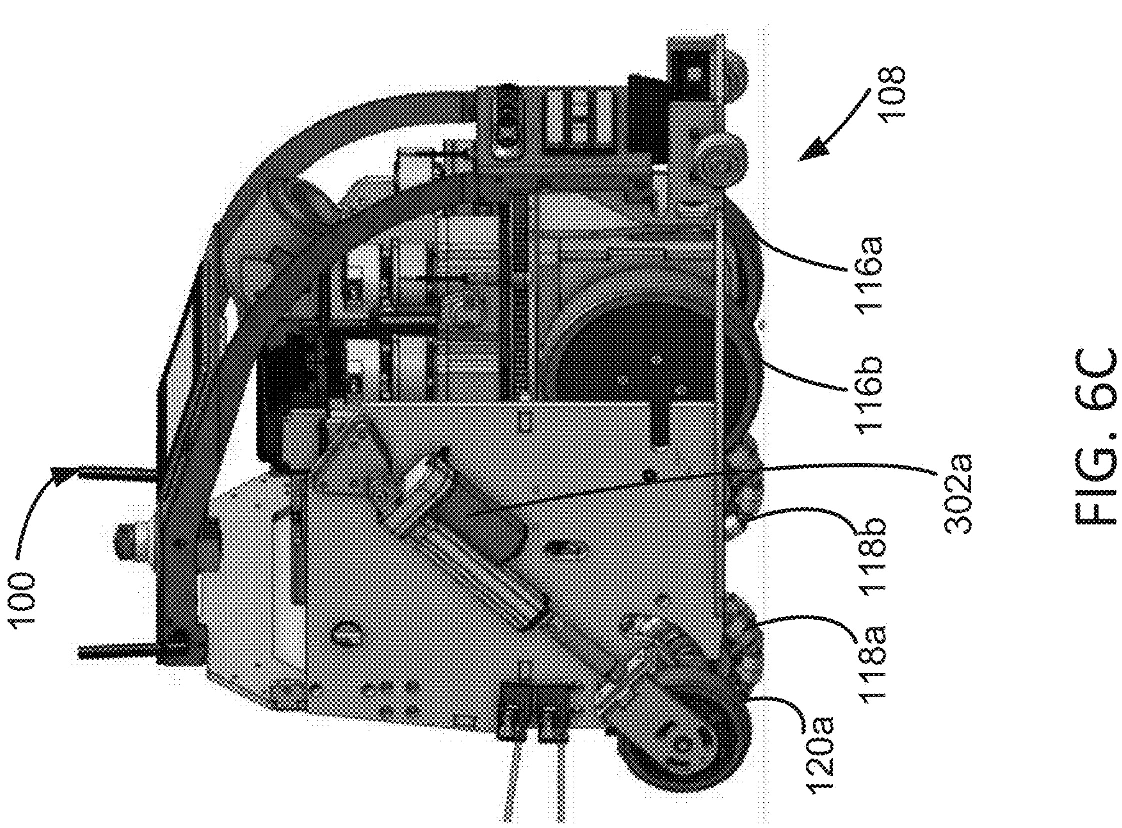

FIGS. 6C and 6D illustrate perspective views of the example cart mover 100 configured in a differential steering mode. In the differential steering mode, the rotational system 107 is configured in a locked state to prevent the reconfigurable drive system 108 from rotating within the chassis 101. Further, the cart mover 100 positions the actuator 302*a* of support wheel system 112 and the actuator 302*b* of support wheel system 114 a farther distance than the middle position that deploys the wheels 120*a* and 120*b*, such that the wheels 118*a* and 118*b* contact the ground and the cart mover 100 is parallel with the ground. For example, the cart mover 100 may deploy the actuator 302*a* and actuator 302*b* to a position of about 14 mm more than the extension corresponding to the middle position, such that the actuators 302*a* and 302*b* are extended about 102 mm. In the differential steering mode, the wheels 120*a* and 120*b* are rotated up and away from the ground. Further, as the rotational system 107 is locked, driving one of wheels 116*a* and 116*b* faster than the other reorients the entire cart mover 100.

Figures 6E, 6F:
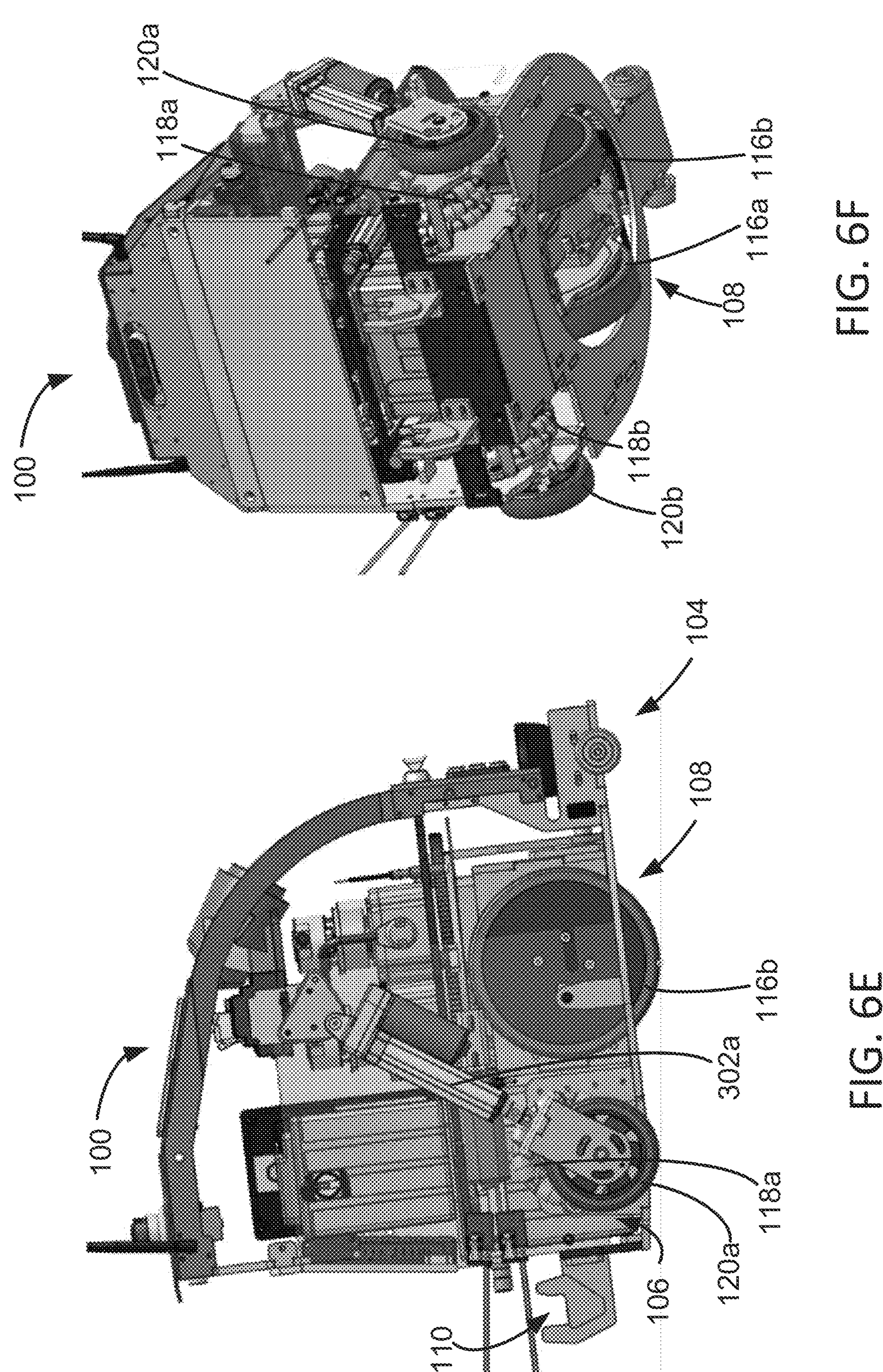

FIGS. 6E and 6F illustrate perspective views of the example cart mover 100 configured in a hitching mode. To configure the cart mover 100 in the hitching mode, the actuator 302*a* of support wheel system 112 and the actuator 302*b* of support wheel system 114 may be retracted such that the wheels 118*a* and 118*b* are retracted up and away from the ground and the wheels 120*a* and 120*b* are deployed a distance that dips the hitching end 106 towards the ground. Further, the reconfigurable drive system 108 is oriented in a straight direction of travel relative to the chassis 101. For example, the cart mover 100 may retract the actuator 302*a* and actuator 302*b* up to and including 62 mm to a minimum extension of 40 mm. The actuators 302*a* and 302*b* may be retracted to an extension of less than 62 mm based on one or more of the type of cart 130 and hitching system 110. Reducing the distance/angle that the hitching end 106 dips towards the ground reduces the time needed to hitch a cart. Once in the hitching mode, the hitching arms of the hitching system 110 may travel underneath an end of the cart (e.g., a front of the cart). The cart mover 100 may move towards the cart to a predetermined distance. The cart mover 100 may then re-extend the actuators 302*a* and 302*b* to raise the hitching end 106 of the cart mover 100, and the hitching arms of the hitching system 110 engage the cart. The actuators 302*a* and 302*b* may be extended an associated distance with the next type of travel (e.g., either the tricycle steering mode or the differential steering mode) and deploy either the wheels 118*a* and 118*b* or wheels 120*a* and 120*b* as described herein and raise the chassis 101 to be parallel with the ground.

Figure 7A:
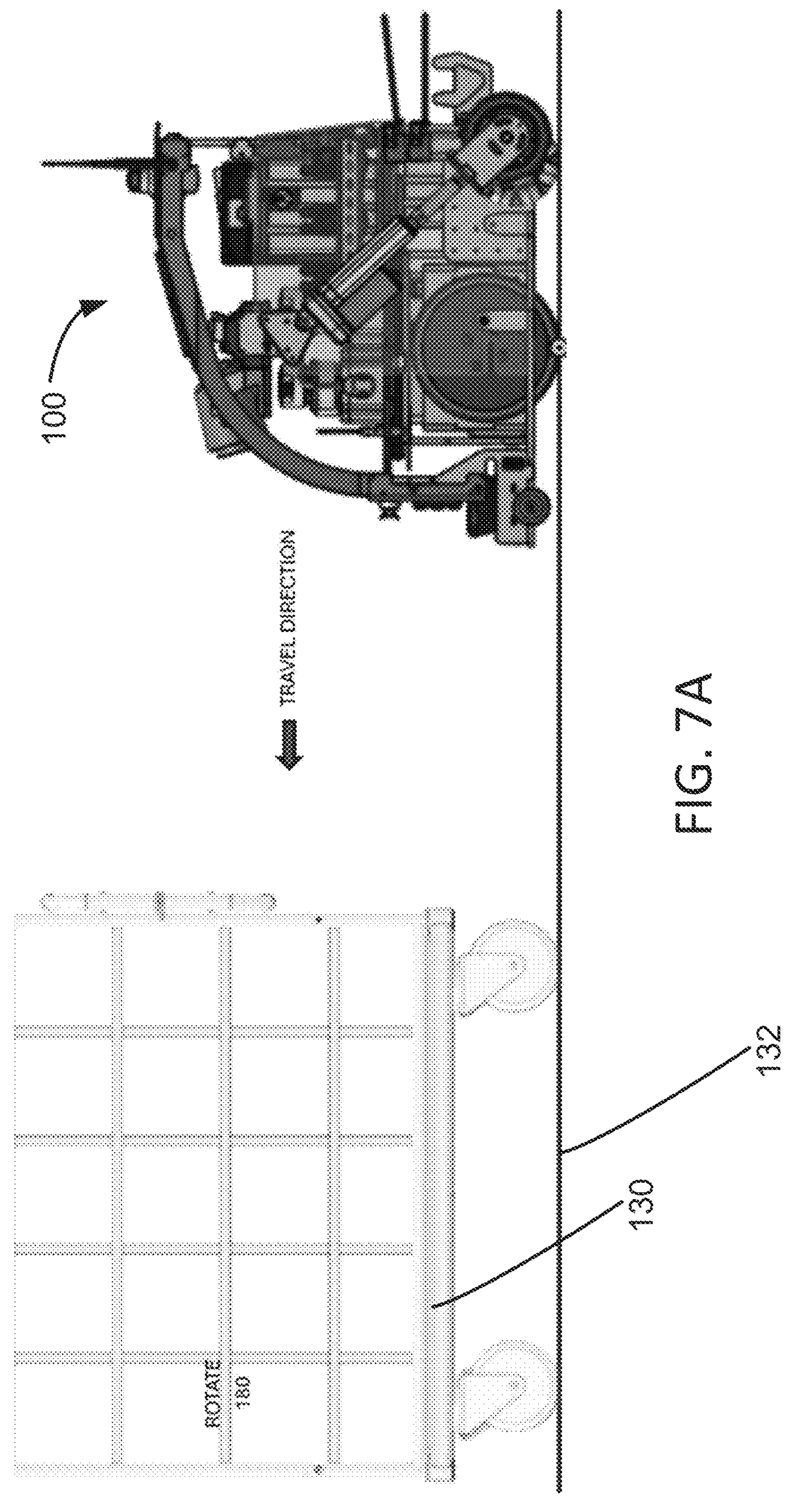
FIG. 7A illustrates the example cart mover traveling to an example cart, facing the cart in the opposite orientation needed to hitch with the cart.
Figures 7B, 7C, 7D, 7E, 7F:
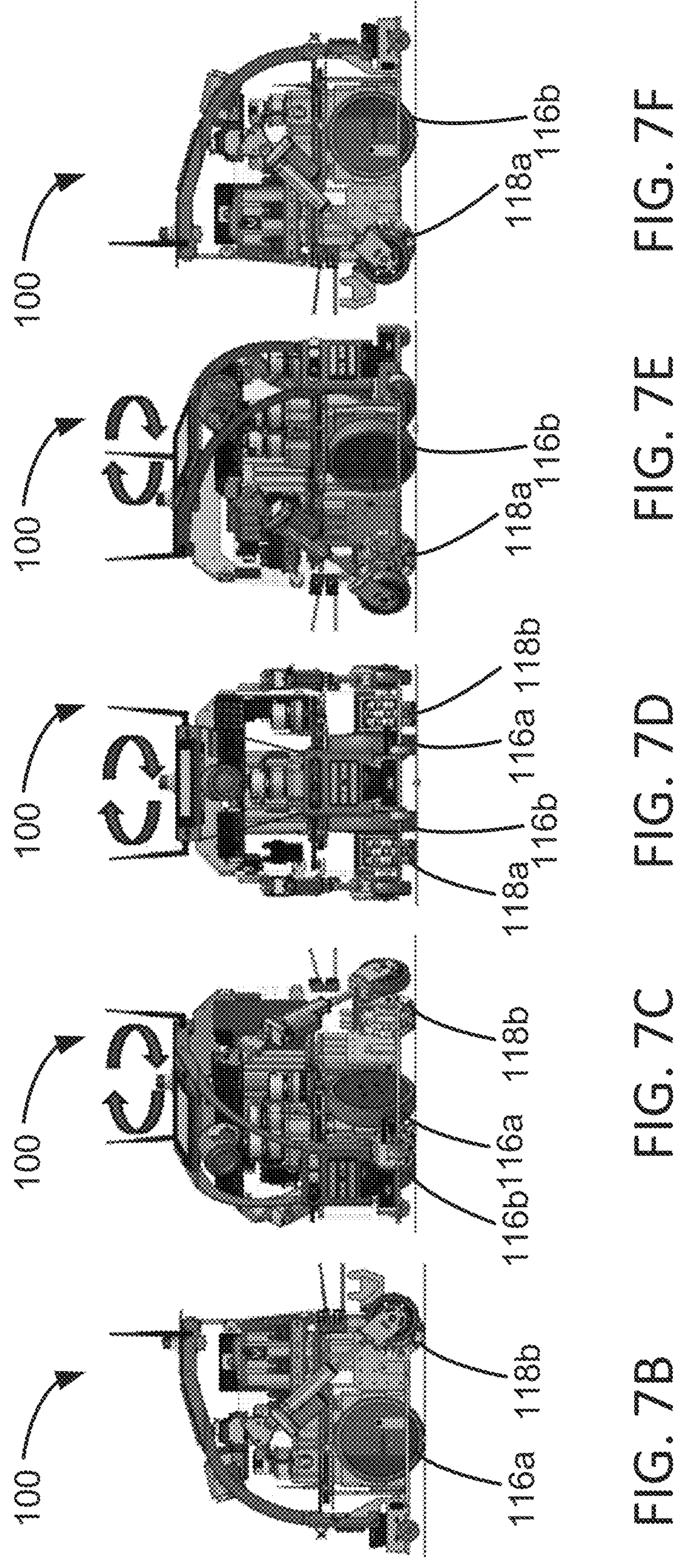
FIGS. 7B-7F illustrates the example cart mover rotating itself, using differential steering with the omni wheels deployed, almost 360 degrees (typically 180 degrees of rotation required to reach the hitching positing).
Figure 7H:
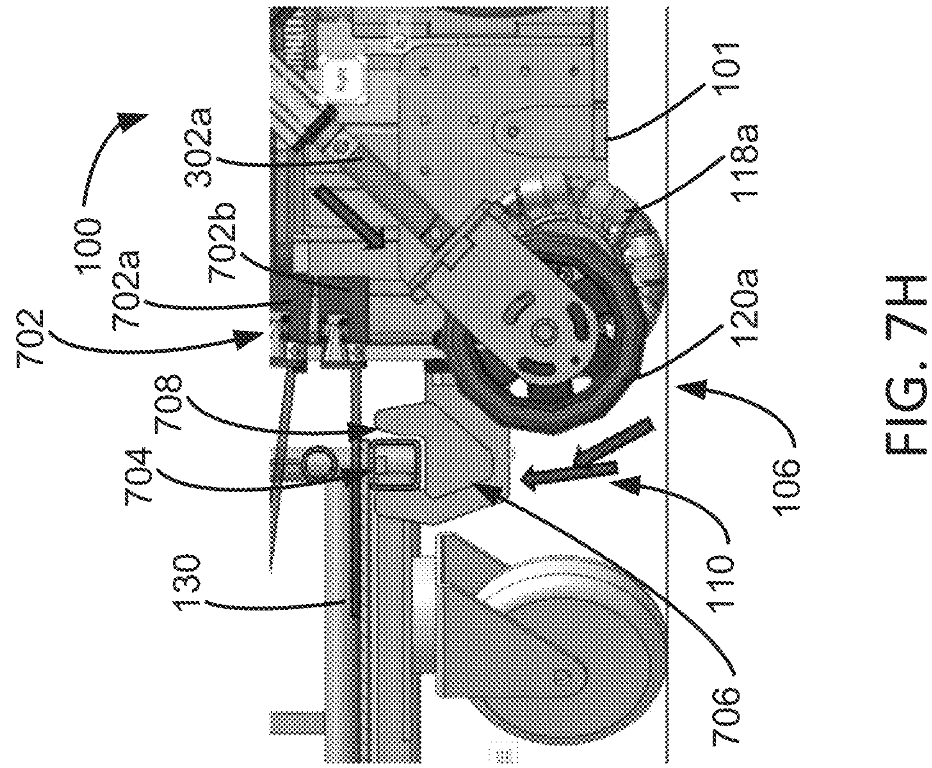
FIGS. 7G-7I illustrate the example cart mover hitching to the example cart using example hitch hands.
Figure 7G:
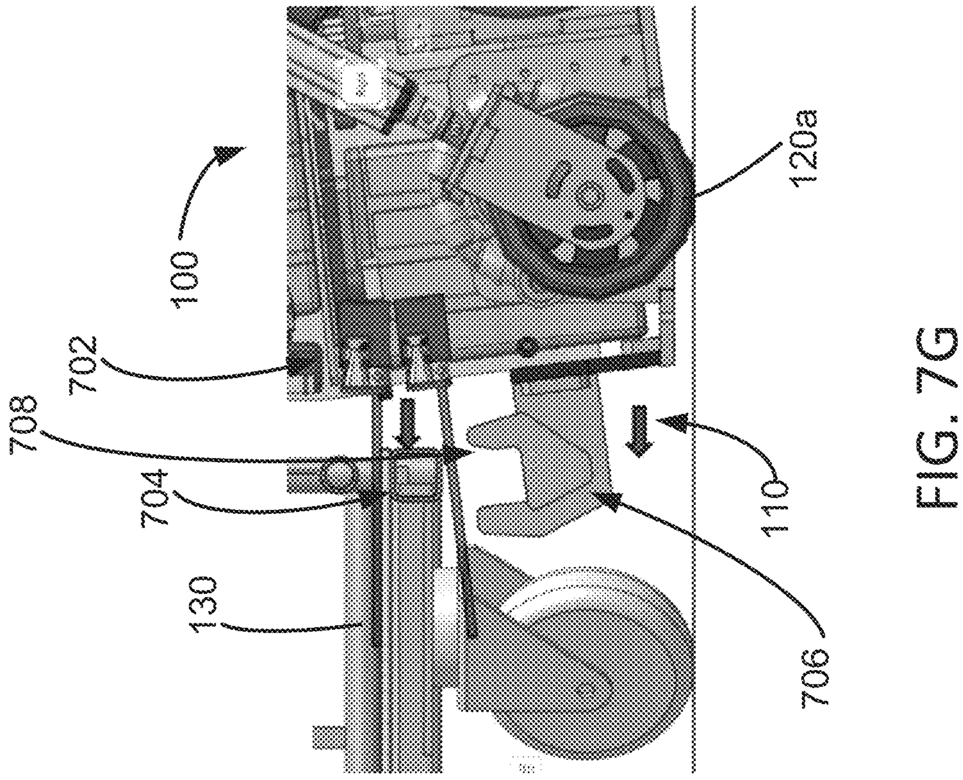
Figure 7I:
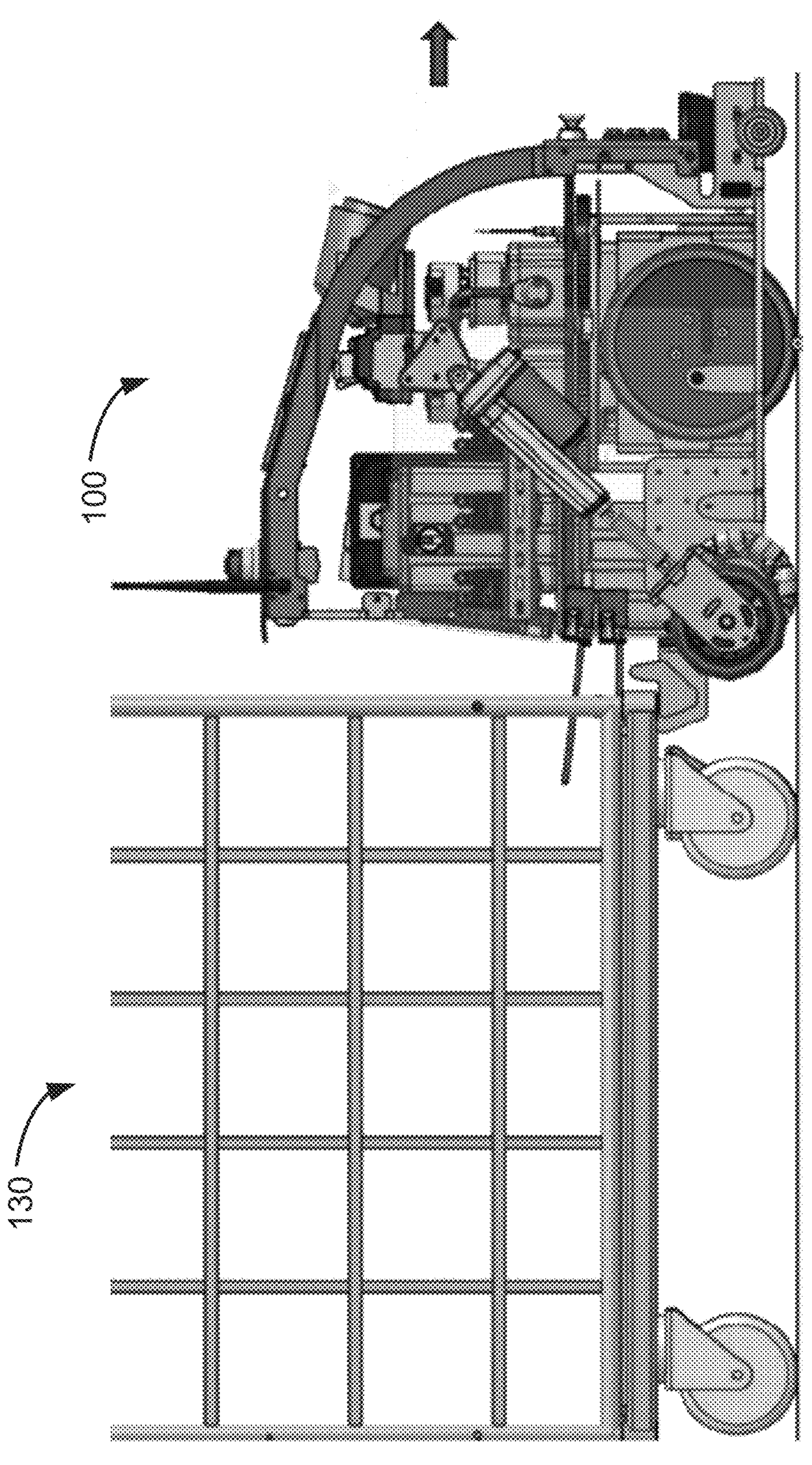

FIG. 7A illustrates the cart mover 100 traveling towards the cart 130. FIGS. 7B-7F illustrates the cart mover 100 positioning itself to hitch to the cart 130. FIGS. 7G-7I illustrate the cart mover 100 hitching to the cart 130. It is noted that either during the approach of the cart mover 100 to the cart 130 or after cart mover 100 has arrived near the cart 130, the cart mover 100 may reorient itself relative to the cart 130 to be a short distance from the cart 130, on the same centerline as the cart 130, and parallel to the cart 130. The cart mover 100 may achieve this orientation by using, for example, simultaneous localization and mapping (SLAM). For example, the cart mover 100 may use SLAM to travel near enough to the cart 130 to then use a rear-facing depth camera to ensure the cart mover 100 and the cart 130 are both on the same centerline. Further, the cart mover 100 may include distance measuring lasers 702, as illustrated in FIGS. 7G and 7H, that are positioned on one or both sides of the cart mover 100. For example, lasers 702*a* and 702*b* may be positioned to one side of the cart mover 100. Laser 702*b* may measure distance and parallelism when the chassis 101 is not dipped. Laser 702*a* may measure the same distance and parallelism when the hitching end 106 of the chassis 101 is dipped and approaching the cart 130.

FIG. 7A illustrates the cart mover 100 travelling on the ground 132 towards the cart 130. In one or more cases, the cart mover 100 may include scanners on the driven end 104 and the hitching end 106 of the cart mover 100 to detect objects in the path of the cart mover 100. The scanners may be, for example, but not limited to, two-dimensional safety lidar scanners. In some cases, the cart mover 100 may move independently (i.e., not hitched to the cart 130) while configured in the tricycle steering mode. However, it should be noted that the cart mover 100 may also move independently while configured in the differential steering mode. When the cart mover 100 nears the cart 130, the cart mover 100 may stop approximately on a centerline with the cart 130. The cart mover 100 assesses its position and alignment with respect to the cart 130. In an example, the cart mover 100 may determine position and alignment using one or more of lasers 702, depth cameras, lidar sensors, and any other available like sensor feedback. For the cases in which the cart mover 100 determines that the position or angular of the cart mover 100 needs to be adjusted to be on the centerline with the cart 130, the cart mover 100 may reorient itself as needed. FIGS. 7B-7F illustrate the cart mover 100 arriving near the cart 130 in the tricycle steering mode and then rotating and aligning itself such that the hitching end 106 is in the centerline of the cart 130. Using the tricycle steering mode, the combined functions of rotation (i.e., to align the hitching end of the cart mover with the cart) and position adjustment (i.e., to ensure parallelism, shared centerline and approx. correct distance) relative to the cart can be completed. For the cases in which the cart mover 100 arrives adjacent to the cart 130, the cart mover 100 performs closer to a 900 turn to align with the cart 130, but in any case, rotates the amount as needed.

Once aligned with the cart 130, the cart mover 100 configures itself into the differential steering mode, by locking the rotational system 107. The cart mover 100 then lowers the hitching end 106 of the chassis 101, as illustrated in FIG. 7G, into the hitching mode. The cart mover 100 configures itself into the hitching mode by retracting the actuators 302*a* and 302*b* a distance such that the wheels 118*a* and 118*b* lift off the ground into the housing 102 and the wheels 120*a* and 120*b* are deployed onto the ground at a height in which the hitching end 106 dips towards the ground. The hitching end 106 may be dipped low enough to pass the hitching hands 706 under the front crosstie 704 of the cart 130 as the cart mover 100 moves towards the cart 130. It is noted that the description provided herein discusses the hitching system 110 utilizing hitching hands 706 as illustrated in FIGS. 7G and 7H. However, it should be understood that the hitching system 110 may alternatively use the hitching arms 124*a* and 124*b* and hitching fingers 124*c* and 124*d*, as illustrated in FIG. 1B. The cart mover 100 may utilize the lasers 702 to determine a precise distance between the cart mover 100 and the cart 130, as well as parallelism between the chassis 101 and the ground. The cart mover 100 may move towards the cart 130 and stop at a predetermined distance based on feedback received from lasers 702. The predetermined distance corresponds to a location of the hitching hands 706 that the hitching hands 706 will hitch to the front crosstie 704 of the cart 130 when one set of wheels, such as wheels 118*a* and 118*b* or wheels 120*a* and 120*b*, raise the hitching end 106 of the chassis 101. For example, as illustrated in FIG. 7H, the actuator 302*a* and actuators 302*b* may extend to lift wheels 120*a* and 120*b* off the ground and deploy the wheels 118*a* and 118*b* to a height that raises the hitching end 106 of the chassis 101. As the hitching end 106 of the chassis 101 raises, the hitching hands 706 of the hitching system 110 raise and interface with the front crosstie 704 or another feature on the cart 130 to constrain the cart 130 to the cart mover 100. In one or more cases, the hitching system 110 constrains the cart 130 to the cart mover 100 without lifting the cart 130 from the ground. The hitching system 110 constrains the cart 130 snuggly on each side to provide a secure hold on the cart 130. FIGS. 7H and 7I illustrate the cart 130 hitched to the cart mover 100, and the cart mover 100 traveling and leading the cart 130. In one or more cases, the lower laser, laser 702*b*, may continually or intermittently measure the distance between the cart 130 and cart mover 100 to ensure that the cart mover 100 does not lose hold of the cart 130 or that the cart 130 is moving about the hitching system 110 too much, thereby indicating an incomplete or non-secure hitch.

Various forms of constraining features are available to provide a lead-in (e.g., angled) engagement, thus accounting for slight misalignment when hitching. The angled lead-in 708 shown on the hitching hands 706 allow some amount of auto-alignment of the cart mover 100 with the cart 130. For example, the angled lead-in 708 may pivot about a portion of the hitching hands 706 as the angled lead-in 708 contacts a portion of the front crosstie 704. It is presumed that one or both of the cart 130 or the cart mover 100 (with the drive wheels 116*a* and 116*b* in neutral) move accordingly to ensure precise hitching hands engagement is achieved. In one or more cases, the hitching hands 706 may not lift the hitched end of the cart 130. The cart mover 100 may be a compact machine with insufficient counterweight to handle a cantilevered load, such as one end of the cart. Instead, the cart mover 100 may constrain both front and back of either side of the crosstie 704 or other feature of the cart 130, such that as the cart mover 100 travels, the cart mover 100 pulls, pushes and steers the cart 130 along with the cart mover 100—in much the same way as a human operator would move the same cart.

The cart 130 may be hitched to the hitching system 110 via deploying the wheels 118*a* and 118*b* or the wheels 120*a* and 120*b*, based on the configuration of the cart that is to be moved and/or the preferred travel mode. With this unique cart mover design, a cart can be moved regardless of which end of the cart is hitched. For example, the hitching system 110 may be hitched to a swivel castor end of the cart or a straight wheels end of the cart.

FIGS. 8A-8D illustrate bottom perspective views of the cart mover 100 hitching to the example carts 800 and 808. Cart 800 includes swivel wheels 802 disposed at one end of the cart 800 and non-swiveling/straight running wheels 804 at the opposing end of the cart. Cart 808 includes swivel wheels disposed on each end 812 and end 810 of the cart 808.

Figures 8A, 8B:
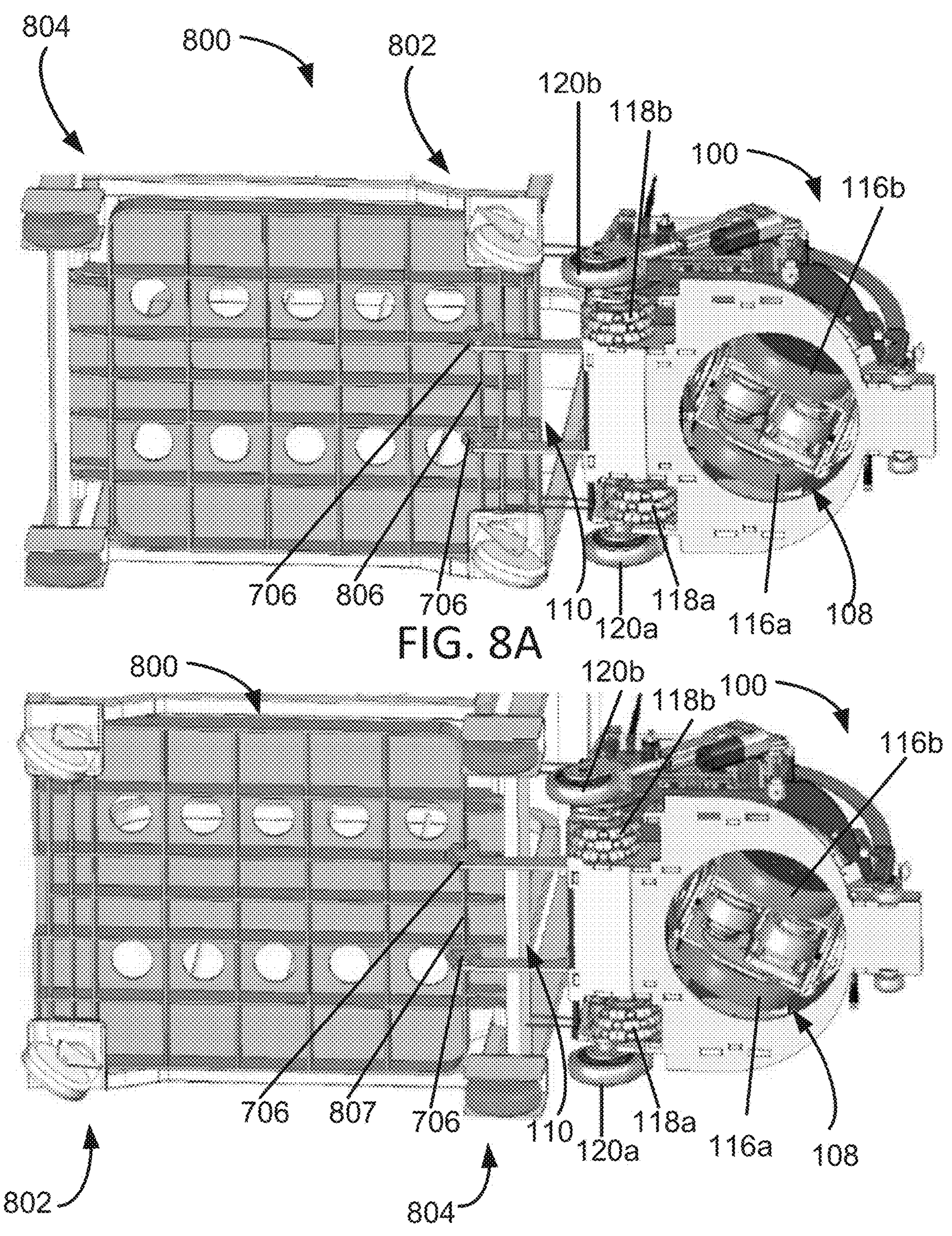
FIG. 8A illustrates a bottom perspective view of the example cart mover hitching where the cart's non-swiveling wheels are at the opposite end to the cart mover.
FIG. 8B illustrates a bottom perspective view of the example cart mover hitching to a cart where the cart's non-swiveling wheels are at the end of the cart where the cart mover hitches to it.

Tricycle steering may be implemented in each of the configurations illustrated in FIGS. 8A and 8B by utilizing the non-swiveling wheels 804 and the wheels 116*a* and 116*b* of the reconfigurable drive system 108. In the tricycle steering mode, the wheels 116*a* and 116*b* steer relative to whichever of the wheels 120*a* and 120*b* of the cart mover 100 or wheels 804 of the cart 800 act as straight running wheels. For example, for the cases in which the wheels 804 are utilized as the straight running wheels, the wheels 118*a* and 118*b* may be deployed to contact the ground and the wheels 120*a* and 120*b* may be retracted away from the ground.

In some cases, cart 800 may be a standard "York" collapsible (foldable) cart. The cart 800 may be hitched at the end of the cart 800 that includes the swivel wheels 802, as illustrated in FIG. 8A. The cart 800 may be hitched to a crosstie 806 via hitching hands 706 (or the hitching arms 124*a* and 124*b* and the hitching fingers 124*c* and 124*d*) of the hitching system 110. In the configuration illustrated in FIG. 8A, the wheels 118*a* and 118*b* are deployed. The wheels 116*a* and 116*b* of the reconfigurable drive system 108 act as a single driven wheel, in which the turning of the reconfigurable drive system 108 within the chassis 101 of the cart mover 100 occurs relative to the non-swiveling wheels 804 at the far end of the cart 800. For the cases in which the cart mover 100 travels without a cart hitched, the cart mover 100 deploys the wheels 120*a* and 120*b* to maneuver in tricycle steering mode. Once hitched to a cart, such as cart 800, then wheels 118*a* and 118*b* are deployed and wheels 120*a* and 120*b* are retracted. For the cases in which a crosstie of the cart 800 is approximately the same distance from the end of the cart 800 at each end, the cart mover 100 may use a longer pair of hitching hands 706 to reach the crosstie.

In some cases, the hitching system 110 of the cart mover 100 may be hitched to the end of the cart 800 having non-swiveling wheels 804, as illustrated in FIG. 8B. Similar to that of the configuration in FIG. 8A, the wheels 118*a* and 118*b* may be deployed and the non-swiveling wheels 804 of the cart 800 may serve as the straight running wheels for tricycle steering. The wheels 116*a* and 116*b* of the reconfigurable drive system 108 act as a single driven wheel, in which the turning of the reconfigurable drive system 108 within the chassis 101 of the cart mover 100 occurs relative to the non-swiveling wheels 804 at the near end of the cart 800, as illustrated in FIG. 8B.

In either configuration illustrated in FIGS. 8A and 8B, the hitching hands 706 of the hitching system 110 may remain the same, thereby providing complete flexibility regarding which end of the cart 800 hitches to the cart mover 100. The cart mover 100 may implement different kinematic software based on the corresponding kinematic changes (i.e., the distance between the non-swiveling wheels 804 and the wheels 116*a* and 116*b* of the reconfigurable drive system 108. Additionally or alternatively to, the cart mover 100 may implement different kinematic software based on the hitching distance to the cart 800 per the feedback provided by the lasers 702. The cart mover 100 may take into account the change in kinematics in the navigation and control software. For instance, as the cart mover 100 turns, the cart 800 pivots about the non-swiveling wheels 804 of the cart 800, and as the location of the non-swiveling wheels 804 changes, the trajectory of the cart 800 changes as well.

Figures 8C, 8D:
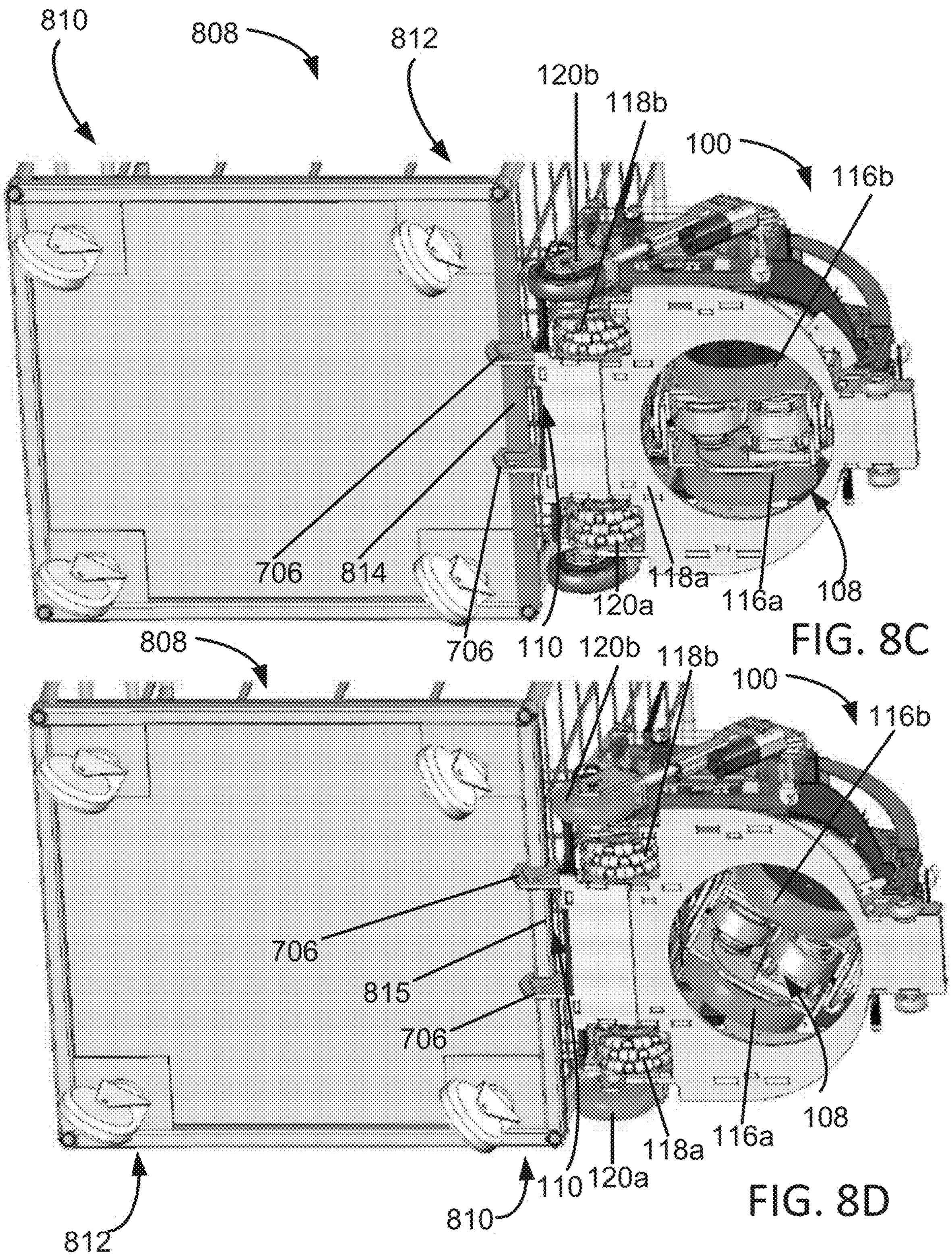
FIGS. 8C-8D show the example cart mover hitching to a 4-swivel castor cart, either with the omni directional wheels able to be deployed or the non-swiveling wheels being deployed.

Turning to FIG. 8C, the cart 808 includes multiple swiveling wheels on both ends 810 and 812 of the cart 808. In such configuration, the reconfigurable drive system 108 utilizes the differential steering mode, in which the wheels 118*a* and 118*b* are deployed, the rotational system 107 is locked, and the wheels 116*a* and 116*b* rotate at various speeds and directions to implement differential steering. The hitching hands 706 of the hitching system 110 may hitch to any of the crossties of the cart 808. For example, the hitching hands 706 of the hitching system 110 may hitch to either crosstie 814 on end 812 of the cart 808 or crosstie 816 on the end 810 of the cart 808.

In some cases, the cart mover 100 may move the cart 808 having the multiple swiveling wheels with the wheels 120*a* and 120*b* deployed and the wheels 118*a* and wheels 118*b* retracted away from the ground. In this configuration, the cart mover 100 controls the cart 808 as the cart 808 moves utilizing the tricycle steering mode. The rotational system 107 is unlocked and free to rotate within the chassis 101. The wheels 120*a* and 120*b* are deployed, and the wheels 118*a* and 118*b* are retracted away from the ground. The wheels 120*a* and 120*b* provide the straight travel/linear force that the reconfigurable drive system 108 may use to steer relative to the wheels 120*a* and 120*b*.

As illustrated in FIGS. 9A-9J, the cart mover 100 may include optional clamping arms 902*a* and 902*b* as an alternative or in addition to hitching pads 126*a* and 126*b* to more securely hitch the cart 800 to the cart mover 100. In some cases, the cart mover 100 may include one set of clamping arms or multiple sets of clamping arms, such as a set that includes arms 902*a* and 902*b* and another set that includes 904*a* and 904*b*. The arms 902*a*, 902*b*, 904*a*, and 904*b* and pads 126*a* and 126*b* may each be moveable to push the cart 800 away from the cart mover 100 while pressing a portion of the cart 800, such as the crosstie 806, against the hitching fingers 124*c* and 124*d* to constrain the cart 800 to the cart mover 100. In one or more cases, the arms 902*a* and 902*b* may be configured to move towards one another and arc in from the sides of the cart 800 to constrain the sides of the cart 800. For the cases in which the hitching fingers 124*c* and 124*d* cannot hitch to the underside of the cart 800, one or more sets of the arms 902*a*, 902*b*, 902*c*, and 902*d* may clamp the sides of the cart 800 to hitch the cart 800 to the cart mover 100. Similar to the arms 902*a* and 902*b*, in one or more cases, the pads 126*a* and 126*b* may press at an angle towards one another to constrain the sides of the cart 800 while pressing the crosstie 806 against the hitching fingers 124*c* and 124*d* of the hitching arms 124*a* and 124*b*.

Figures 9A, 9B, 9C, 9D:
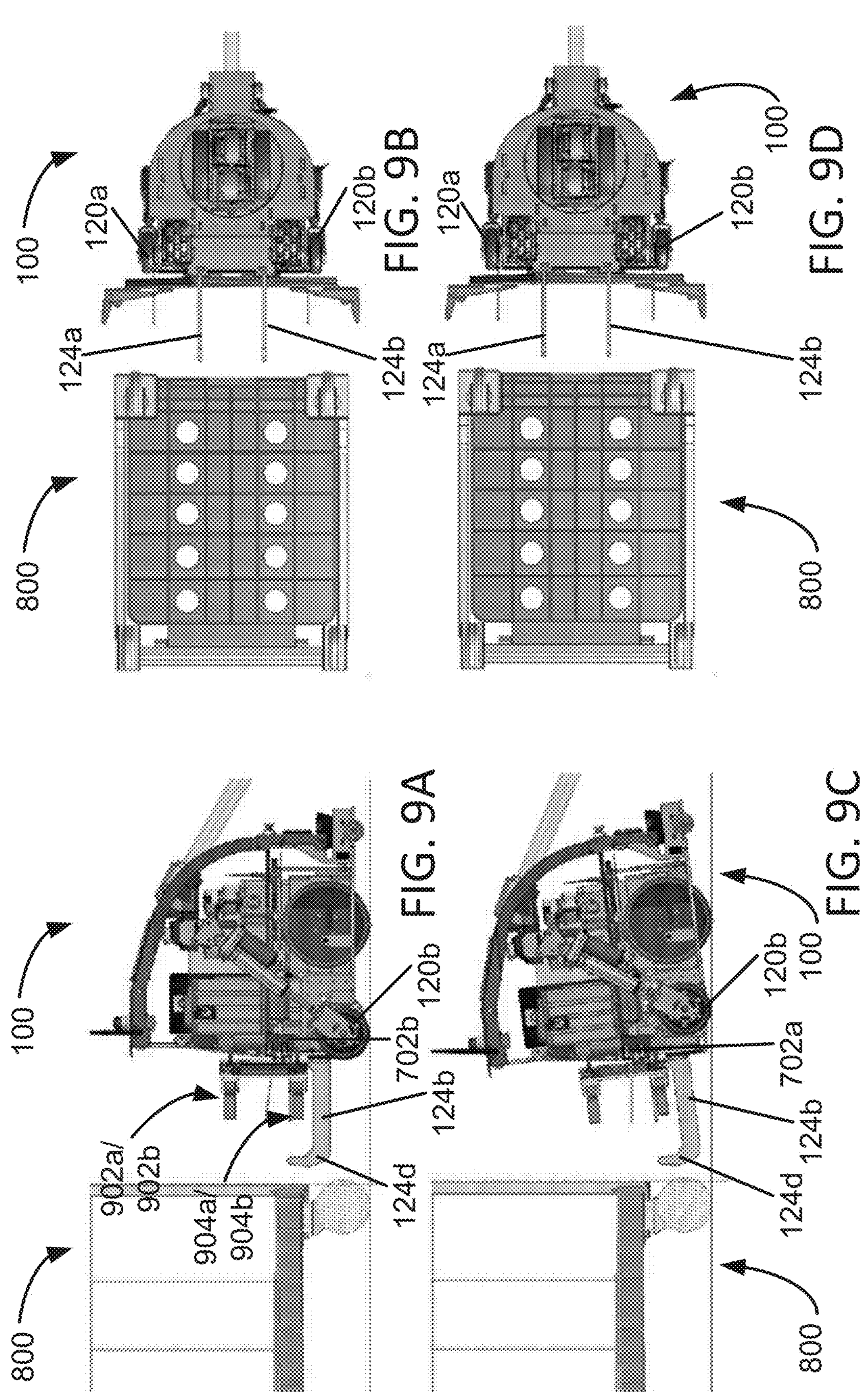
FIGS. 9A-9J illustrate various views of the example cart mover positioning and hitching itself to an example cart using example hitching arms.
Figures 9E, 9F, 9G, 9H:
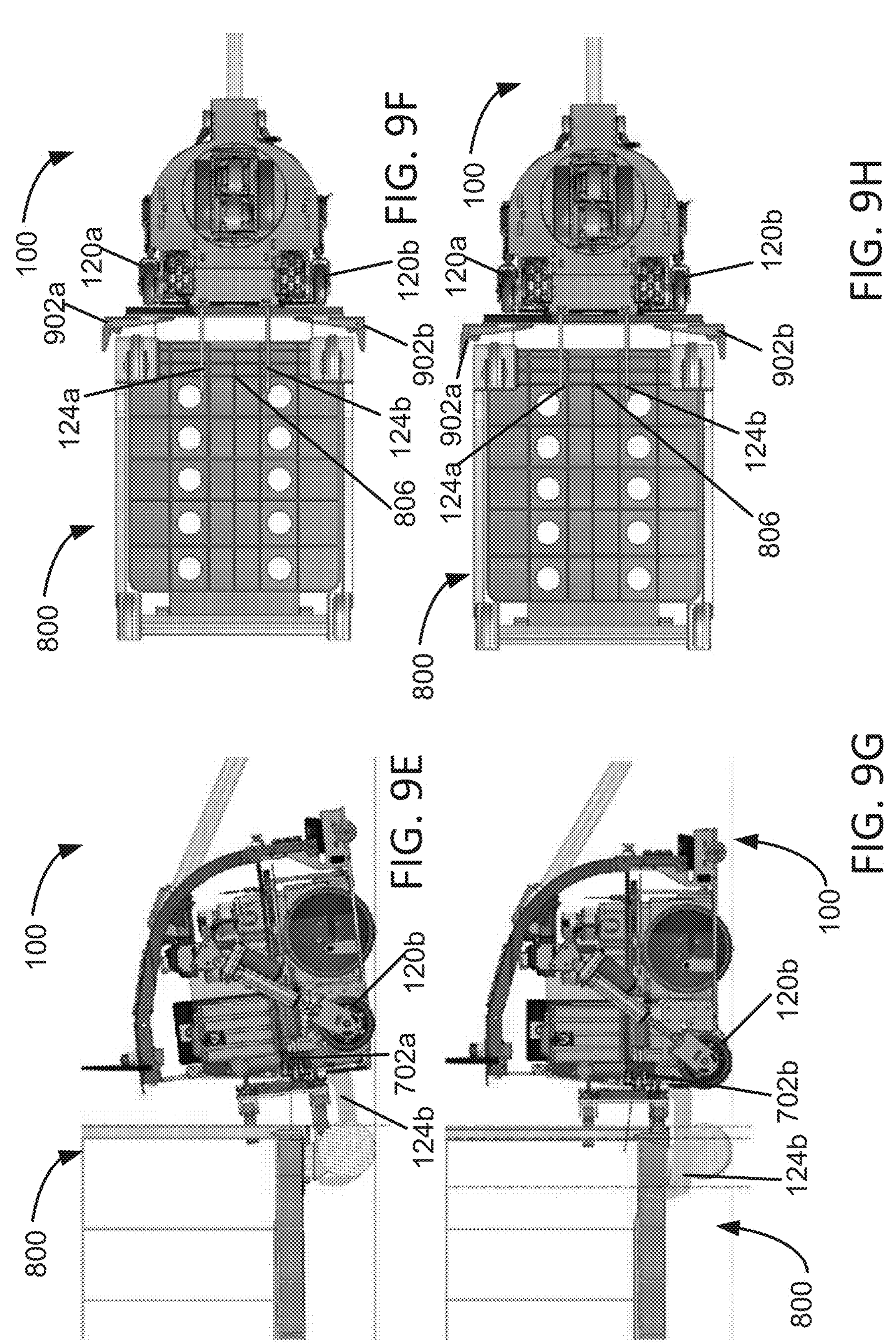
Figures 9I, 9J:
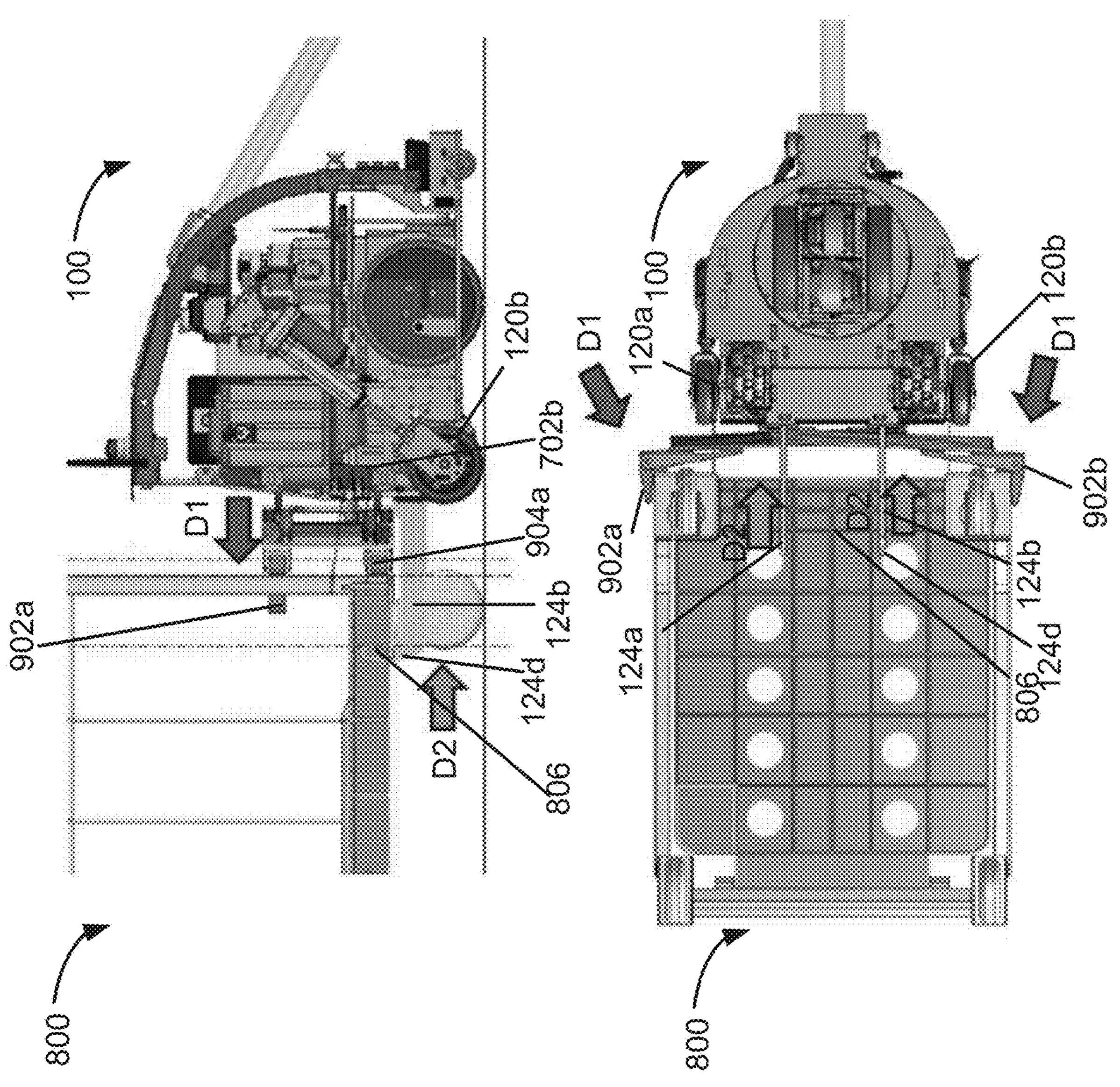

FIGS. 9A-9J illustrate various views of the cart mover 100 positioning and hitching itself to the cart 800 using hitching fingers 124*c* and 124*d* and clamping arms 902*a* and 902*b*. FIGS. 9A and 9B illustrate the cart mover 100 approaching the cart 800. FIGS. 9C and 9D illustrate the cart mover 100 dipping the hitching end 106 of the cart mover 100. FIGS. 9E and 9F illustrate the hitching arms 124*a* and 124*b* in a dipped position and traveling under the cart 800. FIGS. 9G and 9H illustrate the hitching arms 124*a* and 124*b* raising up such that the hitching fingers 124*c* and 124*d* interface with the underside of the cart 800. FIGS. 91 and 9J illustrate the hitching fingers 124*c* and 124*d* interfacing with the crosstie 806 of the cart 800 while the arms 902*a* and 902*b* clamp to the sides of the cart 800 and constrain the cart 800 to the cart mover 100.

FIGS. 9A and 9B illustrate the cart mover 100 after having arrived in front of the cart 800 and completed a rotation (e.g., typically 90° or 180°) to face the hitching end 106 of the cart mover 100 towards the cart 800. The cart mover 100 may use the lower laser 702*b* to determine the distance from the cart mover 100 to the cart 800 and parallelism with the cart 800, prior to commencing the hitching process. In some cases, the cart mover 100 may use a depth camera or other sensors or methods to determine that the cart mover 100 is approximately on center with the cart 800.

FIGS. 9C and 9D illustrate the cart mover 100 configured in a dipped position to approach the cart 800. For the cases in which only the arms 902*a* and 902*b* are used, the cart mover 100 may not position itself in the dipped position, but rather continue to clamping the sides of the 800 with the arms 902*a* and 902*b* and using the lower laser 702*b* to determine the distance between the cart mover 100 and cart 800. For the cases in which the cart mover 100 is dipped, the upper laser 702*a* determines the distance between the cart mover 100 and cart 800 on approach.

FIGS. 9E and 9F illustrate the cart mover 100 with the hitching arms 124*a* and 124*b* positioned under the cart 800 and stopped according to the distance feedback from laser 702*a* to ensure alignment and correct distance. By ensuring alignment and correct distance, when the hitching end 106 of the cart mover 100 raises upwards, the hitching fingers 124*c* and 124*d* and hitching arms 124*a* and 124*b* will be in the desired location relative to the cart 800. In this example hitching process, the hitching finger 124*c* and hitching finger 124*d* of the hitching arms 124*a* and 124*b* are used. The hitching fingers 124*c* and 124*d* of the hitching arms 124*a* and 124*b* enter the space behind the intended hitching crosstie (e.g., crosstie 806) of the cart 800, and in some cases with room to clear. In such cases, using the hitching fingers 124*c* and 124*d* of the hitching arms 124*a* and 124*b* means the accuracy of the positioning of the hitching arms 124*a* and 124*b* is not so critical, as securing the hitch occurs as a secondary action when the arms 902*a* and 902*b* engage the sides of the cart 800. This additional variance that can be accommodated may also provide flexibility to engage carts that have inconsistent structures from one another (e.g., a crosstie of one cart being located at one distance from the front of the cart and a crosstie of another cart located at another distance from the front of the respective cart), which may provide inaccurate distances when measuring with the lasers 702.

FIGS. 9G and 9H illustrate the cart mover 100 after the cart mover 100 extended the actuators to bring the cart mover 100 to parallel with the ground. The cart mover 100 may extend the actuators 302*a* and 302*b* to elevate the hitching end 106 of the cart mover 100 using either the wheels 118*a* and 118*b* or the wheels 120*a* and 120*b*. In this example, the hitching fingers 124*c* and 124*d* of the hitching arms 124*a* and 124*b* may be spaced a few millimeters away from the crosstie 806 of the cart 800.

FIGS. 91 and 9J illustrate the clamping arms 902*a*, 902*b*, 904*a*, and 904*b*, acted on by linear actuators, pivot away from the cart mover 100 to push each arm 902*a*, 902*b*, 904*a*, and 904*b* toward the cart 800 in direction D1 to engage with the cart 800 while also pivoting in and thus side pushes the cart 800 away from the cart mover 100, thus pulling the hitching fingers 124*c* and 124*d* in direction D2 to apply an opposing force against the crosstie 806, ensuring a tight and secure hold of the cart 800. Effectively the cart 800 is then clamped between the hitching fingers 124*c* and 124*d* below the cart 800 and the arms 902*a*, 902*b*, 904*a*, and 904*b* above, each respectively pushing in opposing directions. To ensure the required pressure on the cart 800 is enough, but not too much, load sensors may be used and/or springs with a limit switch that triggers when the springs are appropriately compressed.

Once hitched and moving, the upper laser 702*a* continuously or intermittently monitors the distance on each side between the cart 800 and the cart mover 100, confirming that the cart 800 is securely hitched. To unhitch the cart 800 from the cart mover 100, the same steps are repeated in the reverse order.

Figure 10A:
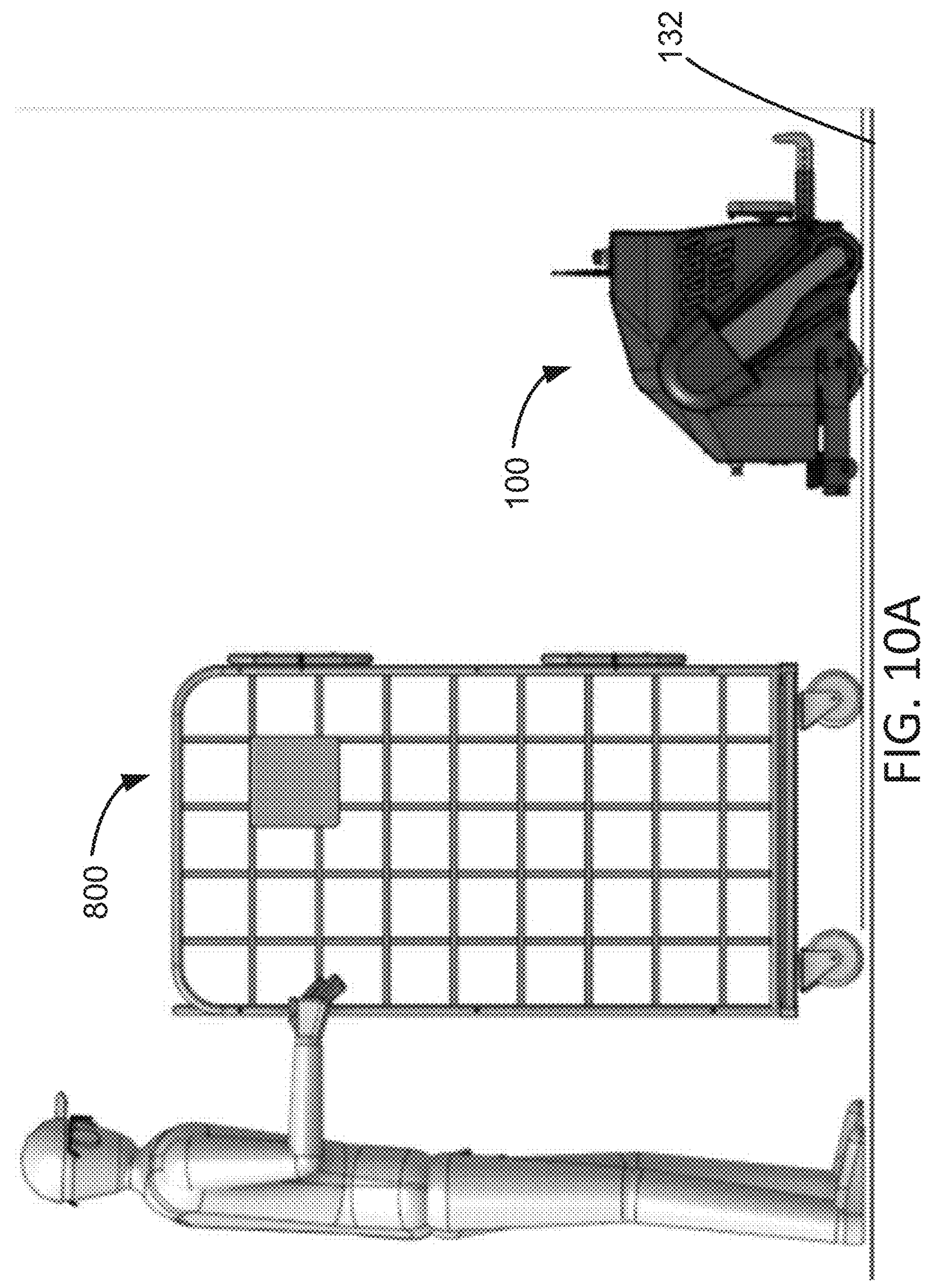
FIGS. 10A-10S illustrate perspective views of the example cart mover and hitching system approaching and being hitched to the example cart.
Figures 10B, 10C, 10D, 10E, 10F, 10G:
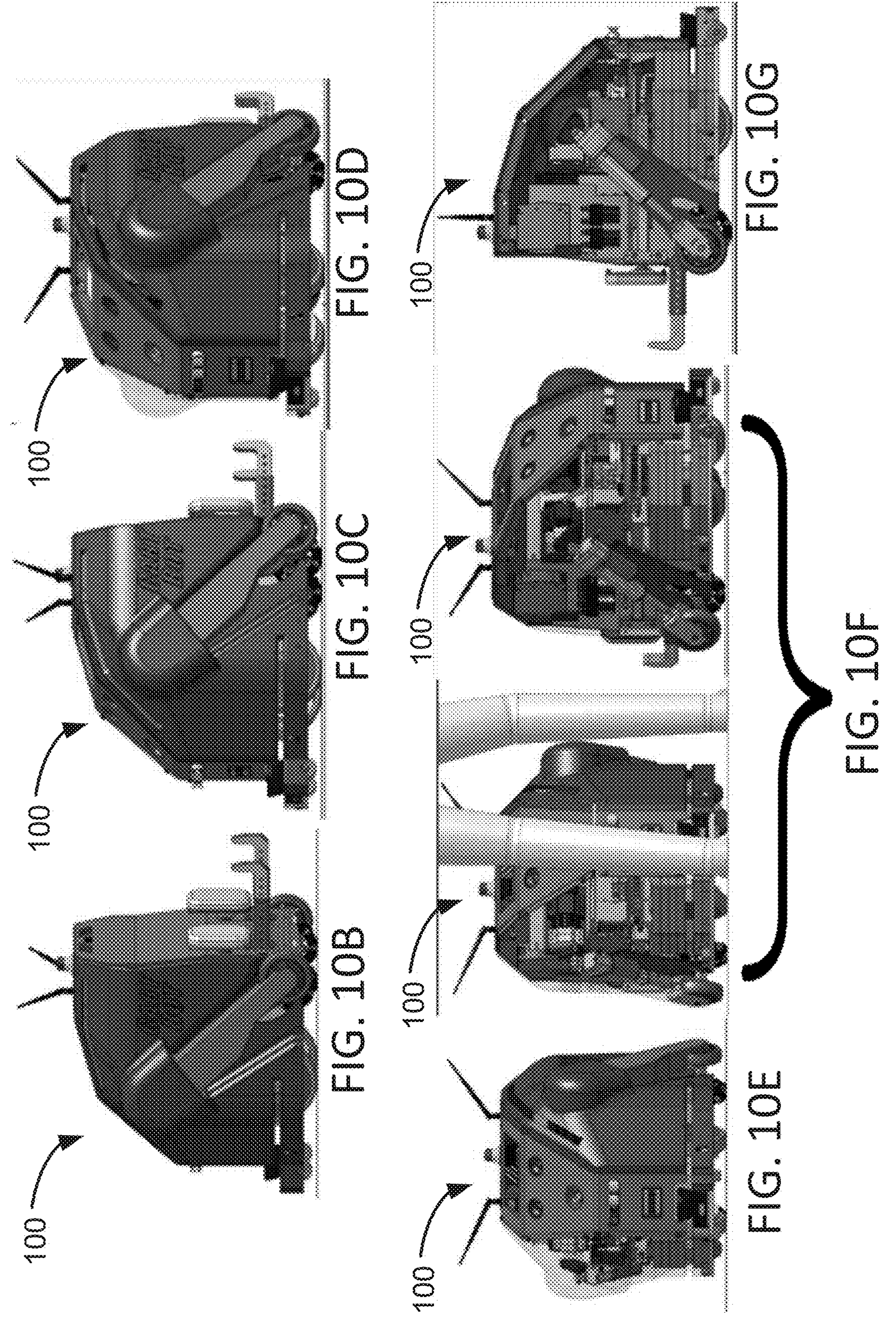
Figures 10H, 10I:
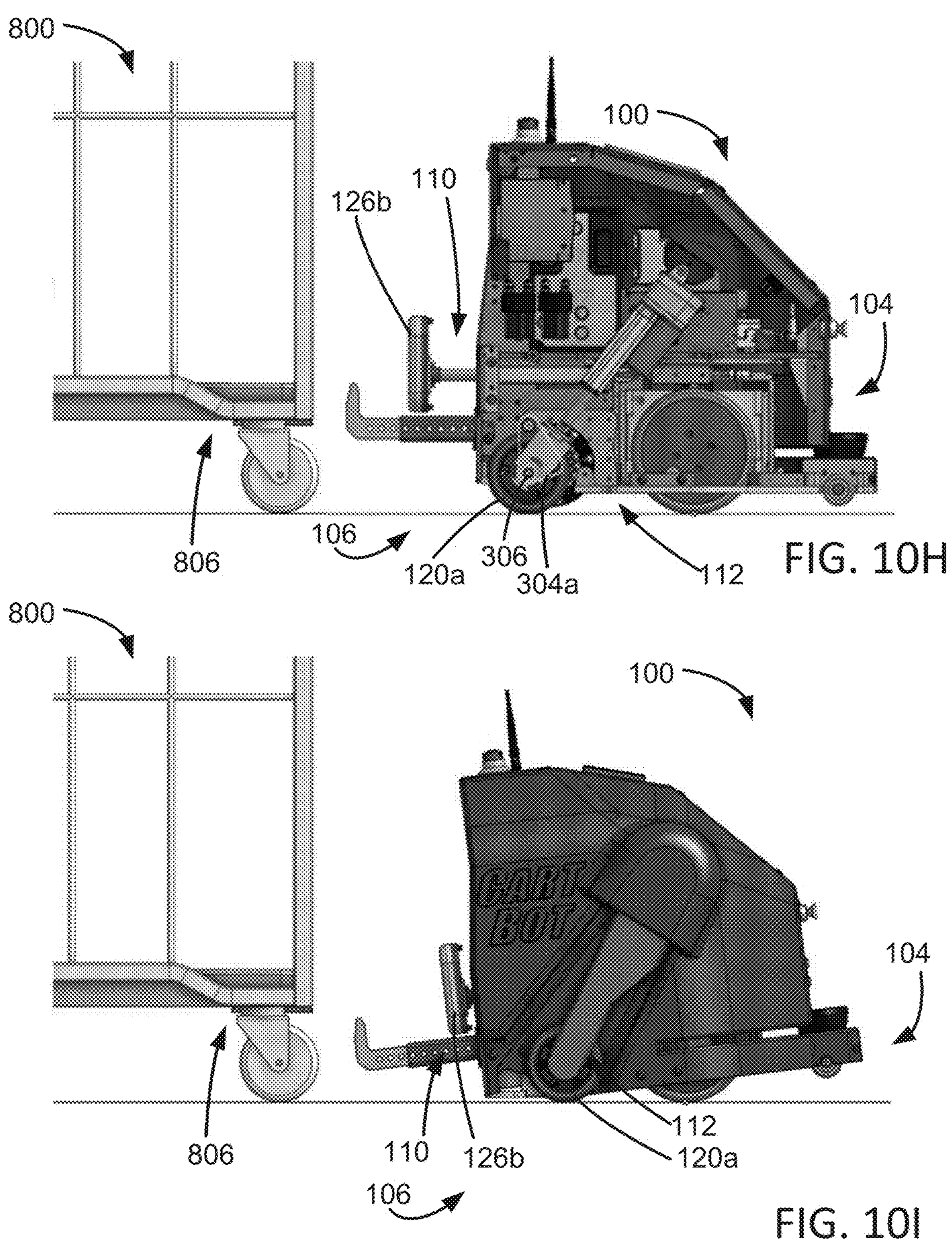
Figure 10J:
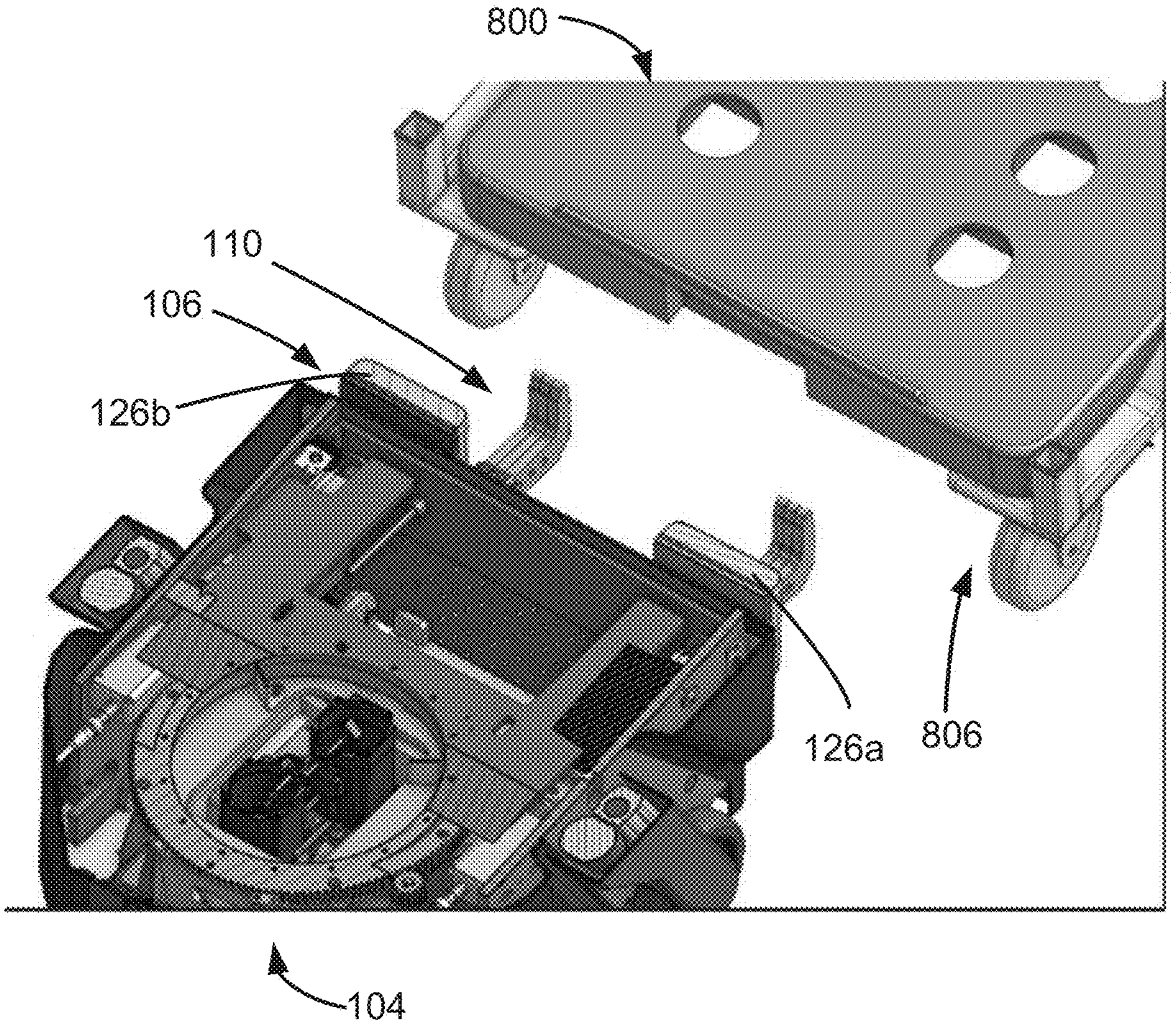
Figures 10K, 10L:
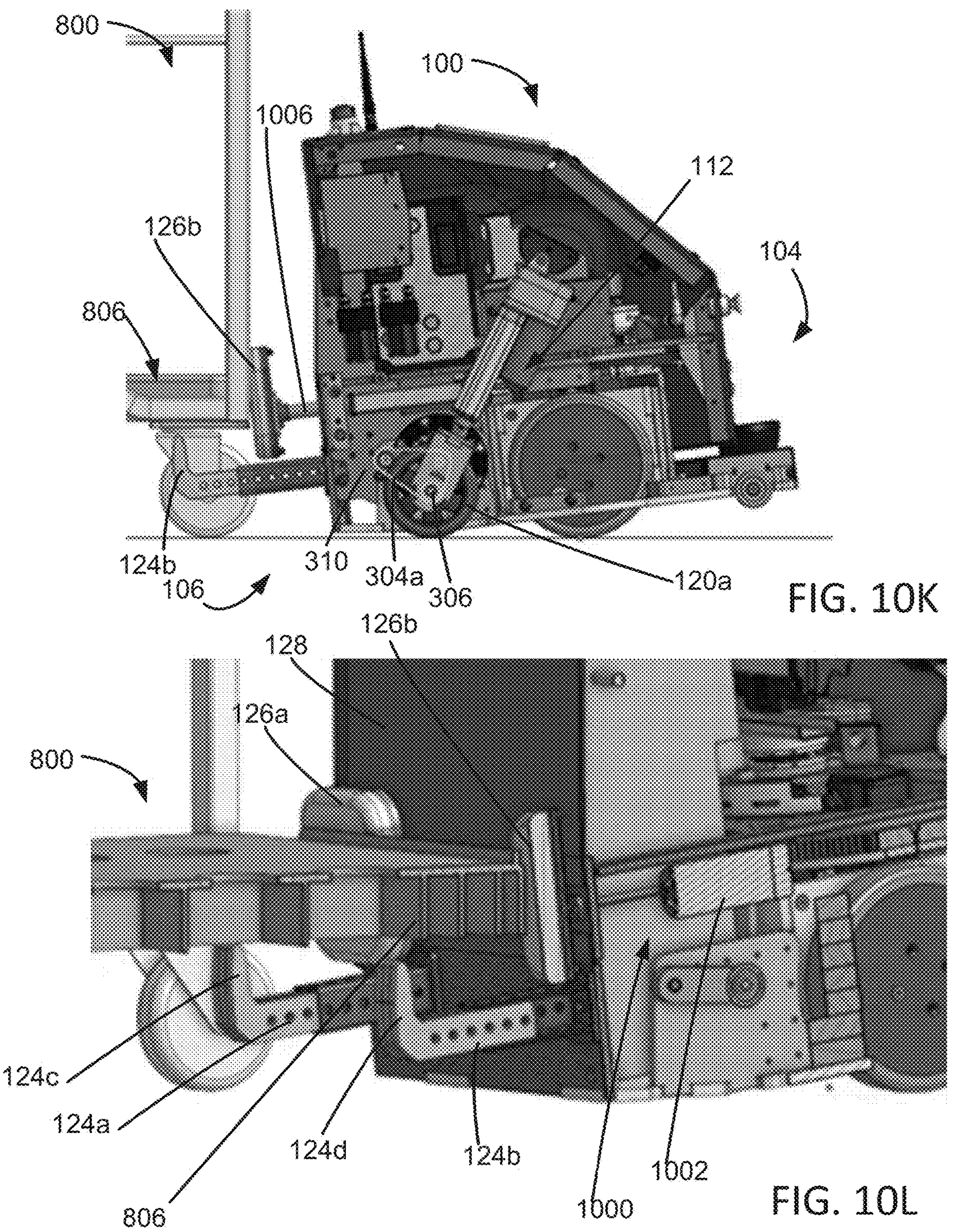
Figures 10M, 10N:
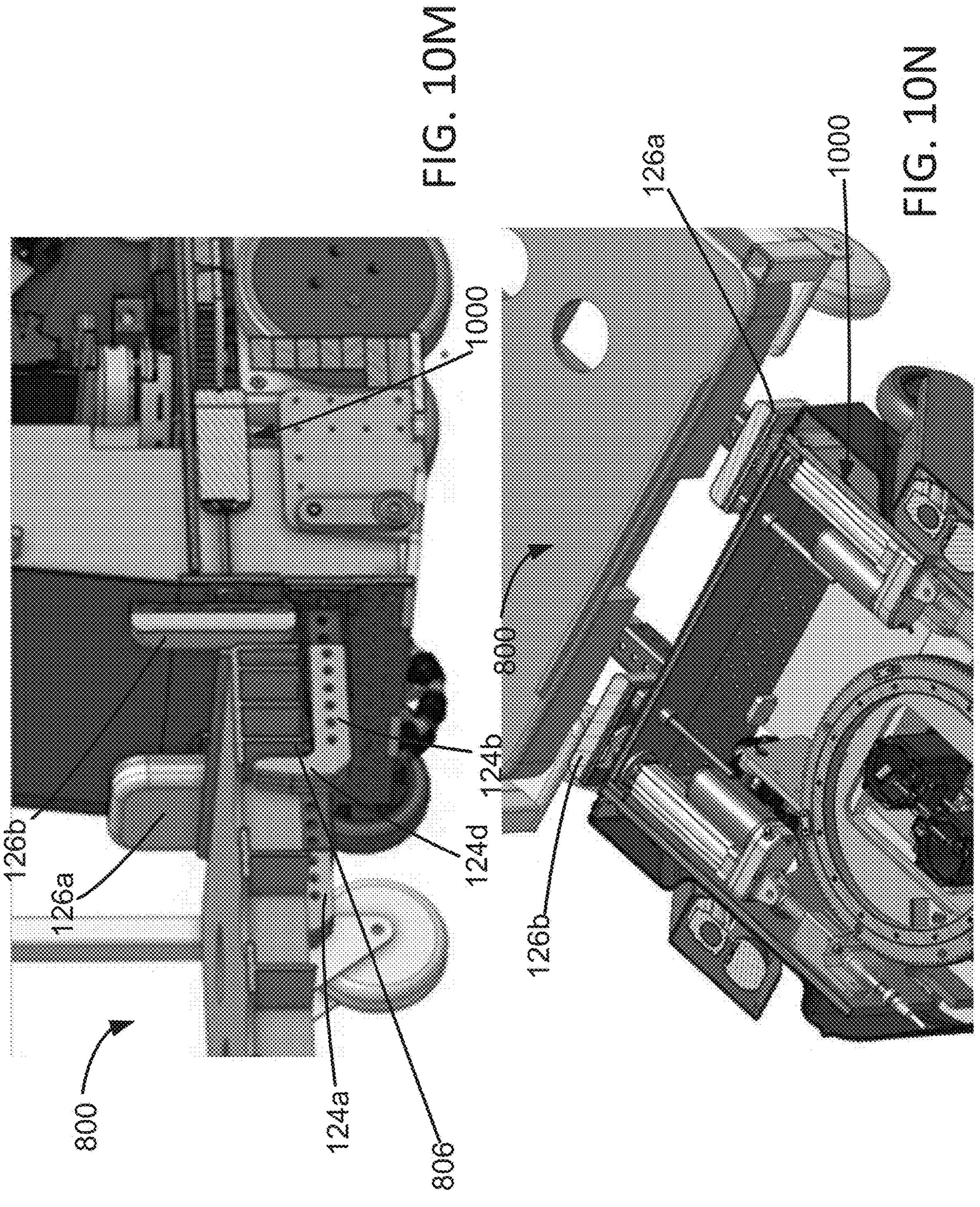
Figure 10P:
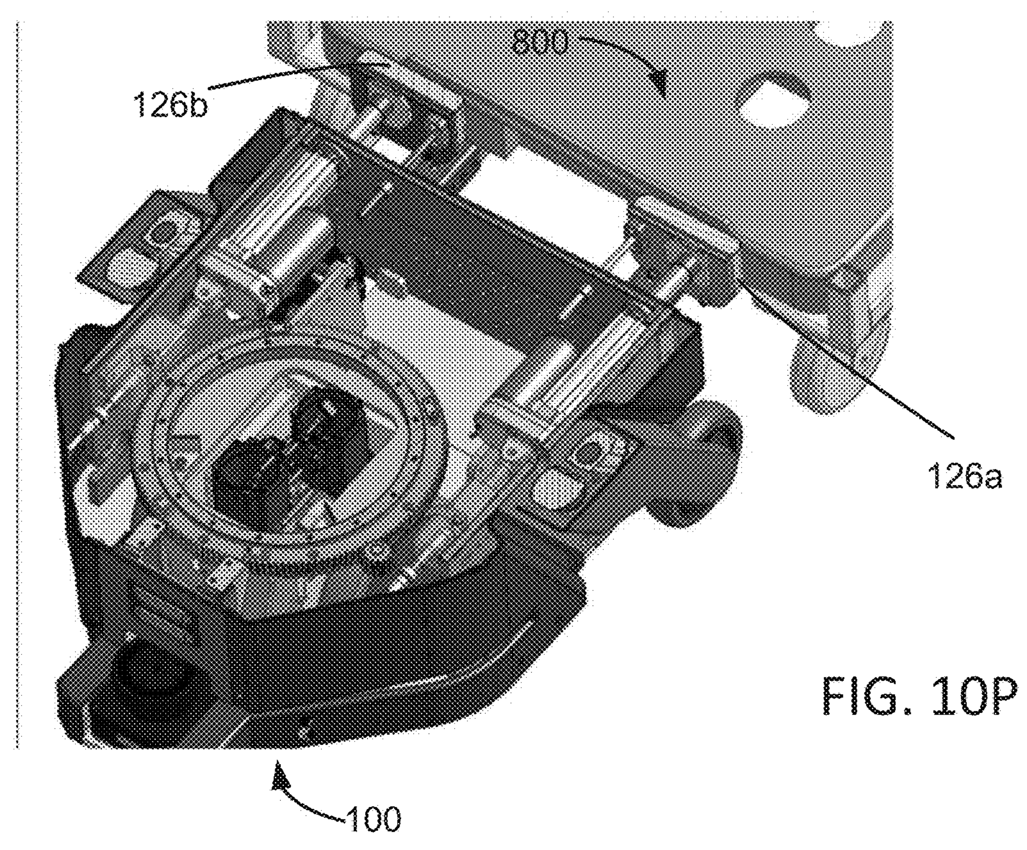
Figure 10O:
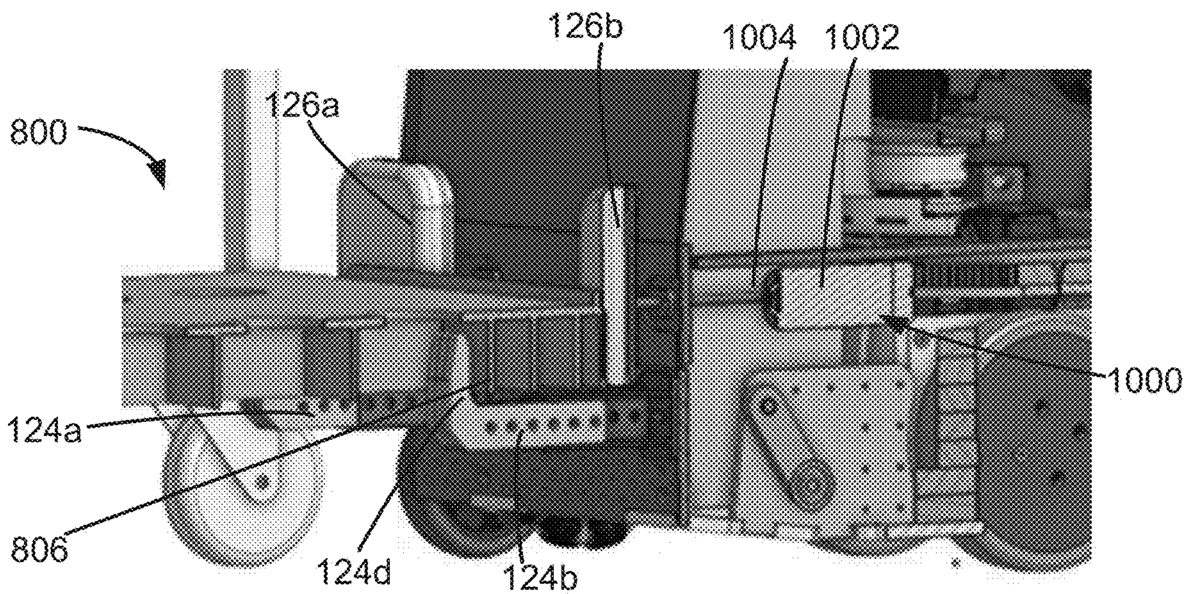
Figures 10Q, 10R:
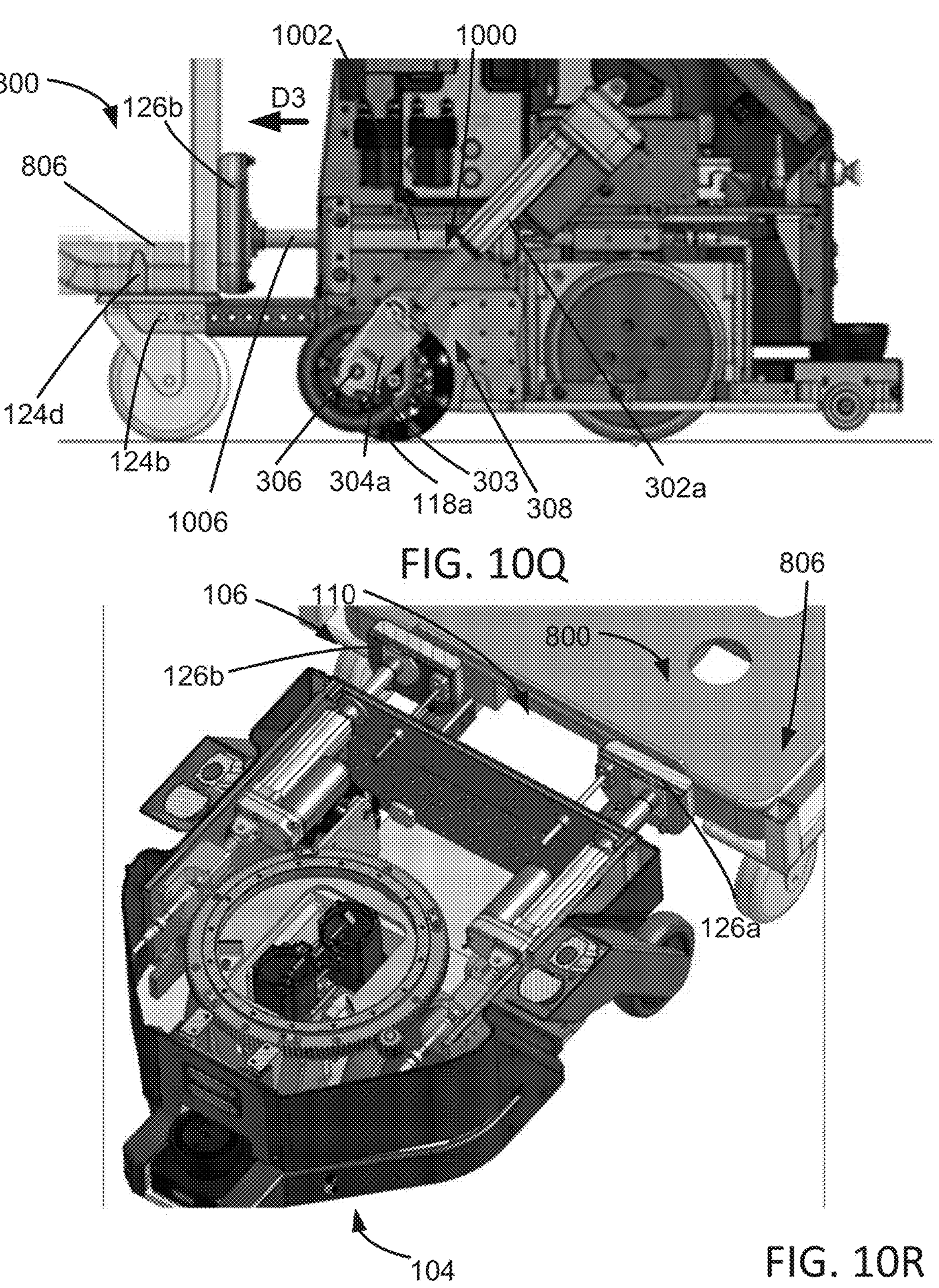
Figure 10S:
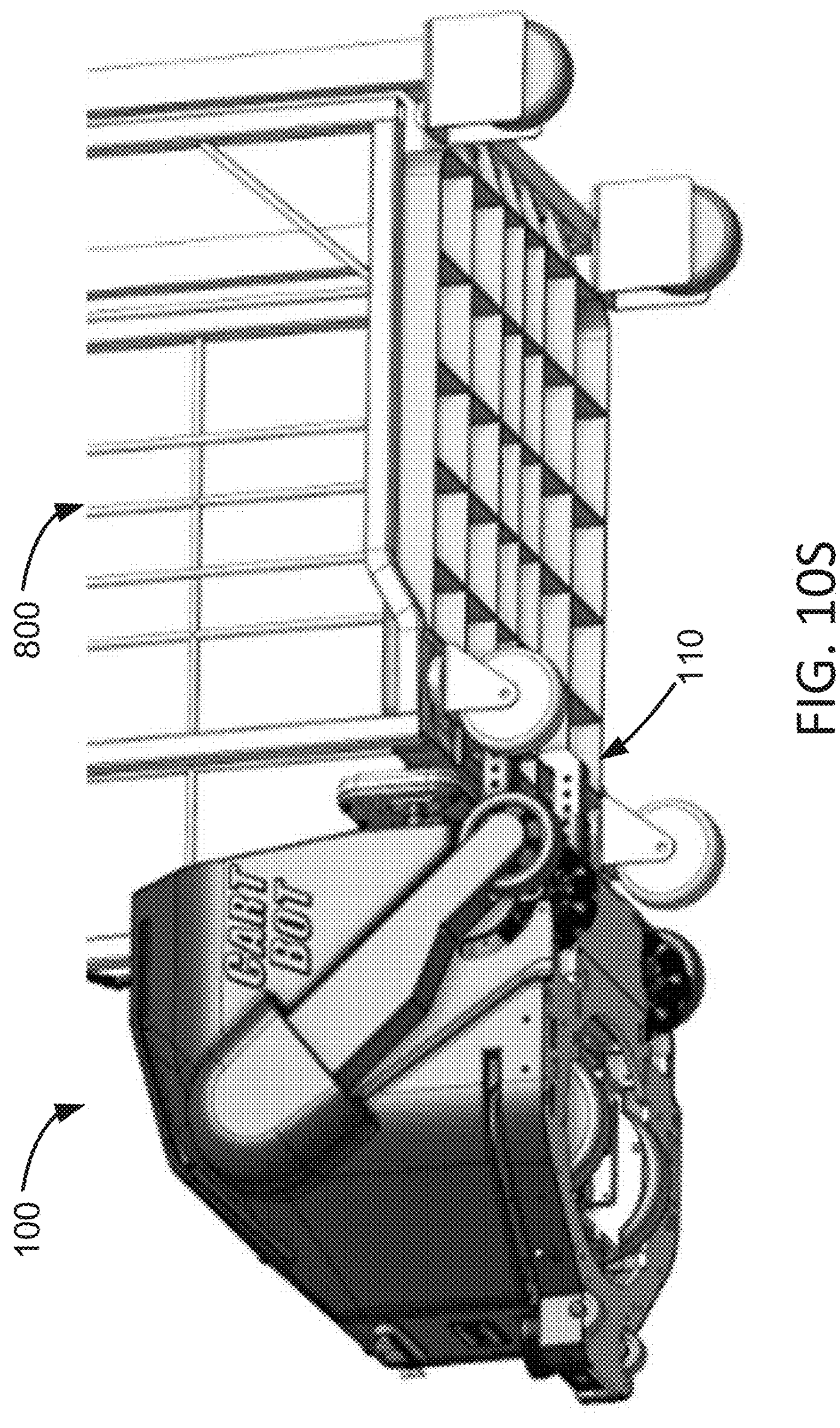

FIGS. 10A-10S illustrate perspective views of the cart mover 100 and hitching system 110 approaching and being hitched to the cart 800 with hitching pads 126*a* and 126*b*. To approach the cart 800, the cart mover 100 may travel and orient itself to the cart 800 in a same or similar manner as described with respect to FIGS. 7A-7F. For example, the cart mover 100 may arrive near the cart 800 in the differential steering mode, as illustrated in FIG. 10A. The cart mover 100 then rotates and aligns itself with the cart 800 using the tricycle steering mode, such that the hitching end 106 of the cart mover 100 faces the cart 800, as illustrated in FIGS. 10B-10G. For example, the cart mover 100 may rotate 180° or about 180° to align the hitching end 106 of the cart mover 100 to face the cart 800.

To hitch and unhitch the cart 800 from the cart mover 100, the same steps as described with respect to FIG. 7G-7I or 9A-9J may be used. For example, the cart mover 100 may configure itself into the differential steering mode, and then, as illustrated in FIG. 10H, the cart mover 100 may lower the hitching end 106 of the chassis 101, thereby dipping the hitching system 110 towards the ground, as illustrated in FIG. 10I. The cart mover 100 moves towards the cart 800 and positions the hitching fingers 124*c* and 124*d* under the crosstie 806 of the cart 800, as illustrated in FIGS. 10I-10L. To ensure the travel amount is correct (i.e., to locate the hitching fingers well within the intended pockets of the cart), the cart mover may move a known distance using odometry. In addition or in the alternative to moving the cart mover 100 based on a known distance, the cart mover 100 may use a laser distance measurer to check the distance between the cart and the cart mover 100 to ensure the cart mover 100 stops in the right location so that when the cart mover 100 raises back up, the hitching fingers will be within the pockets as required. The cart mover 100 may raise the hitching end 106 of the chassis 101 and position the hitching fingers 124*c* and 124*d* near the crosstie 806, as illustrated in FIGS.

10M-ION. In some cases, the cart mover 100 may raise the chassis 101 using the wheels 118*a* and 118*b* until the chassis 101 is parallel to the ground.

As an alternative to using the arms 902*a* and 902*b* to constrain the cart 800 to the cart mover 100, the cart mover 100 may only use the hitching pads 126*a* and 126*b* to constrain the cart 800. For example, as illustrated in FIGS. 10P and 10R, the hitching pads 126*a* and 126*b*, acted on by linear actuators 1002 and rods 1006 of the respective hitching assemblies 1000, move away from the cart mover 100 and push the cart 800 in direction D3 to constrain a portion of the cart 800 between the hitching fingers 124*c* and 124*d* and the hitching pads 126*a* and 126*b*, ensuring a tight and secure hold of the cart 800. Effectively the cart 800 is clamped between the hitching fingers 124*c* and 124*d* below the cart 800 and the hitching pads 126*a* and 126*b* on a side of the cart 800, each pushing in opposing directions, as illustrated in FIG. 10S. As illustrated in FIGS. 10Q and 10R, the hitching pads 126*a* and 126*b* extend farther than that illustrated in FIGS. 100 and 10P to push the cart 800 back and hard against the hitching fingers 124*c* and 124*d* of the cart mover 100, such that the cart 800 is securely sandwiched between hitching fingers 124*c* and 124*d* and hitching pads 126*a* and 126*b*. The actuators 1000 may be configured in the final extended position (and hence the final extended position of the hitching pads) where the sensors (as further discussed with respect to FIGS. 11A-11E) is switched to stop any further extending of the hitching pads. The sensors may be safety-rated sensors. The springs in the hitching assemblies ensure a constant force is being applied to the cart to securely hold the cart, while serving the additional function of being a feedback system that ensures the cart is always fully hitched. The combination of more securely gripping the cart and having a safety-rated feedback sensor for confirmation of that hitching allows the cart mover to travel safely at higher speeds than when these two functions have not occurred. To unhitch the cart 800 from the cart mover 100, the same steps are repeated in the reverse order.

FIGS. 11A-11E illustrate perspective views of example hitching assemblies 1000*a* and 1000*b* of the hitching system 110. The hitching assemblies 1000*a* and 1000*b* may be positioned within the housing 102 of the cart mover 100. The hitching assemblies 1000*a* and 1000*b* may be configured to actuate their respective hitching pads 126*a* and 126*b* either towards or away from the housing 102, and therefore towards or away from the cart 800.

The hitching assembly, such as hitching assembly 1000*a*, may include the linear actuator 1002 coupled to the hitching pad 126*b* via the rod 1006. The rod 1006 may axially translate through an opening in the housing 102. In some cases, the opening in the housing 102 may include a bushing 1008 that aids in guiding the rod 1006 through the opening. The linear actuator 1002 is configured to actuate the hitching pad 126*b*, via the rod 1006, either towards or away from the respective hitching finger, such as hitching finger 124*d*. In some cases, the hitching pad 126*b* includes a rigid plate 1010 coupled to a compliant member 1012. The proximal end of the rod 1006 may be coupled to one side of the plate 1010, and the compliant member 1012 may be coupled to the opposing side of the plate 1010. The plate 1010 may be formed, for example, from steel or other like rigid materials. The compliant member 1012 may be formed, for example, from rubber, urethane, or other like material that may conform around an object when pressed against. For example, the compliant member 1012 may be formed from a material that compresses to form around a portion of the object (e.g., a cart) that the respective hitching pad presses against. In some cases, the compliant member 1012 may be attached to the plate 1010 via gluing or bonding the compliant member 1012 to the plate 1010. In one or more cases, a guide rod 1004 may be coupled to the plate 1010 and pass through an opening of the housing 102 via a bushing 1024. The guide rod 1004 may be used to guide and support the hitching pad 126*b* and ensure that the hitching pad 126*b* does not rotate out of position. The linear actuator 1002 operates linearly in alignment with the guide rod 1004.

A mount 1014 is positioned on the opposing end of the linear actuator 1002. The mount 1014 is configured to hold the end of the linear actuator 1002 within the housing 102. In some cases, the mount 1014 is a sliding clevis mount. The mount 1014 may slide back and forth in a housing 1018. In some cases, a compression spring 1016 may be positioned about a rod 1015 pivotable coupled to an end of the mount 1014. The compression spring 1016 may be positioned between the mount 1014 and the housing 1018 to resist the sliding of the mount 1014. The resistance applied to the compression spring 1016 may be used to determine the force being applied by the hitching pad 126*b* pressing against an object, such as cart 800. The rod 1015 may be a guide rod that travels inside the compression spring 1016 and through the housing 1018. The end of the rod 1015 may include a retainer 1020 that prevents the rod 1015 exiting the housing 1018. Further, the retainer 1020 acts as a target for a sensor 1022 that is mounted to the chassis 101. The sensor 1022 may be a proximity sensor that is mounted adjustably on a bracket that attaches to the chassis 101. The sensor 1022 may be configured to monitor the distance between the sensor 1022 and the retainer 1020 and to provide feedback to corresponds to such distance.

Figure 11A:
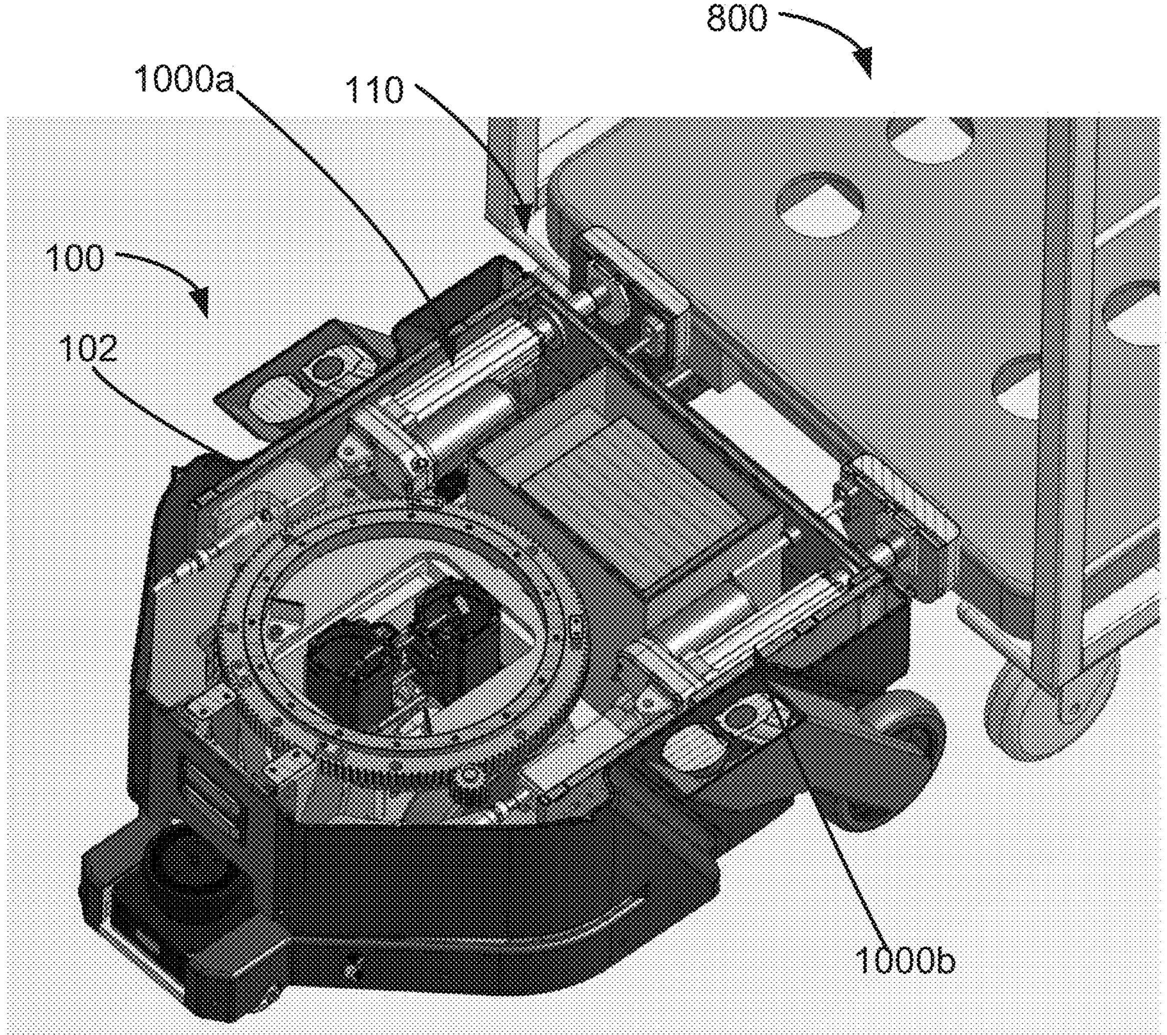
FIGS. 11A-11E illustrate perspective views of example hitching assemblies of the hitching system.
Figure 11B:
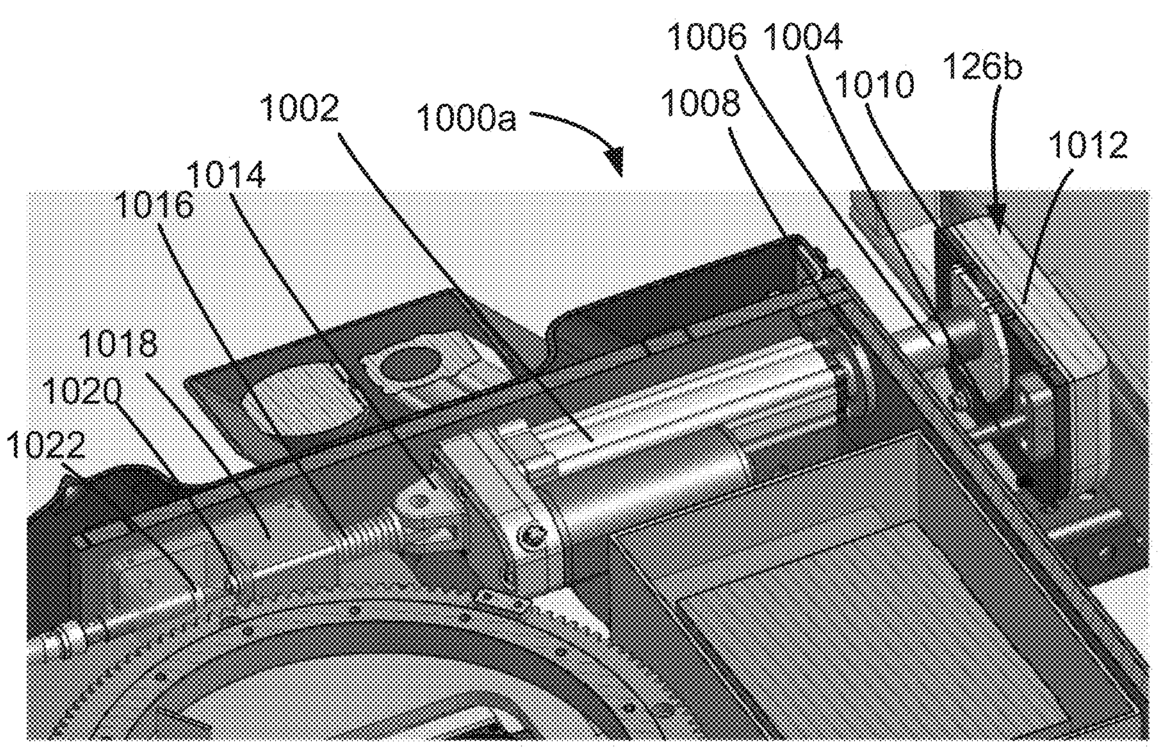
Figure 11C:
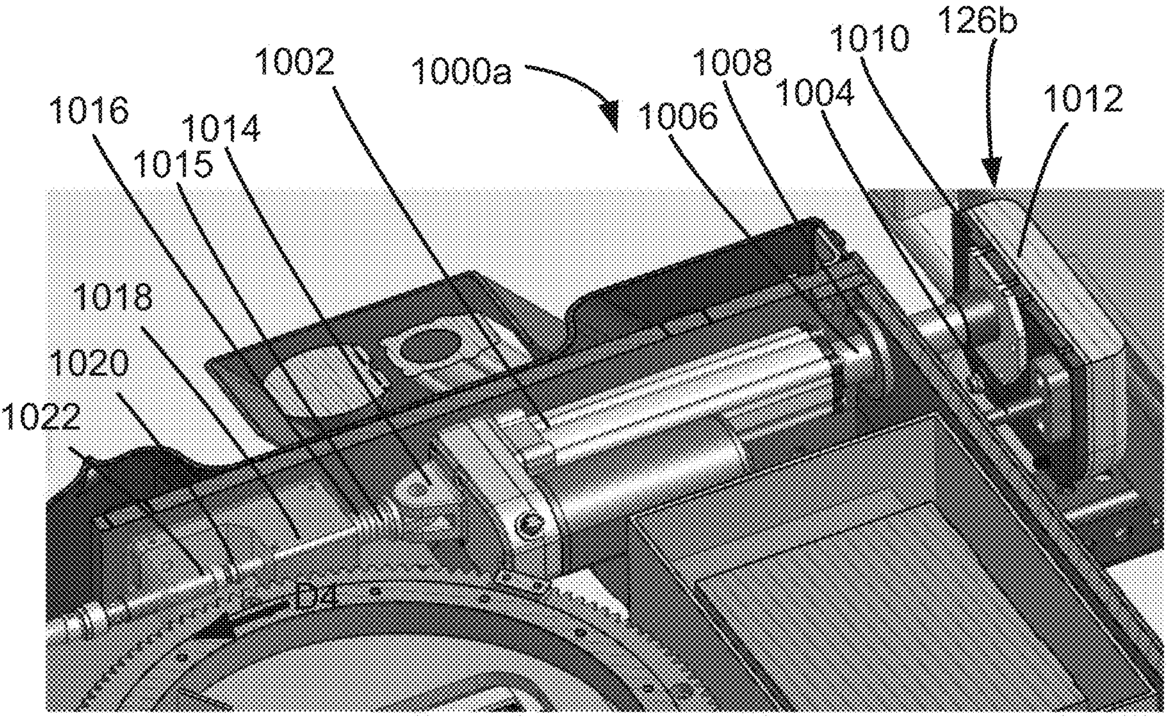
Figures 11D, 11E:
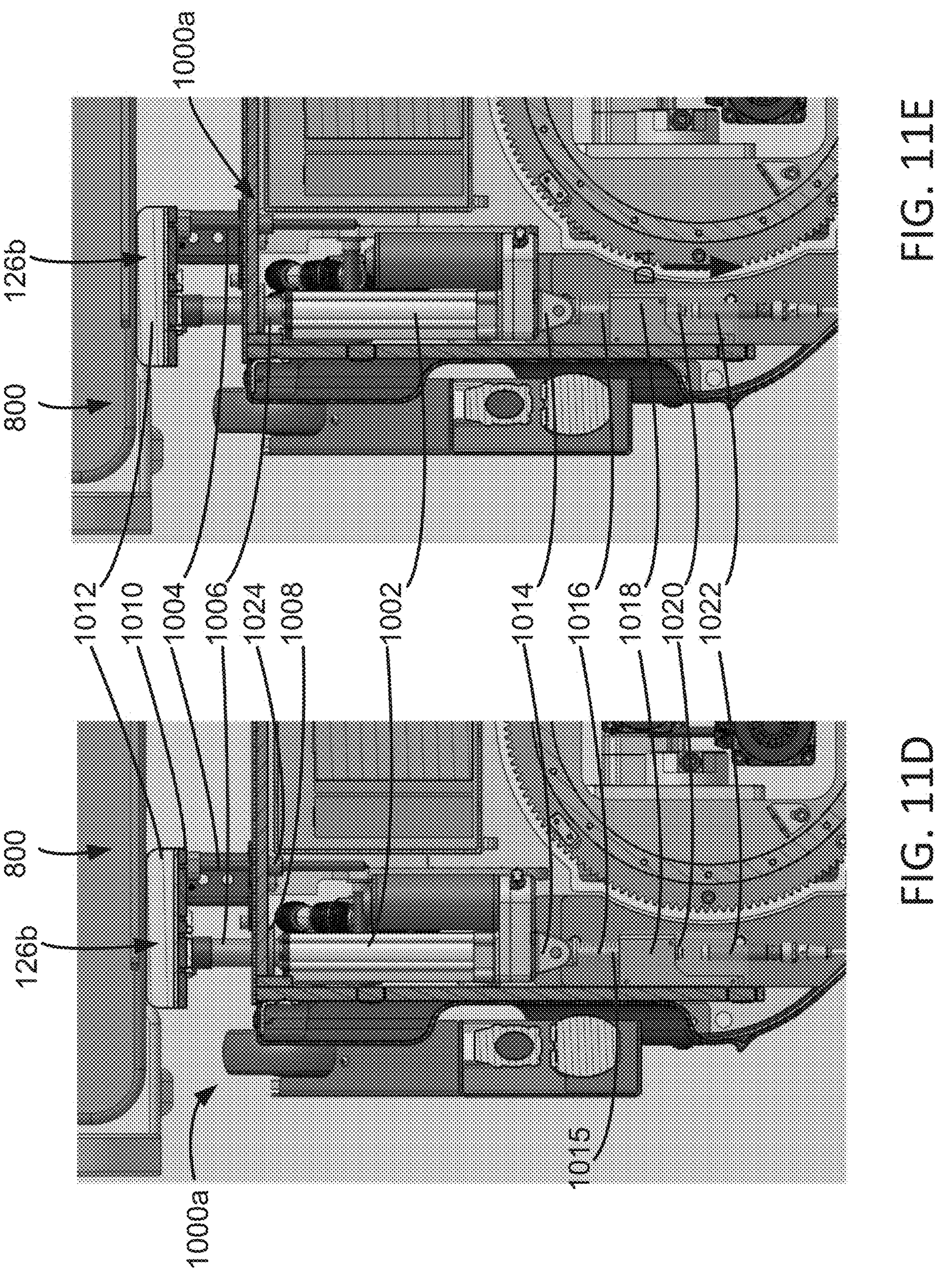

In one or more cases, when the hitching fingers 124*c* and 124*d* are positioned behind a portion of the cart 800, such as the crosstie 806, or positioned within a pocket of the cart 800, the cart mover 100 sends a signal to the actuators 1002 to extend the respective hitching pads 126*a* and 126*b*. The actuators 1002 continue to extend the hitching pads 126*a* and 126*b* until the actuators 1002 receive feedback from the respective sensors 1022 to stop extending the rod 1006. The respective hitching assemblies 1000 may determine the travel distance of the respective pads 126*a* and 126*b* move towards the hitching fingers 124*c* and 124*d*. Once the hitching pads 126*a* and 126*b* begin to contact the cart 800, the cart mover 100 may continue to extend the hitching pads 126*a* and 126*b*, in which the compression spring 1016 may begin to compress, causing the retainer 1020 to move towards the sensor 1022 in direction D4, as illustrated in FIGS. 11C and 11E. The linear actuators 1002 may stop extending the respective pads 126*a* and 126*b* based on the feedback provided by the sensors 1022. In some cases, the respective hitching assemblies 1000 may also determine the amount of force applied to the respective compression springs 1016 to determine whether to stop extending the rod 1006 and/or determine that the cart 800 is securely locked in between the hitching pads 126*a* and 126*b* and the hitching fingers 124*c* and 124*d*. Once the cart 800 is securely locked, the cart mover 100 may begin to move the cart 800. During travel, the cart mover 100 uses feedback provided by the sensors 1022 to determine whether the cart 800 is moving too much in between the hitching pads 126*a* and 126*b* and the hitching fingers 124*c* and 124*d* (i.e., indicating insecure hitching) or whether the cart 800 came out of hitch. In such cases, the sensors 1022 may provide feedback that the respective retainers 1020 are positioned too far (e.g., a threshold distance) from the sensors 1022, and may trigger a safe stop of the cart mover 100. In one or more cases, the sensors 1022 may be moved forward or backwards in their mounting brackets to allow for more or less spring compression (i.e., provide more or less cart locking force) as needed. In one or more cases, the compression springs 1016 may be changed for shorter or longer springs, providing more or less spring force for the customer application (e.g., increasing or decreasing the spring force based on the weight of the cart).

The hitching system 110 provides both quick tailoring of the cart hitching to each cart and the ability to hitch to many different styles of carts within a facility using the same cart mover 100. In some cases, the hitching fingers 124*c* and 124*d* may be set at a distance from the housing 102 based on the cart that has the hitch cross-tie the farthest back and the distance the hitching fingers 124*c* and 124*d* travel under the cart. The actuation of the hitching pads 126*a* and 126*b* may occur without consideration for the type of cart. Rather, the hitching pads 126*a* and 126*b* may be actuated until the pads 126*a* and 126*b* contact the cart and apply the same amount of force.

In one or more cases, the hitching system 110 may be used to hitch a cart to the cart mover 100 and safely move the cart. The addition of the hitching system 110, including for instance, the hitching pads 126*a* and 126*b* and hitching fingers 124*c* and 124*d* may provide additional benefits to the cart mover 100. For instance, by utilizing one of these additional hitching features, a larger margin of error is possible when raising the hitching arms 124*a* and 124*b* under the cart. The hitching arms 124*a* and 124*b* may enter some distance from the brace, crosstie, cavity or whatever feature the hitching fingers 124*c* and 124*d* will lock to on the cart, as the secondary action of pushing the cart away provides the secure locking effect. The additional hitching features provide the ability to successfully hitch on a particular cart structure. Further, the additional hitching features provide a greater margin for positional inaccuracy such that the hitching time can be reduced and productivity increased. Moreover, the additional hitching features may allow the cart mover 100 to hitch to carts that are not consistently dimensioned or have other variations.

In one or more cases, the additional hitching features provide a tighter and more secure connection between the cart mover 100 and the cart. For the cases in which only the hitching fingers 124*c* and 124*d* and hitching arms 124*a* and 124*b* are used, there may be some clearance between the contact areas of the hitching fingers 124*c* and 124*d* and the cart to allow the hitching fingers 124*c* and 124*d* and hitching arms 124*a* and 124*b* to have the necessary clearance to pivot up into the cart. In some cases, the clearance results in some "slop" between the cart and the cart mover 100. However, this "slop" can be eliminated by using the hitching fingers 124*c* and 124*d* in conjunction with the clamping arms 902*a* and 902*b* and/or hitching pads 126*a* and 126*b*.

Moreover, some carts, such as the York collapsible cart, need a lock engaged (usually by an operator) to hold the side walls of the cart to the base. If the lock is not engaged, there is a risk of the side walls opening up (i.e., collapsing open, with the side walls pivoting open) while being moved due to the vibrations incurred while traveling. Some facilities may have the operator always lock the cart closed (e.g., such as using click-lock straps across the front wall) before the robotic cart mover transports the cart. In other facilities, it may be preferable that the locking of the cart is handled by the cart mover. The clamping arms 902*a*, 902*b*, 904*a*, and 904*b*, and/or hitching pads 126*a* and 126*b* not only push but also arc into the cart's side walls to hold the side walls securely against the floor panel of the cart. The arc of the arms 902*a*, 902*b*, 904*a*, and 904*b*, for example, introduces a second vector of pushing force—i.e., pushing the side walls towards each other—in addition to away from the cart mover. In one or more cases, a compressible material, such as, but not limited to, rubber pads, or a combination of compressible springs and limit switches may be used to ensure the cart mover 100 applies the right amount of pressure to the cart by the clamping arms 902*a*, 902*b*, 904*a*, and 904*b* and/or hitching pads 126*a* and 126*b*. In the latter example above, the clamping arms 902*a* and 902*b* may arc in and hold the cart. Then, the springs compress (applying a known force to the cart according to the k-value of the springs used), such that when the required applied force is reached, the limit switches of proximity switches are triggered and the actuators pushing on the clamping arms 902*a*, 902*b*, 904*a*, and 904*b* and/or hitching pads 126*a* and 126*b* stop extending. This provides another level of security in terms of ensuring secure locking of the cart.

The various embodiments described above are provided by way of illustration only and should not be construed to limit the claims attached hereto. Those skilled in the art will readily recognize various modifications and changes that may be made without following the example embodiments and applications illustrated and described herein, and without departing from the spirit and scope of the following claims.

What is claimed is:

1. A reconfigurable drive system, comprising:

a chassis;

a drive unit comprising a first drive wheel and a second drive wheel, each configured to be independently driven about a central axis of the first drive wheel and the second drive wheel; and a drive turret rotatably coupling the drive unit and the chassis, the drive turret comprising a brake, wherein the brake, in a locked state, locks an orientation of the drive unit with respect to the chassis, wherein in an unlocked state, the drive unit is configured to freely rotate about a vertical axis of the drive unit, and wherein the vertical axis of the drive unit is centrally aligned with the central axis of the first drive wheel and the second drive wheel.

2. The reconfigurable drive system of claim 1, further comprising:

a first set of support wheels and a second set of support wheels coupled to the chassis, wherein the first set of support wheels or the second set of support wheels are configured to be deployed from the chassis to contact a ground surface based on a drive mode.

3. The reconfigurable drive system of claim 2, further comprising:

wherein the first set of support wheels comprise non-swiveling wheels oriented in a fixed direction with respect to the chassis, and wherein the second set of support wheels comprise swiveling wheels configured to pivot about the respective vertical axis of each support wheel of the second set of support wheels.

4. The reconfigurable drive system of claim 3, wherein:

in a tricycle steering mode, the first set of support wheels are deployed from the chassis, and the drive turret is configured in the unlocked state; and in a differential steering mode, the second set of support wheels are deployed from the chassis, and the drive turret is configured in the locked state.

5. The reconfigurable drive system of claim 3, the second set of wheels comprise omni-directional wheels or swivel castor wheels.

6. The reconfigurable drive system of claim 2, wherein a first wheel of the first set of support wheels and a second wheel of the second set of support wheels are coupled to one another via a pivoting member such that a central axis of the first wheel and a central axis of the second wheel are offset from one another.

7. The reconfigurable drive system of claim 6, wherein the first wheel is coupled to an actuator via a mounting member, the actuator being rotatably coupled to the chassis, and wherein the actuator is driven a distance to deploy the second wheel, via rotating about the pivoting member, to contact the ground surface and elevate the first wheel from the ground surface.

8. The reconfigurable drive system of claim 1, further comprising:

a first set of support wheels coupled to the chassis, wherein the first set of support wheels are configured to be constrained from swiveling about a respective axis or unconstrained from swiveling about the respective axis based on a drive mode.

9. The reconfigurable drive system of claim 1, wherein the first drive wheel and the second drive wheel are each coupled to a gearbox vertically aligned with a brake and encoder.

10. The reconfigurable drive system of claim 9, wherein each gearbox comprises an output shaft coupled to the respective first drive wheel and second drive wheel, the output shaft extending from the respective gearbox.

11. The reconfigurable drive system of claim 10, wherein the first drive wheel and the second drive wheel each comprise a driven gear centrally located within the respective first drive wheel and the second drive wheel, wherein the output shafts of the gearboxes comprise geared ends to interface with the respective driven gears, and wherein the geared ends are offset to one side of the respective driven gear.

12. The reconfigurable drive system of claim 1, wherein the first drive wheel and the second drive wheel are operably coupled to a housing, wherein the housing is pivotably coupled to the drive turret, such that the drive turret is configured to rotate about a horizontal axis of the drive unit.

13. The reconfigurable drive system of claim 1, wherein the first drive wheel and the second drive wheel are each independently rotated by the drive unit to rotate the drive turret about a horizontal axis of the drive unit.

14. A reconfigurable drive system, comprising:

a chassis;

a drive unit comprising a first drive wheel and a second drive wheel, each configured to be independently driven;

a drive turret rotatably coupling the drive unit and the chassis, the drive turret comprising a brake, wherein the brake, in a locked state, locks an orientation of the drive unit with respect to the chassis, and wherein in an unlocked state, the drive unit is configured to freely rotate about a vertical axis of the drive unit; and a first set of support wheels and a second set of support wheels coupled to the chassis, wherein the first set of support wheels or the second set of support wheels are configured to be deployed from the chassis to contact a ground surface based on a drive mode.

15. The reconfigurable drive system of claim 14, further comprising:

wherein the first set of support wheels comprise non-swiveling wheels oriented in a fixed direction with respect to the chassis, and wherein the second set of support wheels comprise swiveling wheels configured to pivot about the respective vertical axis of each support wheel of the second set of support wheels.

16. The reconfigurable drive system of claim 15, wherein:

in a tricycle steering mode, the first set of support wheels are deployed from the chassis, and the drive turret is configured in the unlocked state; and in a differential steering mode, the second set of support wheels are deployed from the chassis, and the drive turret is configured in the locked state.

17. The reconfigurable drive system of claim 15, the second set of wheels comprise omni-directional wheels or swivel castor wheels.

18. The reconfigurable drive system of claim 14, wherein a first wheel of the first set of support wheels and a second wheel of the second set of support wheels are coupled to one another via a pivoting member such that a central axis of the first wheel and a central axis of the second wheel are offset from one another.

19. The reconfigurable drive system of claim 14, wherein the first set of support wheels are configured to be constrained from swiveling about a respective axis or unconstrained from swiveling about the respective axis based on a drive mode.

20. The reconfigurable drive system of claim 14, wherein the first drive wheel and the second drive wheel are each configured to be independently driven about a central axis of the first drive wheel and the second drive wheel, and wherein the vertical axis of the drive unit is centrally aligned with the central axis of the first drive wheel and the second drive wheel.

* * * * *